United States Patent
Vena et al.

(10) Patent No.: US 11,535,772 B2
(45) Date of Patent: Dec. 27, 2022

(54) SIDECHAIN FUNCTIONALIZED ORGANOSILOXANES, COATING COMPOSITIONS CONTAINING SIDECHAIN FUNCTIONALIZED ORGANOSILOXANES, COATED ARTICLES, AND METHODS OF MAKING AND METHODS OF USE THEREOF

(71) Applicant: Adaptive Surface Technologies, Inc., Cambridge, MA (US)

(72) Inventors: Alexander Vena, Cambridge, MA (US); Andrew Keelan Labak, Somerville, MA (US); Terrence Anthony Banks, Arlington, MA (US); Colleen Cannon, Woburn, MA (US); Teluka Pasan Galhenage, Chestnut Hill, MA (US); Chetan Anirudh Khatri, Acton, MA (US); Joseph Lomakin, Arlington, MA (US); Philseok Kim, Waltham, MA (US)

(73) Assignee: Adaptive Surface Technologies, Inc., Cambridge, MA (US)

(*) Notice: Subject to any disclaimer, the term of this patent is extended or adjusted under 35 U.S.C. 154(b) by 0 days.

(21) Appl. No.: 16/973,176

(22) PCT Filed: Jun. 8, 2019

(86) PCT No.: PCT/US2019/036197
§ 371 (c)(1),
(2) Date: Dec. 8, 2020

(87) PCT Pub. No.: WO2019/237093
PCT Pub. Date: Dec. 12, 2019

(65) Prior Publication Data
US 2021/0253902 A1    Aug. 19, 2021

Related U.S. Application Data

(60) Provisional application No. 62/689,607, filed on Jun. 25, 2018, provisional application No. 62/689,627, (Continued)

(51) Int. Cl.
| C09D 183/12 | (2006.01) |
| C08G 77/46 | (2006.01) |
| C09D 5/14 | (2006.01) |

(52) U.S. Cl.
CPC ........... *C09D 183/12* (2013.01); *C08G 77/46* (2013.01); *C09D 5/14* (2013.01)

(58) Field of Classification Search
None
See application file for complete search history.

(56) References Cited

U.S. PATENT DOCUMENTS

| 4,673,718 A * | 6/1987 | Ryntz | ................. | C08F 290/068 525/474 |
| 4,766,185 A * | 8/1988 | Ryntz | ................. | C08F 290/148 525/479 |

(Continued)

FOREIGN PATENT DOCUMENTS

| WO | 2007/053163 A2 | 5/2007 |
| WO | 2013/000478 A1 | 1/2013 |
| WO | 2017176709 A1 | 10/2017 |

OTHER PUBLICATIONS

IP.com search of PG Pub (Year: 2021).*

(Continued)

*Primary Examiner* — Peter A Salamon
(74) *Attorney, Agent, or Firm* — Innovators Legal

(57) ABSTRACT

Sidechain functionalized organosiloxane compounds are provided having a first end and a second end; a polysiloxane backbone; and a first plurality of sidechains covalently
(Continued)

attached to the polysiloxane backbone and a second plurality of sidechains covalently attached to the polysiloxane backbone; wherein the first plurality of sidechains comprise polyalkylene glycol sidechains; wherein the first plurality of sidechains and the second plurality of sidechains comprise a tethered end covalently attached to the polysiloxane backbone and a free end opposite to the tethered end; and wherein the free end in one or both of the first plurality of sidechains and the second plurality of sidechains comprises a reactive end group. Compositions comprising the sidechain functionalized organosiloxane compounds are also provided, as well as coated articles. Sidechain functionalized lubricants are also provided that can be used with compositions and coated articles herein.

25 Claims, 40 Drawing Sheets

Related U.S. Application Data filed on Jun. 25, 2018, provisional application No. 62/688,911, filed on Jun. 22, 2018, provisional application No. 62/688,897, filed on Jun. 22, 2018, provisional application No. 62/682,836, filed on Jun. 8, 2018.

(56) References Cited

U.S. PATENT DOCUMENTS

| | | | | |
|---|---|---|---|---|
| 4,830,939 A * | 5/1989 | Lee | ............... | H01M 6/181 |
| | | | | 429/312 |
| 5,227,043 A * | 7/1993 | Shakushiro | ............... | H01M 6/181 |
| | | | | 204/421 |
| 7,378,193 B2 * | 5/2008 | Kang | ............... | H01M 10/0565 |
| | | | | 429/302 |
| 8,308,971 B1 * | 11/2012 | Bhat | ............... | C07F 9/1415 |
| | | | | 252/62.2 |
| 8,703,344 B2 * | 4/2014 | Bhat | ............... | H01M 10/0525 |
| | | | | 429/326 |
| 8,734,668 B2 * | 5/2014 | Bhat | ............... | C07F 9/098 |
| | | | | 252/62.2 |
| 8,796,406 B2 * | 8/2014 | Gupta | ............... | C08G 77/46 |
| | | | | 526/279 |
| 8,952,100 B2 * | 2/2015 | Thiele | ............... | C08C 2/02 |
| | | | | 525/331.9 |
| 9,034,523 B2 * | 5/2015 | Zhou | ............... | H01M 10/052 |
| | | | | 429/313 |
| 9,169,359 B2 * | 10/2015 | Webster | ............... | C08G 77/442 |
| 2002/0028388 A1 * | 3/2002 | Lee | ............... | H01M 10/052 |
| | | | | 429/303 |
| 2003/0054257 A1 * | 3/2003 | Noda | ............... | H01M 10/052 |
| | | | | 429/309 |
| 2010/0137529 A1 * | 6/2010 | Williams | ............... | C09D 183/12 |
| | | | | 525/474 |
| 2011/0294933 A1 * | 12/2011 | Jaunky | ............... | C08G 77/38 |
| | | | | 524/265 |
| 2014/0010853 A1 * | 1/2014 | Williams | ............... | C08L 83/12 |
| | | | | 424/405 |
| 2014/0135422 A1 * | 5/2014 | Thorlaksen | ............... | C09D 5/1675 |
| | | | | 523/122 |
| 2014/0193351 A1 * | 7/2014 | Mohammadi | ............... | A61K 8/9728 |
| | | | | 424/70.121 |
| 2014/0206830 A1 | 7/2014 | Parakka et al. | | |
| 2015/0152270 A1 * | 6/2015 | Aizenberg | ............... | A61L 31/04 |
| | | | | 210/500.27 |
| 2019/0100681 A1 * | 4/2019 | Kim | ............... | C09D 5/00 |
| 2019/0211154 A1 * | 7/2019 | Lawton | ............... | C09D 123/06 |
| 2021/0253902 A1 * | 8/2021 | Vena | ............... | A01N 31/08 |
| 2021/0269464 A1 * | 9/2021 | Khatri | ............... | C09D 183/06 |

OTHER PUBLICATIONS

International Search Report for PCTUS2019036197 dated Oct. 16, 2019.

Pubmed Compound Summary for CID 88857560, '2-[2-[2-[3-[(Dodecyl-methyl-trimethylsilyloxysilyl)oxy-[[[ethyl(oxo)silyl]methyl-dimethylsilyl]oxy-methyl-(3-trimethylsilylpropyl)silyl]oxy-methylsilyl]propoxy]ethoxy]ethoxy]ethanol', U.S. National Library of Medicine, Feb. 13, 2015 (Feb. 13, 2015), p. 1-11; p. 2 (https://pubchem.ncbi.nlm.nih.gov/compound/88857560).

Sun, et al. "Recent advances in all-solid-state rechargeable lithium batteries," Nano Energy, Jan. 26, 2017, vol. 33, pp. 363-386.

Li, et al. "Roles of silanes and silicones in forming superhydrophobic and superoleophobic materials," Journal of Materials Chemistry A, Jul. 29, 2016, vol. 4, pp. 13677-13725.

\* cited by examiner

| 100028 | 100031 | 100033 | 100035 |
|---|---|---|---|
|  |  |  |  |
| 100036 | 100037 | Commercial FR | PVC |
|  |  |  |  |

M1     Unmodified Polyurethane

Hydrophilic Side Chains

Polysiloxane

Modular Side Chains

Reactive Side Chains

Reactive End Terminal Brush

Side Chain Reactive Modular Brush

SIDECHAIN FUNCTIONALIZED ORGANOSILOXANES, COATING COMPOSITIONS CONTAINING SIDECHAIN FUNCTIONALIZED ORGANOSILOXANES, COATED ARTICLES, AND METHODS OF MAKING AND METHODS OF USE THEREOF

CROSS-REFERENCE TO RELATED APPLICATIONS

This application claims priority to, and the benefit of, U.S. provisional application entitled "Sidechain functionalized organosiloxanes, coating compositions containing sidechain functionalized organosiloxanes, coated articles, and methods of making and methods of use thereof" having Ser. No. 62/688,897, filed Jun. 22, 2018; U.S. provisional application entitled "Sidechain functionalized organosiloxanes, coating compositions containing sidechain functionalized organosiloxanes, coated articles, and methods of making and methods of use thereof" having Ser. No. 62/688,911, filed Jun. 22, 2018; U.S. provisional application entitled "BIOCIDAL FUNCTIONALIZED REACTIVE ORGANOSILOXANES AND COMPOSITIONS AND COATINGS THEREOF" having Ser. No. 62/689,607, filed Jun. 25, 2018; U.S. provisional application entitled "SIDECHAIN FUNCTIONALIZED LUBRICATING OILS, COATING COMPOSITIONS AND FOULING CONTROL COATINGS THEREOF" having Ser. No. 62/689,627, filed Jun. 25, 2018; and U.S. provisional application entitled "POLYMER COMPOSITIONS FOR FORMING A SLIPPERY SURFACE ON A SUBSTRATE AND SURFACES FORMED THEREFROM" having Ser. No. 62/682,836, filed Jun. 8, 2018; the contents of each of which are incorporated by reference in their entirety.

TECHNICAL FIELD

The present disclosure generally relates to coatings and surfaces, and in particular to coatings and surfaces that are slippery and/or non-stick.

BACKGROUND

Biofouling of surfaces is a persistent problem across industries. Traditionally silicone-based materials are known to have low adhesion towards biofouling. However, given the broad spectrum of foulants and their diversity for surface adhesion preferences, silicone materials provide an incomplete solution. For example slime films of N. incerta (marine diatom) are a common example of a biofouling organism that display stronger adhesion to silicone surface. To advance the performance of silicone materials for biofouling control, more modern approaches try to combine protein resistant hydrophilic moieties with silicone to improve biofouling protection against a broad spectrum of bio-foulants.

Biofouling is traditionally controlled by use of antifouling coating that release toxic biocides into the surrounding environment. Such coatings are under increasing regulatory pressure due to their environmental impact. More recently, fouling release coatings generally made of silicones have been used to mitigate biofouling as they have been shown to reduce adhesion of fouling organisms. However, conventional fouling release coatings still accumulate fouling, e.g. in conditions where flow or gravity forces are insufficient to overcome the adhesive force of organisms to the surface.

A valuable approach to improving the performance of fouling release coatings is to effectively combine the physical effect with a chemical effect that can further reduce the adhesion of organisms. Such a system would have improved fouling control performance (in particular in static conditions) without the negative effects of leaching biocide into the environment. Prior art has considered the use of such chemical functional groups into coatings; however, such attempts have generally lacked efficacy due to the lack of controlled stratification and exposure of such active groups on the surface to make them effective.

Polyethyleneglycol (PEG) or zwitterionic groups (ZW) are known to be an effective protein resistant moiety if one can effectively expose the PEG or ZW groups on the surface. Self-assembled monolayers (SAMs) of PEG as well as surface grafted ZW have extensively demonstrated the ability of these functional groups to provide anti-biofouling activity. In recent studies, bringing zwitterionic groups at the surface via polymer brushes has been shown to enhance their efficiency to form a stable surface hydration layer (ordered structure of water molecules bound to the polymer surface via strong hydrogen bonding that is stable and difficult to be displaced by an organism trying to adhere to the polymer surface) leading to the reduction of bacterial adhesion and the adhesion strength of the conditioning films (*J. Phys. Chem. C* 2014, 118, 15840-15845; *J. Mater. Chem. B*, 2014, 2, 5352-5357). However, the current methods to achieve the placement of these functional groups at the desired surface are only limited to grafting methods (e.g. surface-initiated polymerization), which is a major challenge to bring this idea to a more practical coating system. In particular, there remains a need for more practical coating systems where protein resistant hydrophilic moieties such as PEG or ZW can be effectively incorporated by a simple or traditional manner (e.g. as a reactive component in a coating formulation or a non-reactive additives) and upon which these functional groups are effectively stratified during the drying or curing process of the coating system and presented at the surface.

There remains a need for improved surface coating compositions that overcome the aforementioned deficiencies.

SUMMARY

In various aspects, this disclosure is directed to coatings and surfaces, methods and compositions for making coatings on surfaces, coated surfaces and articles, and uses thereof. In various aspects, this disclosure is also directed to sidechain functionalized organosiloxane compounds for use in the coatings, surfaces, compositions, and coated surfaces and articles. In some aspects, the sidechain functionalized organosiloxane compounds can stratify to the surface and are capable of presenting surface active hydrophilic or zwitterionic elements that minimize protein binding and biofouling. In further aspects, the side chain functional groups in the sidechain functionalized organosiloxane compounds are capable of presenting additional functions, for example, non-leaching biocidal functional groups that act has a contact poison, UV absorbing/blocking functional groups, and anti-icing elements that can suppress freezing point or delay ice nucleation and growth or reduce ice adhesion.

In various aspects, this disclosure is directed to sidechain functionalized organosiloxane compound. The sidechain functionalized organosiloxane compound can include (i) a first end and a second end; (ii) a polysiloxane backbone connecting the first end to the second end; and (iii) a first plurality of sidechains covalently attached to the polysiloxane backbone and a second plurality of sidechains covalently attached to the polysiloxane backbone; wherein the sidechains in the first plurality of sidechains have a chemical structure different from a chemical structure of the second plurality of sidechains; wherein the first plurality of sidechains comprise polyalkylene glycol sidechains; wherein the first plurality of sidechains and the second plurality of sidechains comprise a tethered end covalently attached to the polysiloxane backbone and a free end opposite to the tethered end; and wherein the free end in one or both of the first plurality of sidechains and the second plurality of sidechains comprises a reactive end group.

Suitable polyalkylene glycol sidechains can include those selected from the group consisting of poly(ethylene glycol), poly(propylene glycol), poly(ethylene glycol-ran-propylene glycol), poly(ethylene glycol-block-propylene glycol), poly(butylene glycol), co-polymers containing poly(butylene glycol), and a combination thereof.

The functionalized organosiloxane can include a first end and a second end. In some aspects, the first end and the second end are nonreactive with silicone condensation cure chemistry, are nonreactive with platinum addition cure silicone chemistry, are nonreactive with epoxy cure chemistry, and/or are nonreactive with polyurethane chemistry.

One or both of the first plurality of sidechains and the second plurality of sidechains can include a reactive end group. In various aspects, the reactive end group can be selected from a group that can undergo 1) addition cure chemistry, 2) condensation cure chemistry, 3) hydrosilylation chemistry, 4) epoxy chemistry, 5) urethane/urea chemistry, 6) amino crosslinking chemistry, 7) click chemistry. In additional aspects, the reactive end group can be selected from alkoxy, enoxy, oxime, primary amine, secondary amine, ethoxy silane, methoxy silane, acetoxy silane, vinyl groups, hydrides, epoxide groups, isocyanate groups, hydroxyl groups, and (meth)acrylate groups. In additional aspects, the reactive end group can be selected from a group that can adhere to a solid substrate including but not limited to a thiol, a carboxylic acid and its esters or anhydrides, an alkoxy silane, a chlorosilane, a phosphonic or phosphinic or phosphoric acid and its esters or anhydrides, an azide, an alkyne, an alkene, an aldehyde, an acetal, and bio-derived or bioconjugates for binding such as catechols and catecholamines.

The sidechains in the sidechain functionalized organosiloxane compound can be covalently attached to the polysiloxane backbone through a linker at the tethered end. For example, in some aspects the linker includes a $C_1$-$C_{12}$ alkyl or heteroalkyl or a $C_1$-$C_5$ alkyl or heteroalkyl.

In some aspects, the sidechain functionalized organosiloxane compound has a structure according to any one of the following formulas:

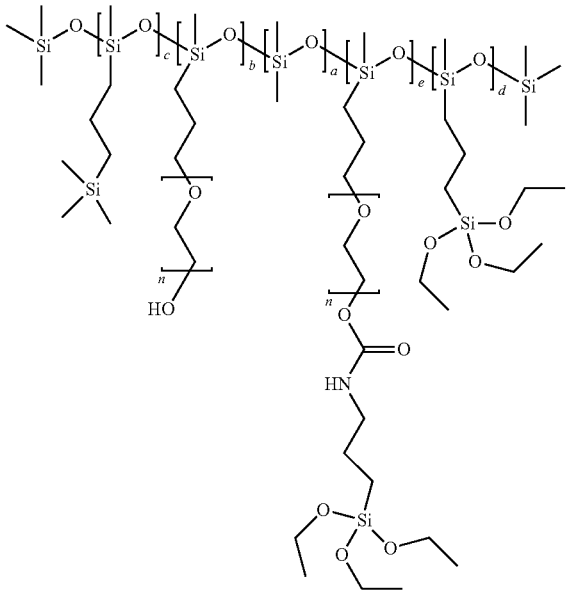

AM-14

$A = \sim 30, b \sim 3.5, c = 0, d = 0, e \sim 3.5, n \sim 10$

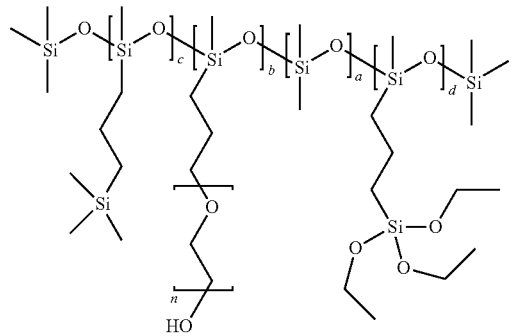

AM-24

$a = 0, b = 16, c = 14, d = 2, n = 10$

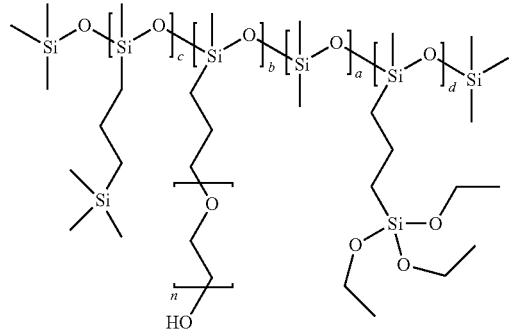

AM-22

$a = 19, b = 3, c = 3, d = 2, n = 10$

AM-21

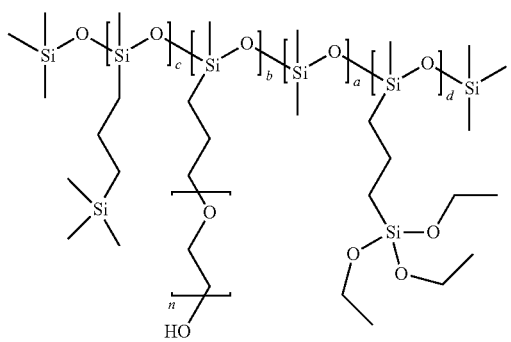

a = 19, b = 0, c = 6, d = 2, n = 10

AM-20

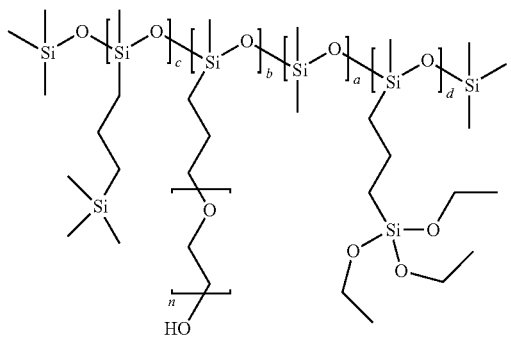

a = 19, b = 6, c = 0, d = 2, n = 10

AM-42

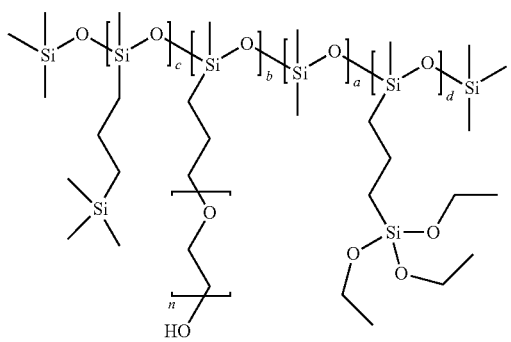

a = 0, b = 3.2, c = 26.8, d = 2, n = 10

AM-41

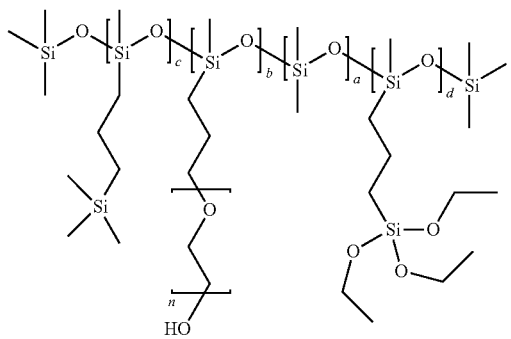

a = 0, b = 8, c = 22, d = 2, n = 10

AM-30

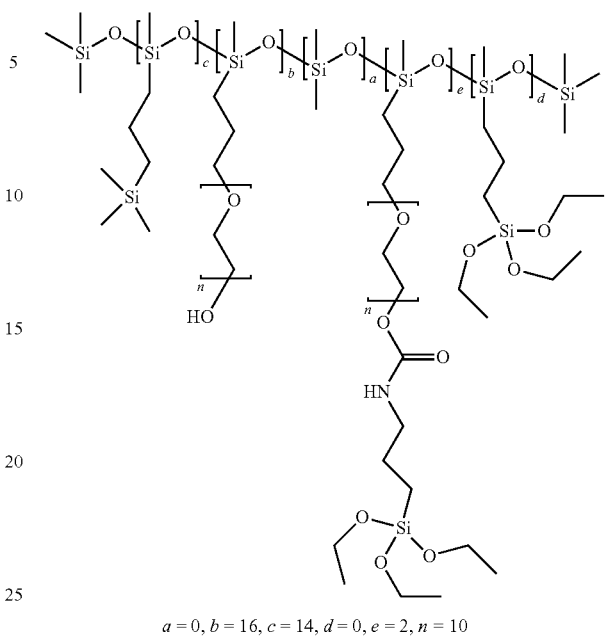

a = 0, b = 16, c = 14, d = 0, e = 2, n = 10 where each occurrence of n is independently an integer from 6 to 25; where each occurrence of b is independently an integer from 2 to 12; where each occurrence of c is independently an integer from 2 to 20; where each occurrence of d is independently an integer from 1 to 10; and where each occurrence of e is independently an integer from 2 to 20.

In some aspects, the sidechains in the sidechain functionalized organosiloxane compound can have a covalently attached biocidal moiety.

Polymer compositions including the sidechain functionalized organosiloxane compounds are also provided. In some aspects, a polymer composition is provided that is capable of curing on a substrate to form a surface that is resistant to biofouling, the polymer composition including: (a) a base resin composition comprising (i) one or more different polymeric precursors capable of curing to form a cured resin and (ii) a sidechain functionalized organosiloxane compound described herein that comprises reactive end groups capable of reacting with the one or more different polymeric precursors; wherein, when the base resin composition is cured to form the cured resin, the reactive end groups in the sidechain functionalized organosiloxane compound react with the one or more different polymeric precursors so that the sidechain functionalized organosiloxane compound is integrated into the cured resin.

In some aspects, when the base resin composition is cured to form the cured resin, the sidechain functionalized organosiloxane compound stratifies to the surface. In some aspects, when the base resin composition is cured to form the cured resin, at least some of the sidechains in the sidechain functionalized organosiloxane compound are free sidechains that present a dynamic wetting behavior at the surface. In some aspects, the dynamic wetting behavior comprises a decrease in a water contact angle for the surface when measured over a time period upon exposure to water. Not wishing to be bound by any particular theory, it is believed that the time scale of such a dynamic switching of the water contact angle of the surface depends on mainly three parameters: 1) the relative surface density of the functional groups presented by the sidechain functionalized organosiloxanes as a result of stratification during curing, 2) the ability of the sidechains to freely move or orient themselves (e.g. via bond rotation) towards an exposed environment (e.g. water or air) which is also associated with the persistent length (or flexibility) of the sidechains, Kuhn length, and the bond rotational energy barrier at the anchor (e.g. Si—O—Si bond rotation vs. C—C bond rotation). The time scale of observed water contact angle change (from a steady value of water contact angle to another steady value of water contact angle) can be from less than 1 second, 1-5 seconds, 5-10 seconds, 10-30 seconds, 30-60 seconds, 60-120 seconds, 120-150 seconds, or >150 seconds.

In some aspects, the polymer composition includes a lubricant that is a free, non-covalently attached polymeric molecule present in the cured polymer composition. The lubricant can migrate to the surface to form a lubricious surface to further enhance the resistance to biofouling of the surface. The lubricant can also effectively plasticize the cured polymer composition to promote the stratification of the sidechain functionalized organosiloxane compound. In some aspects, the chemical structure of the lubricant is similar to that of the sidechain functionalized organosiloxane but without a reactive group such that there is a strong chemical affinity and compatibility between the lubricant and the sidechain functionalized organosiloxane allowing them to stratify together.

In some aspects, the polymer compositions and surfaces include one or more synthetic or natural anti-fouling or biocidal agents (e.g. anti-bacterial agents, anti-fungal agents or natural oil), which, when cured with the compositions, are incorporated into the cured base resin of the surface and released from the base resin. Suitable biocidal agents can include those selected from the group consisting of metal biocides such as Copper(I) oxide, Copper thiocyanate, Copper pyrithione, Cu powder, Chromium trioxide, Zinc pyrithione, Ziram, Zineb; organic compounds such as dihydropyridazinones; pyridazinones, Diuron, Irgarol 1051, Dichlofluanid, TCMTB, Chlorothalonil, TCMS pyridine, SeaNine 211, Folpet, 4-chloro-meta-cresol, Econea, phenylborane pyridine, and Selektope; essential oils, and organic oils such as oregano and clove bud oil. Suitable natural anti-fouling agents can include those described in Saha, M., Goecke, F. & Bhadury, P. J Appl Phycol (2018) 30: 1859 and (2) J. R. Almeida, V. Vasconcelos/Biotechnology Advances 33 (2015) 343-357. In aspects, the biocidal agents are present in the polymer composition at an amount from about 2% to about 15% by weight based upon a total weight of the composition.

Articles including a surface that is fouling-resistant, anti-fouling, and/or foul release are also provided where the surface includes a sidechain functionalized organosiloxane described herein. In particular, in some aspects the surface is prepared using a polymer composition described herein, although this does not necessarily need to be the case in all aspects. For example, in some aspects the sidechain functionalized organosiloxane is incorporated into other coating compositions. In some aspects, the sidechain functionalized organosiloxane is applied directly to a surface and is capable of binding directly to a surface. In some aspects, the sidechain functionalized organosiloxane is directly grafted onto the surface of a particle acting as a vehicle to carry and to present the sidechain functionalized organosiloxane when such a particle is incorporated as an additive into other compositions.

Suitable substrates can include those selected from the group consisting of a polymer, a metal, a sapphire, a glass, a carbon, a ceramic, and a composite thereof. Suitable particles can include those selected from the group consisting of a metallic particle, a metal oxide particle, a polymeric particle, a ceramic particle, a carbon particle, and a composite thereof. For example, in some aspects, the article is a ship, boat, or other marine vessel; an unmanned underwater vehicle; an aquaculture netting; a sensor; a seismic cable; or other article intended for exposure to an aqueous or marine environment. For example, in some aspects, the article is a drum, vat, or tank; a pipe or conduit; a cable or wire; a membrane or a mesh; or other article intended for exposure to water or aqueous systems, including aqueous waste handling systems. For example, in some aspects, the article is a catheter, stent, or other implantable medical device; a surgical tool; a bag or a container; or other article or surface intended for exposure to blood, bodily fluid, or potential pathogens.

Other systems, methods, features, and advantages of the coatings, surfaces, methods, compositions, articles, and uses thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 11B) Confocal Raman signals at 1470 cm$^{-1}$ and 1285 cm$^{-1}$ show that PEG concentration is highest within the discrete phases, while silicone concentration is highest in the continuous phase.

FIG. 40A shows images of the panels at the end of the test (n=4, left to right). FIG. 40B is a graph of the total amount of bioaccumulation for each coating (n=4).

DETAILED DESCRIPTION

Although polymers containing silicone and PEG have been recently cited for improving anti-fouling performance, several challenges remain in advancing an effective biofouling resistant coating. These challenges include: 1) creating active polymeric components that are surface active polymers (SAPs) such that they can effectively stratify to the surface, 2) creating surfaces where such polymers present an effective and stable density of hydrophilic domains on the surface, and 3) creating a coating surface that can switch the surface properties when exposed to water.

Additionally, even these hydrophilic surface active functional groups lose their anti-fouling properties when masked or dominated by a more hydrophobic material (e.g. the polymer binders themselves to construct a coating). Therefore not wishing to be bound by any particular theory, it is believed that new practical approaches that allow for the following features are highly desired: 1) control of the surface stratification during curing that can be achieved by fine tuning of the compatibilities among the components in a coating formulation such as hydrophilic-lyophilic balance, Hansen solubility parameters, surface energy, and density; 2) control of the relative density of hydrophilic and/or hydrophobic functional groups on the surface, in particular with the ability to dynamically switch the density upon exposure to a hydrophilic and/or hydrophobic environment. The invention described herein describes highly tunable and multi-functional surface active polymer compounds that can be used as an individual constituent in a coating formulation in particular combined with a free, non-reactive mobile component (i.e. lubricant) of similar tunability, and the utility of such coating compositions as examples with particular emphasis on controlling the adhesion of biological organisms colloquially termed as biofouling.

Figure 41:
FIG. 41 is a schematic depicting the difference in network formation for reactive end terminal vs. side chain reactive modular brush.
Figure 41:
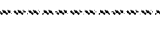
Figure 41:
Figure 41:
Figure 41:
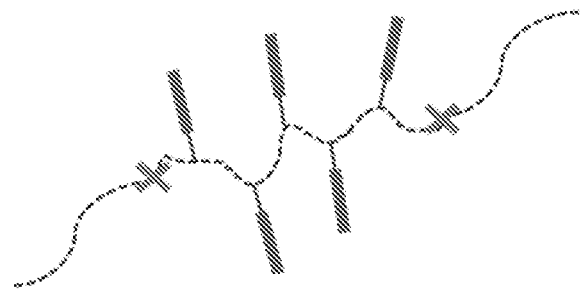
Figure 41:
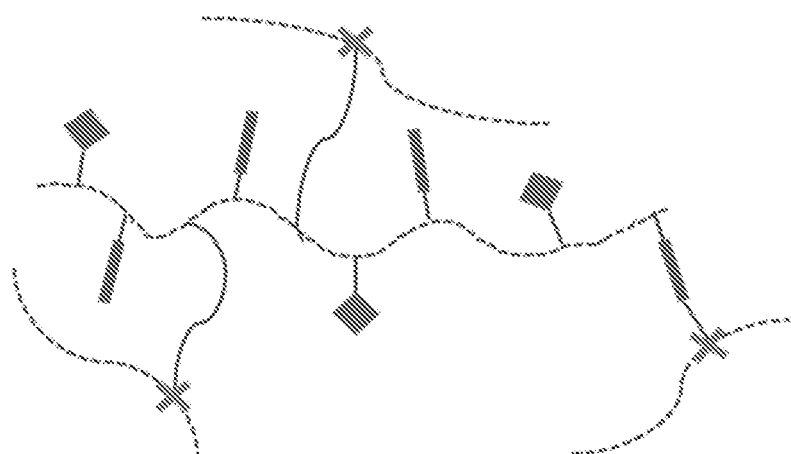
Figure 42:
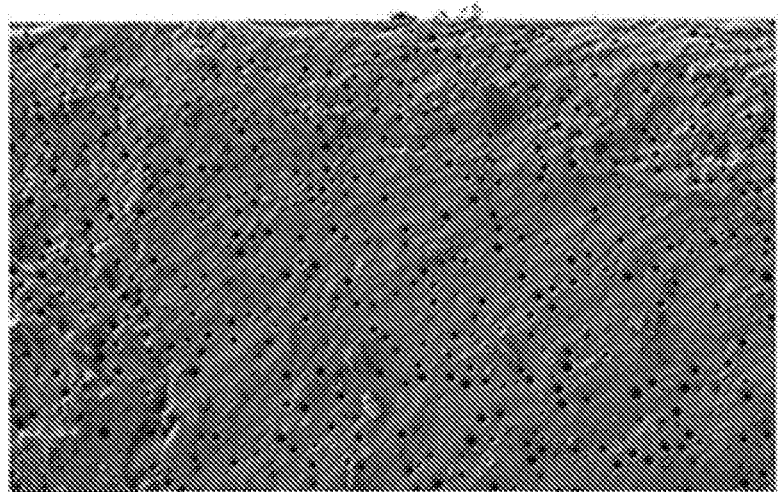
FIG. 42 shows cross-sectional SEM images (scale bar=10 micrometer) of coatings made from example formula 100253 (with AM-42), 100252 (with AM-41), 100092 (with AM-24) demonstrating the ability to control the overall phase separation behavior and resultant cross-sectional morphology of the coating arising from the addition of varying amount of sidechain functionalized organosiloxanes with varying degree of amphiphilicity.
Figure 42:
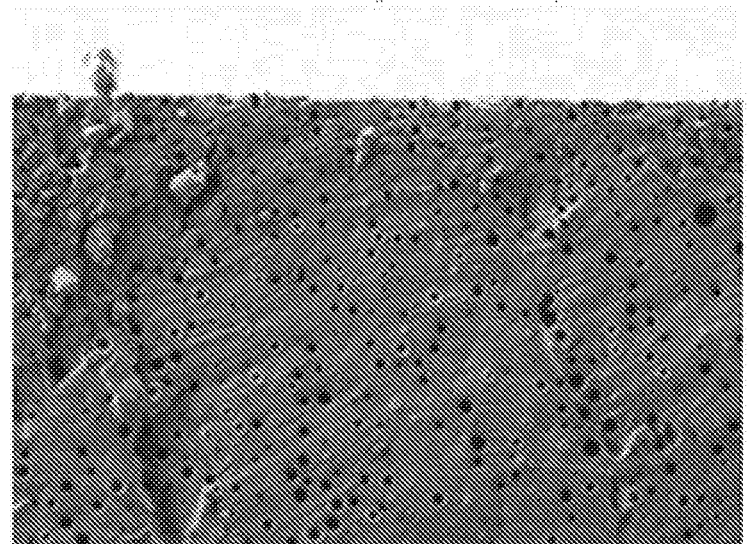
Figure 42:
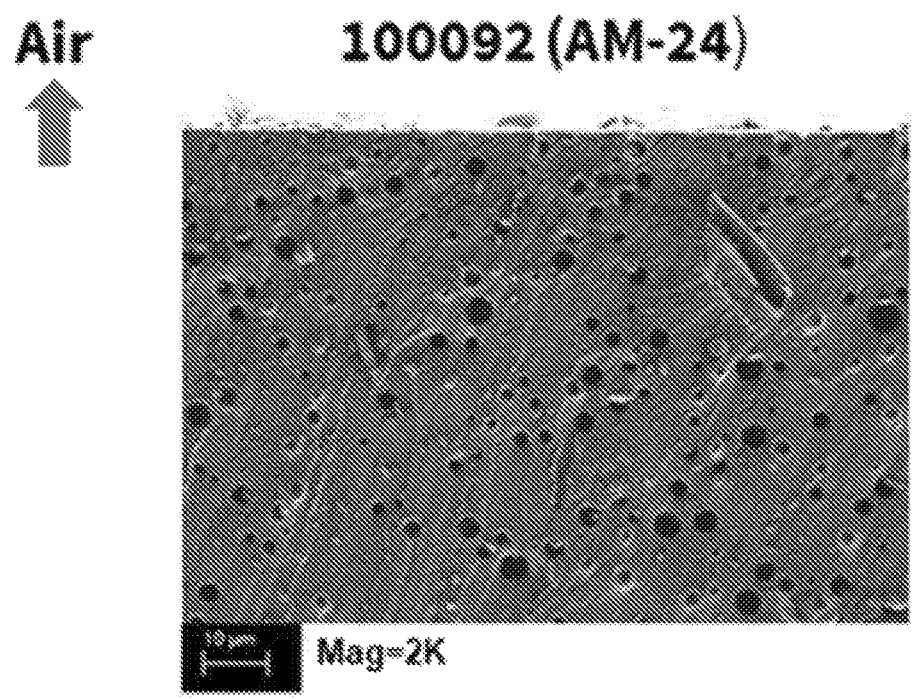

The references US20140135422A1 (Hempel), US20140170426A1 (Hempel2), and U.S. Pat. No. 9,169,359B2 (NDSU) describe silicone compounds containing only polyethylene oxide side chains (grafted) and having reactive terminal end groups. The compound described may create network structure shown in FIG. 41 providing anti-fouling performance.

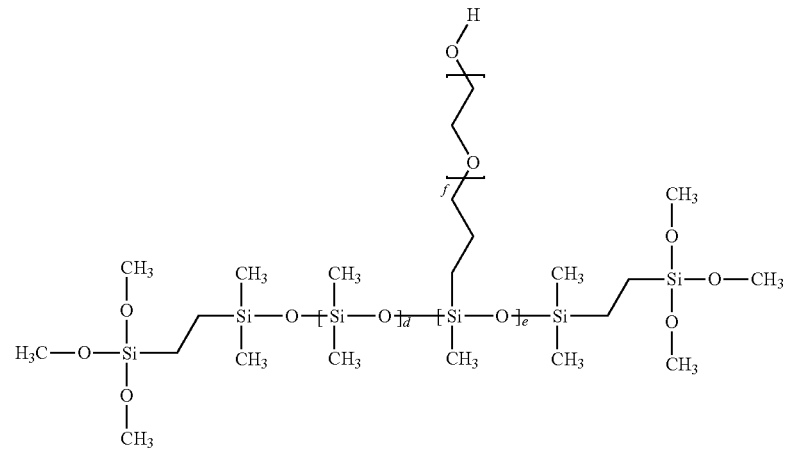

US9169359B2

-continued

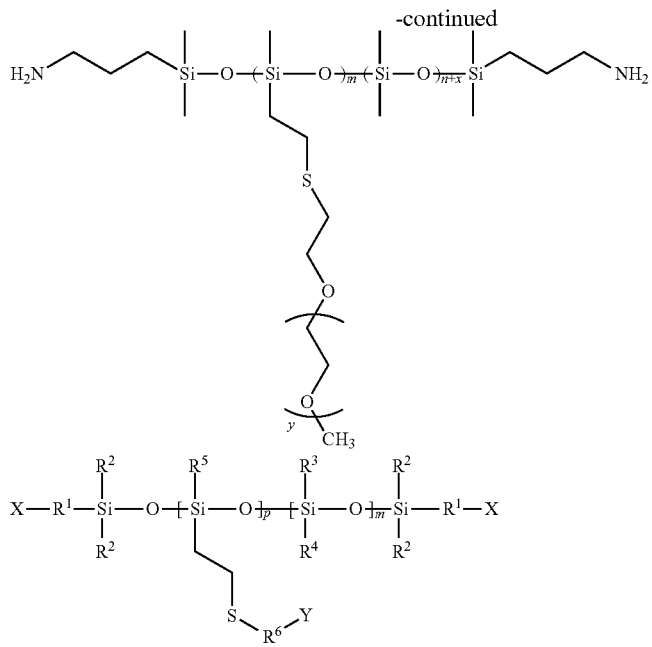

The present teaching describes a silicone compound containing variety of side chains not limited to polyethylene oxide. Further, the compound carries reactive end groups as side chain functional groups. Such compounds demonstrate great tunability in hydrophilic lipophilic balance (HLB) which controls the miscibility of the compound with other similar/dissimilar compounds. Having a slight immiscibility of the said compound with its matrix and/or lubricant, aid surface stratification of the said compound leading to greater presence of side chain groups. Such side chain groups can provide effective surface specific functions not limited to anti-fouling, anti-icing and easy clean properties.

A variety of sidechain functionalized organosiloxanes are described herein that can alleviate one or more of these challenges. For example, the sidechain functionalized organosiloxanes can include a plurality of reactive groups, either directly bound to a polyalkylene glycol sidechain or to other sidechains, to facilitate binding to a substrate or a coating resin composition. The sidechain functionalized organosiloxanes can also include a variety of "free" sidechains, i.e. sidechains that do not contain a reactive end group and are therefore capable of dynamic rearrangement. Not wishing to be bound by any particular theory, it is believed that having a polyalkylene glycol sidechain, a zwitterionic sidechain, or additional sidechain groups directly bound to the coating matrix can minimize breakdown of a hydrolytically unstable bond that could limit utility in fouling control. Not wishing to be bound by any particular theory, it is also believed that, by having dangling sidechains such as polyoxyalkylene and organosiloxane, the density and orientation of these groups on the surface can be controlled independent of the reactive groups that tether the compound to the surface. A variety of such sidechain functionalized organosiloxanes are described herein. In addition, coating compositions are described along with methods of use for coating articles and the coated articles. The compositions are particularly useful for marine biofouling, although other applications such as architectural coatings, interior surface coatings, and medical applications are also envisioned.

This disclosure describes a variety of sidechain functionalized organosiloxanes that are capable of being used in fouling resistant and/or anti-fouling coatings. In various aspects, the sidechain functionalized organosiloxanes can be used as a surface coating capable of binding directly to reactive moieties on a substrate or as part of a resin composition where the sidechain functionalized organosiloxanes are capable of binding to polymers in the resin composition. The coatings and compositions created can also include a lubricant, although this need not necessarily be the case in all aspects. In some aspects, the coatings are provided without lubricant and still exhibit fouling resistant and/or antifouling properties. However, in some aspects a liquid is included in the coatings and compositions for creating a slippery and/or nonstick surface upon coating, thereby improving the fouling resistant and/or antifouling properties of the coating.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Throughout the application, where language such as having, including, or comprising is used to describe specific components or process steps, it is contemplated that other aspects exist that consist essentially of, or consist of the specific components or process steps.

The term "substantially free" as used in this context means the reaction product and/or coating compositions contain less than 1000 parts per million (ppm), "essentially free" means less than 100 ppm and "completely free" means less than 20 parts per billion (ppb) of any of the above compounds or derivatives or residues thereof. The term "about," as used herein, means approximately, in the region of, roughly, or around. When the term "about" is used with a numerical value, it modifies that value by extending the boundaries above and below the numerical value set forth. For example, in some aspects, the term "about" is used herein to modify a numerical value above and below the stated value by a variance of ±20%, ±15%, or ±10% of the stated value. In some aspects, the term "about" can reflect traditional uncertainties in experimental measurements and/or traditional rounding according to significant figures of the numerical value.

The term "alkyl" refers to the radical of saturated aliphatic groups, including straight-chain alkyl groups, branched-chain alkyl groups, cycloalkyl (alicyclic) groups, alkyl-substituted cycloalkyl groups, and cycloalkyl-substituted alkyl groups.

In some aspects, a straight chain or branched chain alkyl has 30 or fewer carbon atoms in its backbone (e.g., $C_1$-$C_{30}$ for straight chains, $C_3$-$C_{30}$ for branched chains), 20 or fewer, 12 or fewer, or 7 or fewer. Likewise, in some embodiments cycloalkyls have from 3-10 carbon atoms in their ring structure, e.g. have 5, 6 or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, a phosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, or from one to six carbon atoms in its backbone structure. Likewise, "lower alkenyl" and "lower alkynyl" have similar chain lengths. Throughout the application, preferred alkyl groups are lower alkyls. In some embodiments, a substituent designated herein as alkyl is a lower alkyl.

It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —CF$_3$, —CN and the like. Cycloalkyls can be substituted in the same manner.

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

The term "alkylthio" refers to an alkyl group, as defined above, having a sulfur radical attached thereto. In some embodiments, the "alkylthio" moiety is represented by one of —S-alkyl, —S-alkenyl, and —S-alkynyl. Representative alkylthio groups include methylthio, and ethylthio. The term "alkylthio" also encompasses cycloalkyl groups, alkene and cycloalkene groups, and alkyne groups. "Arylthio" refers to aryl or heteroaryl groups. Alkylthio groups can be substituted as defined above for alkyl groups.

The terms "alkenyl" and "alkynyl", refer to unsaturated aliphatic groups analogous in length and possible substitution to the alkyls described above, but that contain at least one double or triple bond respectively.

The terms "alkoxyl" or "alkoxy" as used herein refers to an alkyl group, as defined above, having an oxygen radical attached thereto. Representative alkoxyl groups include methoxy, ethoxy, propyloxy, and tert-butoxy. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, and —O-alkynyl. Aroxy can be represented by —O-aryl or O-heteroaryl, wherein aryl and heteroaryl are as defined below. The alkoxy and aroxy groups can be substituted as described above for alkyl.

The terms "amine" and "amino" are art-recognized and refer to both unsubstituted and substituted amines, e.g., a moiety that can be represented by the general formula:

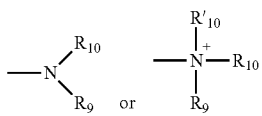

wherein $R_9$, $R_{10}$, and $R'_{10}$ each independently represent a hydrogen, an alkyl, an alkenyl, —(CH$_2$)$_m$—R$_8$ or R$_9$ and R$_{10}$ taken together with the N atom to which they are attached complete a heterocycle having from 4 to 8 atoms in the ring structure; R$_8$ represents an aryl, a cycloalkyl, a cycloalkenyl, a heterocycle or a polycycle; and m is zero or an integer in the range of 1 to 8. In some embodiments, only one of R$_9$ or R$_{10}$ can be a carbonyl, e.g., R$_9$, R$_{10}$ and the nitrogen together do not form an imide. In still other embodiments, the term "amine" does not encompass amides, e.g., wherein one of R$_9$ and R$_{10}$ represents a carbonyl. In additional embodiments, R$_9$ and R$_{10}$ (and optionally R'$_{10}$) each independently represent a hydrogen, an alkyl or cycloakyl, an alkenyl or cycloalkenyl, or alkynyl. Thus, the term "alkylamine" as used herein means an amine group, as defined above, having a substituted (as described above for alkyl) or unsubstituted alkyl attached thereto, i.e., at least one of R$_9$ and R$_{10}$ is an alkyl group.

The term "amido" is art-recognized as an amino-substituted carbonyl and includes a moiety that can be represented by the general formula:

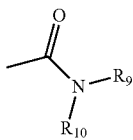

wherein $R_9$ and $R_{10}$ are as defined above.

"Aryl", as used herein, refers to C$_5$-C$_{10}$-membered aromatic, heterocyclic, fused aromatic, fused heterocyclic, biaromatic, or bihetereocyclic ring systems. Broadly defined, "aryl", as used herein, includes 5-, 6-, 7-, 8-, 9-, and 10-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics". The aromatic ring can be substituted at one or more ring positions with one or more substituents including, but not limited to, halogen, azide, alkyl, aralkyl, alkenyl, alkynyl, cycloalkyl, hydroxyl, alkoxyl, amino (or quaternized amino), nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF$_3$, —CN; and combinations thereof.

The term "aryl" also includes polycyclic ring systems having two or more cyclic rings in which two or more carbons are common to two adjoining rings (i.e., "fused rings") wherein at least one of the rings is aromatic, e.g., the other cyclic ring or rings can be cycloalkyls, cycloalkenyls, cycloalkynyls, aryls and/or heterocycles. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. One or more of the rings can be substituted as defined above for "aryl".

The term "aralkyl", as used herein, refers to an alkyl group substituted with an aryl group (e.g., an aromatic or heteroaromatic group).

The term "carbocycle", as used herein, refers to an aromatic or non-aromatic ring in which each atom of the ring is carbon.

"Heterocycle" or "heterocyclic", as used herein, refers to a cyclic radical attached via a ring carbon or nitrogen of a monocyclic or bicyclic ring containing 3-10 ring atoms, and preferably from 5-6 ring atoms, consisting of carbon and one to four heteroatoms each selected from the group consisting of non-peroxide oxygen, sulfur, and N(Y) wherein Y is absent or is H, O, ($C_1$-$C_{10}$) alkyl, phenyl or benzyl, and optionally containing 1-3 double bonds and optionally substituted with one or more substituents. Examples of heterocyclic ring include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxepanyl, oxetanyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydropyranyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. Heterocyclic groups can optionally be substituted with one or more substituents at one or more positions as defined above for alkyl and aryl, for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, and —CN.

The term "carbonyl" is art-recognized and includes such moieties as can be represented by the general formula:

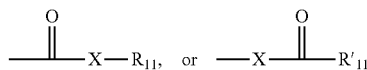

wherein X is a bond or represents an oxygen or a sulfur, and $R_{11}$ represents a hydrogen, an alkyl, a cycloalkyl, an alkenyl, an cycloalkenyl, or an alkynyl, $R'_{11}$ represents a hydrogen, an alkyl, a cycloalkyl, an alkenyl, an cycloalkenyl, or an alkynyl. Where X is an oxygen and $R_{11}$ or $R'_{11}$ is not hydrogen, the formula represents an "ester". Where X is an oxygen and $R_{11}$ is as defined above, the moiety is referred to herein as a carboxyl group, and particularly when $R_{11}$ is a hydrogen, the formula represents a "carboxylic acid". Where X is an oxygen and $R'_{11}$ is hydrogen, the formula represents a "formate". In general, where the oxygen atom of the above formula is replaced by sulfur, the formula represents a "thiocarbonyl" group. Where X is a sulfur and $R_{11}$ or $R'_{11}$ is not hydrogen, the formula represents a "thioester." Where X is a sulfur and $R_{11}$ is hydrogen, the formula represents a "thiocarboxylic acid." Where X is a sulfur and $R'_{11}$ is hydrogen, the formula represents a "thioformate." On the other hand, where X is a bond, and $R_{11}$ is not hydrogen, the above formula represents a "ketone" group. Where X is a bond, and $R_{11}$ is hydrogen, the above formula represents an "aldehyde" group.

The term "monoester" as used herein refers to an analogue of a dicarboxylic acid wherein one of the carboxylic acids is functionalized as an ester and the other carboxylic acid is a free carboxylic acid or salt of a carboxylic acid. Examples of monoesters include, but are not limited to, to monoesters of succinic acid, glutaric acid, adipic acid, suberic acid, sebacic acid, azelaic acid, oxalic and maleic acid.

The term "heteroatom" as used herein means an atom of any element other than carbon or hydrogen. Examples of heteroatoms are boron, nitrogen, oxygen, phosphorus, sulfur and selenium. Other heteroatoms include silicon and arsenic.

As used herein, the term "nitro" means —$NO_2$; the term "halogen" designates —F, —Cl, —Br or —I; the term "sulfhydryl" means —SH; the term "hydroxyl" means —OH; and the term "sulfonyl" means —$SO_2$—.

The term "substituted" as used herein, refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, aminoacid, peptide, and polypeptide groups.

Heteroatoms such as nitrogen may have hydrogen substituents and/or any permissible substituents of organic compounds described herein which satisfy the valences of the heteroatoms. It is understood that "substitution" or "substituted" includes the implicit proviso that such substitution is in accordance with permitted valence of the substituted atom and the substituent, and that the substitution results in a stable compound, i.e. a compound that does not spontaneously undergo transformation such as by rearrangement, cyclization, elimination, etc.

In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. The heteroatoms such as nitrogen may have hydrogen substituents and/or any permissible substituents of organic compounds described herein which satisfy the valencies of the heteroatoms.

In various embodiments, the substituent is selected from alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydroxyl, ketone, nitro, phosphate, sulfide, sulfinyl, sulfonyl, sulfonic acid, sulfonamide, and thioketone, each of which optionally is substituted with one or more suitable substituents. In some embodiments, the substituent is selected from alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone, wherein each of the alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone can be further substituted with one or more suitable substituents.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, thioketone, ester, heterocyclyl, —CN, aryl, aryloxy, perhaloalkoxy, aralkoxy, heteroaryl, heteroaryloxy, heteroarylalkyl, heteroaralkoxy, azido, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, al kylaminoalkylcarboxy, aminocarboxamidoalkyl, cyano, alkoxyalkyl, perhaloalkyl, arylalkyloxyalkyl, and the like. In some embodiments, the substituent is selected from cyano, halogen, hydroxyl, and nitro.

As used herein, an "analog", or "analogue" of a chemical compound is a compound that, by way of example, resembles another in structure but is not necessarily an isomer (e.g., 5-fluorouracil is an analog of thymine).

As used herein, a "derivative" of a compound refers to any compound having the same or a similar core structure to the compound but having at least one structural difference, including substituting, deleting, and/or adding one or more atoms or functional groups. The term "derivative" does not mean that the derivative is synthesized from the parent compound either as a starting material or intermediate, although this may be the case. The term "derivative" can include replacement of H by an alkyl, acyl, or amino group or a substituent described above. Derivatives can include compounds in which carboxyl groups in the parent compound have been derivatized to form salts, methyl and ethyl esters or other types of esters or hydrazides. Derivatives can include compounds in which hydroxyl groups in the parent compound have been derivatized to form O-acyl or O-alkyl derivatives. Derivatives can include compounds in which a hydrogen bond donating group in the parent compound is replaced with another hydrogen bond donating group such as OH, NH, or SH. Derivatives can include replacing a hydrogen bond acceptor group in the parent compound with another hydrogen bond acceptor group such as esters, ethers, ketones, carbonates, tertiary amines, imine, thiones, sulfones, tertiary amides, and sulfides.

Unless otherwise indicated, the term "polymer" includes both homopolymers and copolymers (e.g., polymers of two or more different monomers) and oligomers. Similarly, unless otherwise indicated, the use of a term designating a polymer class is intended to include homopolymers, copolymers and graft copolymers.

The term "molecular weight", as used herein, generally refers to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight (Mw) as opposed to the number-average molecular weight (Mn). Capillary viscometry provides estimates of molecular weight as the inherent viscosity determined from a dilute polymer solution using a particular set of concentration, temperature, and solvent conditions.

The term "small molecule", as used herein, generally refers to an organic molecule that is less than 2000 g/mol in molecular weight, less than 1500 g/mol, less than 1000 g/mol, less than 800 g/mol, or less than 500 g/mol. Small molecules are non-polymeric and/or non-oligomeric.

The term "hydrophilic", as used herein, refers to substances that have strongly polar groups that readily interact with water. Hydrophilic polymers can include acrylic acid homo- and co-polymers such as acrylamide, and maleic anhydride polymers and copolymers; amine-functional polymers such as allylamine, ethyleneimine, oxazoline, and other polymers containing amine groups in their main- or side-chains. The term hydrophilic, when used to refer to a polymer or oligomer, can mean a polymer or oligomer having a relative energy difference (RED=$R_a/R_0$, where $R_a$=Polymer/Solvent HSP Distance, $R_0$=Polymer Solubility Sphere Radius) of equal or less than 1 with respect to water in Hansen solubility space at 25° C. As used herein, with reference to a sidechain or substituent, the term hydrophilic is used to characterize the sidechain or substituent without consideration for what the sidechain or substituent is attached to. For example, when the specification refers to a polymer backbone having a hydrophilic sidechain attached thereto, this means that the sidechain, when not bonded to the polymer backbone to which the sidechain is attached and when the broken bond is replaced with a hydrogen to satisfy the valence, the sidechain is hydrophilic as that term is used herein even if the overall polymer (polymer backbone having the hydrophilic sidechain attached thereto) is not.

The term "hydrophobic", as used herein, refers to substances that lack an affinity for water; tending to repel and not absorb water as well as to not readily dissolve in or mix with water. The term hydrophobic, when used to refer to a polymer or oligomer, can mean a polymer or oligomer having a relative energy difference (RED=$R_a/R_0$, where $R_a$=Polymer/Solvent HSP Distance, $R_0$=Polymer Solubility Sphere Radius) greater than 1 with respect to water in Hansen solubility space at 25° C. As used herein, with reference to a sidechain or substituent, the term hydrophobic is used to characterize the sidechain or substituent without consideration for what the sidechain or substituent is attached to. For example, when the specification refers to a polymer backbone having a hydrophobic sidechain attached thereto, this means that the sidechain, when not bonded to the polymer backbone to which the sidechain is attached and when the broken bond is replaced with a hydrogen to satisfy the valence, the sidechain is hydrophobic as that term is used herein even if the overall polymer (polymer backbone having the hydrophobic sidechain attached thereto) is not.

The term "amphiphilic", as used herein, refers to a molecule combining hydrophilic and lipophilic (hydrophobic) properties. "Amphiphilic material" as used herein refers to a material containing a hydrophobic or more hydrophobic oligomer or polymer (e.g., biodegradable oligomer or polymer) and a hydrophilic or more hydrophilic oligomer or polymer. The term amphiphilic can refer to a polymer or oligomer having one or more hydrophobic oligomer segments and one or more hydrophilic oligomer segments as those terms are defined above.

The term "fouling resistant," as used herein, refers to a material or a surface that effectively prevents accumulation of unwanted materials such as biofouling and marine fouling organisms without necessarily killing them.

The term "antifouling," as used herein, refers to a material or a surface that effectively prevents accumulation of unwanted materials such as biofouling and marine fouling organisms through the action of killing them.

The term "foul release", as used herein, refers to a surface that effectively releases accumulated materials such as biofouling and marine fouling organisms by a shear force or agitation or cleaning.

The term "Surface Active Polymers (SAPs)", as used herein, refers to an amphiphilic polymeric molecule having similar properties to a small molecule surfactant. SAPs have both hydrophobic part and hydrophilic part in one polymeric molecule. One example of SAPs is a polymeric architecture with a hydrophobic backbone (e.g. polysiloxane) with one or more hydrophilic sidechains (e.g. PEG) grafted from the backbone. Another example of SAPs is a block-co-polymer architecture comprising a hydrophobic segment and a hydrophilic segment. SAPs introduced into a binder or film forming system tend to spontaneously segregate from the binder to form a stratified film or coating and present themselves at the surface. The process is driven by phase separation due to mismatched compatibility or poor solubility in the binder, minimization of interfacial energy during solidification, buoyancy due to density difference, and combinations thereof. SAPs can thus be designed and used to impart new physical or chemical properties at the surface of a film or coating that the binder alone cannot provide.

The term "dynamic wetting", as used herein, refers to a property of a surface displaying dynamically changing wetting properties when exposed from one medium to another medium. One such example is the value of water contact angle changing from a steady value (e.g. the moment when a droplet of water is applied to a surface exposed to ambient air) to another steady value (e.g. the surface underneath the applied water droplet is now exposed to water) over a time period. The dynamic wetting property can sometimes be reversible (e.g. a surface initially exposed to water is later exposed to a different medium such as air or oil) or can have hysteresis or can be irreversible depending on the characteristics of the surface. The time scale of such dynamic wetting behavior may be observed within fractions of second, from 1 to 5 seconds, from 5 to 20 seconds, from 20 to 60 seconds, from 60 to 300 seconds, or over 300 seconds.

The term "biocidal group or biocidal moiety", as used herein, refers to either a tethered chemical functional group or a tethered chemical moiety known to have biocidal effect (kills organisms) if it was not tethered and freely exposed to organisms.

The term "zwitterion", as used herein, refers to a molecule, a compound, substituent, or functional group, although it has a net formal charge of zero, has two atoms one of which has a net negative charge and one of which has a net positive charge at a neutral pH, at a pH of about 2 to 10, about 3 to 9, or about 4 to 9, or about 5 to 8.5. When referring to a substituent or functional group, the term zwitterionic is used to refer to the net charges when the substituent or functional group is in its intended state in the final molecule.

The term "Active Performance Ingredient(s) (APIs)", as used herein, refers to a molecule or combination of molecules that individually or collectively improves the antifouling or fouling release performance of a coating when added to the coating formulation. One example of API is a reactive polymeric amphiphile (SAP) which can be added to a resin system, including but not limited to silicone, epoxy or polyurethane, to improve fouling release performance. Another example of APIs is a blend of reactive polymeric amphiphile (SAP) and unreactive polymeric amphiphilic lubricants which can be added to a resin system, including but not limited to silicone, epoxy or polyurethane, to improve fouling release performance.

Sidechain Functionalized Organosiloxanes and Methods of Making Thereof

This disclosure describes a variety of sidechain functionalized organosiloxanes that are capable of being used in fouling resistant and/or anti-fouling coatings. The unique design of these sidechain functionalized organosiloxanes provides flexibility to effectively partition protein resistant groups to the surface while minimizing hydrolytic degradation of their performance. The modular design enables balancing the surface hydrophilicity/hydrophobicity, adjusting the chemistry to covalently attach the hydrophilic or hydrophobic sidechains to various matrix chemistries making it useful in a variety of coatings.

In various aspects, the sidechain functionalized organosiloxanes are provided having a tethering point through one or more hydrophilic moieties (e.g. PEG, ZW) with a reactive end group, providing stable anchoring of SAPs to a polyorganosiloxane polymer as a backbone, while the silicone backbone allows for effective surface partitioning of sidechain functionalized organosiloxanes when introduced in a binder matrix. The sidechain functionalized organosiloxanes can also have one or more modular side groups/chains with hydrophilic (e.g. PEG) and/or hydrophobic (e.g. alkyl trimethyl silane (TMS)) properties.

In various aspects, the sidechain functionalized organosiloxanes have one or more modular side groups/chains such as hydrophilic (PEG, ZW) and hydrophobic short chain polysiloxane side groups, both providing amphiphilic dangling end sidechains.

In various aspects, the sidechain functionalized organosiloxanes are capable of tethering through one or more reactive end groups that are reactive to conventional silicone, polyurethane and epoxy binder chemistries, providing stable anchoring of sidechain functionalized organosiloxanes while the silicone backbone allows for greater surface partitioning and rearrangement. The sidechain functionalized organosiloxanes can also have one or more modular groups selected from hydrophilic (PEG, ZW) and/or short chain polysiloxanes.

In some aspects, when the sidechain functionalized organosiloxanes are incorporated into a coating, the sidechain functionalized organosiloxanes allow themselves to stratify in the coating during curing such that a greater surface presence of hydrophilic (e.g. PEG, ZW) groups can be achieved as compared to similar coatings containing silicone-PEG block co-polymers or PEG grafted silicone structures. Therefore a coating system comprising a sidechain functionalized organosiloxanes can achieve controlled surface compositions generated in situ through stratification and present an advantage over alternative systems which attempt to achieve such structures with distinct silicone and PEG chains in an uncontrolled way.

In various aspects, the sidechain functionalized organosiloxanes include reactive end groups that can be utilized for multiple crosslinking chemistries (alkoxy silane, 2° amine, 1° alcohol and a combination thereof). The versatility of the reactivity combined with amphiphilic character makes it possible to provide biofouling control in multiple binder systems (e.g. epoxy-amine, condensation cure silicone, polyurethane, polyurea).

In some aspects, a sidechain functionalized organosiloxane compound is provided having (i) a first end and a second end; (ii) a polysiloxane backbone connecting the first end to the second end; and (iii) a first plurality of sidechains covalently attached to the polysiloxane backbone and a second plurality of sidechains covalently attached to the polysiloxane backbone; wherein the sidechains in the first plurality of sidechains have a chemical structure different from a chemical structure of the second plurality of sidechains. The first plurality of sidechains can include polyalkylene glycol sidechains, polyalkylene glycol sidechain ending with a zwitterionic functional group. In some aspects, the second plurality of sidechains can include organosiloxane sidechains, polyalkyl sidechains, polyalkylene glycol, sidechains with a zwitterionic functional group, sidechains with a biocidal functional group, or sidechains that are different from the first plurality of sidechains. The sidechains, both the first plurality of sidechains and the second plurality of sidechains, can include a tethered end covalently attached to the polysiloxane backbone and a free end opposite to the tethered end. The free end in one or both of the first plurality of sidechains and the second plurality of sidechains can include a reactive end group capable of reacting to bind the compound to a surface (e.g. binding directly to a substrate or binding to a polymer in a coating composition). In some aspects, where both the first plurality of sidechains and the second plurality of sidechains include a reactive end group, the compound also includes a third plurality of sidechains without a reactive end group.

In some aspects, the polyalkylene glycol sidechains described herein can include poly(ethylene glycol), poly(propylene glycol), poly(ethylene glycol-ran-propylene glycol), poly(ethylene glycol-block-propylene glycol), poly(butylene glycol), co-polymers containing poly(butylene glycol), and a combination thereof.

In some aspects, the ends of the functionalized organosiloxane compound are not reactive with the surface of the substrate and/or are not reactive with the resin chemistry, meaning the ends do not react to form a covalent bond when tethering the compound to the surface. This allows the reactive end groups of the sidechains to be the only reactive components tethering the compounds to the surface. In some aspects, the ends are nonreactive with silicone condensation cure chemistry, are nonreactive with platinum addition cure silicone chemistry, are nonreactive with epoxy cure chemistry, and/or are nonreactive with polyurethane chemistry.

The sidechains, or at least some of the sidechains, do include a reactive end group allowing for the compounds to react to form a covalent bond with the surface and/or with the polymers in the base resin. In some aspects, the sidechains include a reactive end group selected from a group that can undergo 1) addition cure chemistry, 2) condensation cure chemistry, 3) hydrosilylation chemistry, 4) epoxy chemistry, 5) urethane/urea chemistry. In additional aspects, the reactive end group can be selected from alkoxy, enoxy, oxime, primary amine, secondary amine, ethoxy silane, methoxy silane, acetoxy silane, vinyl groups, hydrides, epoxide groups, isocyanate groups, hydroxyl groups, and (meth)acrylate groups. In additional aspects, the reactive end group can be selected from a group that can adhere to a solid substrate including but not limited to a thiol, a carboxylic acid and its esters or anhydrides, an alkoxy silane, a chlorosilane, a phosphonic or phosphinic or phosphoric acid and its esters or anhydrides, an azide, an alkyne, an alkene, an aldehyde, an acetal, and bio-derived or bioconjugates for binding such as catechols and catecholamines.

The sidechain functionalized organosiloxane compounds will generally include some sidechains that have the reactive end group and other side chains that do not have the reactive end group, i.e. sidechains that do not form covalent bonds to the surface or to the base resin and therefore remain "free". Both types of sidechains are anchored to a polysiloxane chain that can rotate easily at room temperature. Therefore these (polar) sidechains have the tendency to dynamically present themselves at the surface (when exposed to water) providing fouling-resistant, anti-fouling, and/or foul release properties to the surface. Exemplary sidechain functionalized organosiloxane compound can include those having a structure according to any one of the following formulas:

AM-14

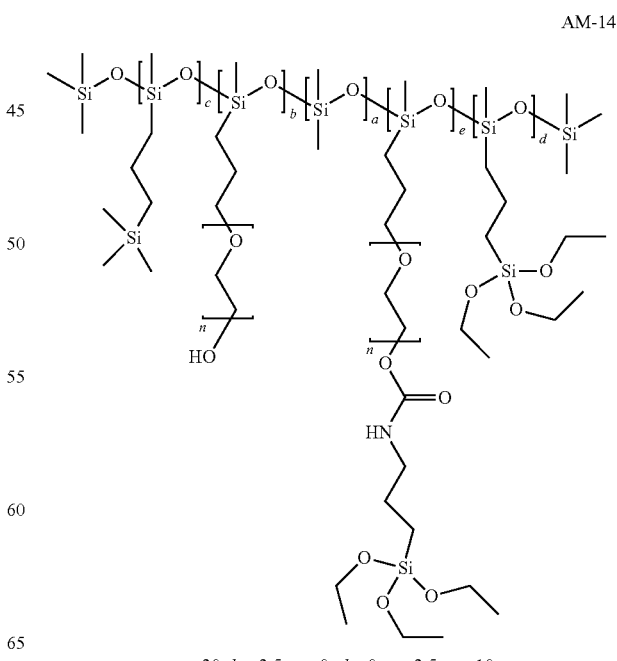

$a = \sim 30, b \sim 3.5, c = 0, d = 0, e \sim 3.5, n \sim 10$

AM-24

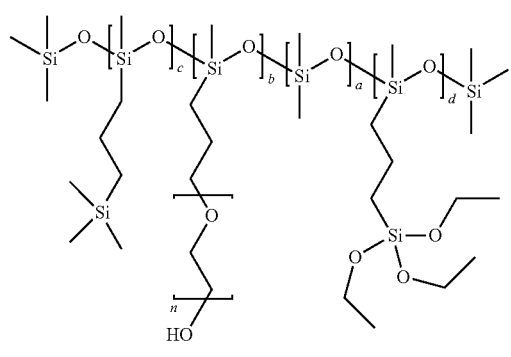

$a = 0, b = 16, c = 14, d = 2, n = 10$

AM-22

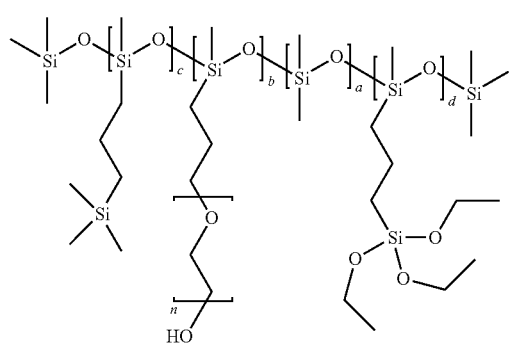

$a = 19, b = 3, c = 3, d = 2, n = 10$

AM-21

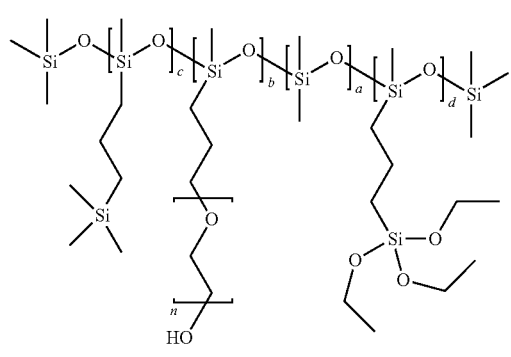

$a = 19, b = 0, c = 6, d = 2, n = 10$

AM-20

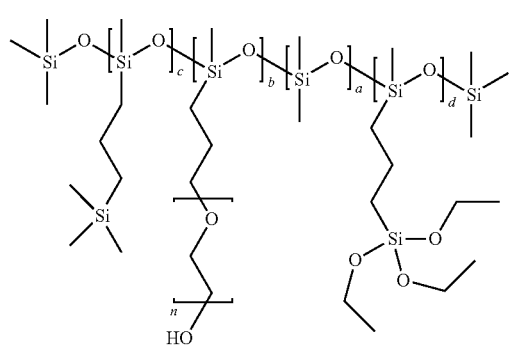

$a = 19, b = 6, c = 0, d = 2, n = 10$

AM-42

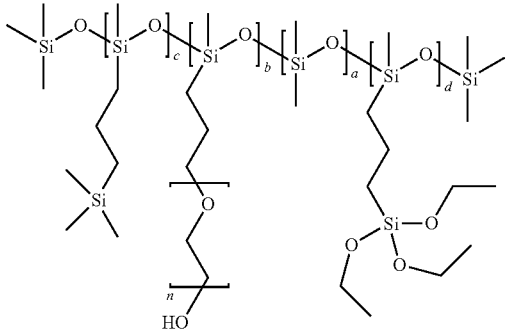

$a = 0, b = 3.2, c = 26.8, d = 2, n = 10$

AM-41

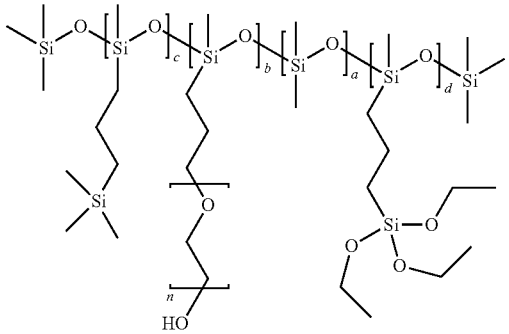

$a = 0, b = 8, c = 22, d = 2, n = 10$

AM-30

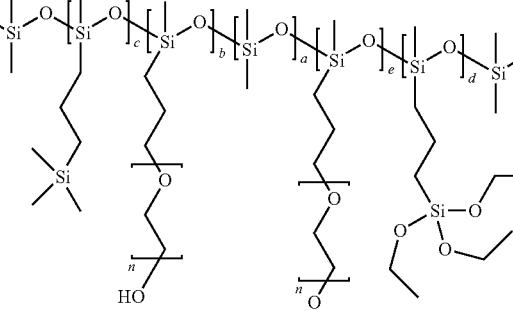

$a = 0, b = 16, c = 14, d = 0, e = 2, n = 10$ where each occurrence of n is independently an integer from 6 to 25;

where each occurrence of b is independently an integer from 2 to 12;

where each occurrence of a is independently an integer from 2 to 20;

where each occurrence of d is independently an integer from 1 to 10; and where each occurrence of c is independently an integer from 2 to 20.

In some aspects, a sidechain functionalized organosiloxane compound is provided including a polysiloxane backbone having a first plurality of repeat units having a structure according to Formula 3 and a second plurality of repeat units having a structure according to Formula 4

Formula 3

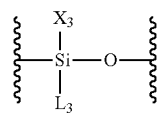

Formula 4

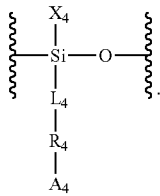

In Formula 3 and Formula 4, each occurrence of $X_3$ and $X_4$ can independently be a substituted or unsubstituted alkyl, a substituted or unsubstituted heteroalkyl, a substituted or unsubstituted phenyl, or a combination thereof. In some aspects, each occurrence of $X_3$ and $X_4$ are independently —$CH_3$, —$CH_2CH_3$, —$CH_2CH_2CF_3$, or phenyl.

In Formula 3 and Formula 4, each occurrence of $L_3$ and $L_4$ can independently be none, a substituted or unsubstituted alkyl, or a substituted or unsubstituted heteroalkyl. In some aspects, each occurrence of $L_3$ and $L_4$ are independently none, $C_1$-$C_6$ alkyl, $C_2$-$C_6$ alkyl, $C_1$-$C_4$ alkyl, $C_1$-$C_6$ heteroalkyl, $C_2$-$C_6$ heteroalkyl, or $C_1$-$C_4$ heteroalkyl. In some aspects, the alkyl or heteroalkyl can be substituted with one or more substituents such as methyl, hydroxyl, or fluoro substituents.

In Formula 3, each occurrence of $R_3$ can independently be a hydrophilic polyalkylene glycol. In some aspects, each occurrence of $R_3$ is independently —$(OCH_2CH_2)_{n2}$— or —$(OCH_2CH_2CH_2)_{n2}$— where n2 is an integer from 1 to 30, from 1 to 22, from 3 to 20, from 5 to 20, from 5 to 18, from 6 to 25, from 6 to 12, or from 12 to 18. In some aspects, each occurrence of $R_3$ is a polyethylene glycol or polypropylene glycol having from 6 to 12, from 12 to 18, or from 6 to 25 repeat units. In Formula 4, each occurrence of $R_4$ can independently be an organosiloxane, a fluoroalkyl, or a hydrophilic polyalkylene glycol. In some aspects, $R_4$ includes a polyalkylene glycol such as —$(OCH_2CH_2)_{n2}$— or —$(OCH_2CH_2CH_2)_{n2}$— where n2 is an integer from 1 to 30, from 1 to 22, from 3 to 20, from 5 to 20, from 5 to 18, from 6 to 25, from 6 to 12, or from 12 to 18. In some aspects, $R_4$ is a polyethylene glycol or polypropylene glycol having from 6 to 12, from 12 to 18, or from 6 to 25 repeat units. In some aspects, $R_4$ is independently —$Si(CH_3)_2$—, —$Si(CH_2CH_3)_2$—, —$[Si(CH_3)_2$—O-$]_{n3}$-, —$[Si(CH_2CH_3)_2$—O-$]_{n3}$—, or —$(CF_2)_{n3}$—, where n3 is an integer from 1 to 20, from 1 to 12, from 1 to 10, from 2 to 12, from 2 to 10, from 2 to 8, or from 6 to 12.

In Formula 3 and Formula 4, each occurrence of $A_3$ and $A_4$ can independently be a $C_1$-$C_{10}$ alkyl, a $C_1$-$C_8$ alkyl, a $C_1$-$C_8$ alkyl, a $C_1$-$C_3$ alkyl, a $C_2$-$C_6$ alkyl, a $C_3$-$C_8$ alkyl, a $C_1$-$C_{10}$ fluoroalkyl, a $C_1$-$C_8$ fluoroalkyl, a $C_1$-$C_8$ fluoroalkyl, a $C_2$-$C_8$ fluoroalkyl, a $C_3$-$C_8$ fluoroalkyl, a $C_1$-$C_3$ fluoroalkyl, a hydroxyl, or a reactive end group selected from the group consisting of alkoxy, enoxy, oxime, primary amine, secondary amine, ethoxy silane, methoxy silane, and acetoxy silane groups that are reactive for silicone condensation cure chemistry; vinyl groups that are reactive for platinum addition cure silicone chemistry; epoxide groups reactive with epoxy chemistry; —$NH_2$ groups reactive with epoxy and polyurethane chemistry; —NCO and —OH groups reactive with polyurethane chemistry; thiols, alkynes, and azides for click chemistry; thiols for binding to coinage metals; carboxylic acids, phosphonic acids, phosphoric acids, phosphinic acids, phosphonate, phosphates, phosphinates for binding to a metal or metal oxide surface; and bio-derived or bioconjugates for binding such as catechols, catecholamines, . . . so long as at least one of $A_3$ and $A_4$ is a reactive end group. In some aspects of Formula 3 and Formula 4, if $R_3$ and $R_4$ are both hydrophilic polyalkylene glycol, then at least one of $A_3$ and $A_4$ is a $C_1$-$C_{10}$ alkyl, a $C_1$-$C_8$ alkyl, a $C_1$-$C_5$ alkyl, a $C_1$-$C_3$ alkyl, a $C_2$-$C_8$ alkyl, a $C_3$-$C_8$ alkyl, a $C_1$-$C_{10}$ fluoroalkyl, a $C_1$-$C_8$ fluoroalkyl, a $C_1$-$C_5$ fluoroalkyl, a $C_2$-$C_8$ fluoroalkyl, a $C_3$-$C_8$ fluoroalkyl, a $C_1$-$C_3$ fluoroalkyl, or a hydroxyl. In some aspects of Formula 3 and Formula 4, each occurrence of $A_3$ and/or $A_4$ can be selected from the group —OH, —$Si(OCH_2CH_3)_3$, —$Si(OCH_3)_3$, and

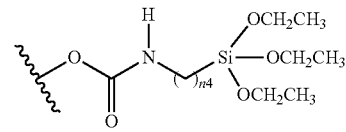

where n4 is an integer from 1 to 10, 1 to 8, 1 to 7, 2 to 7, 3 to 7, or 3 to 8.

In some aspects, a sidechain functionalized organosiloxane compound is provided having a structure according to the following Formula I Formula I

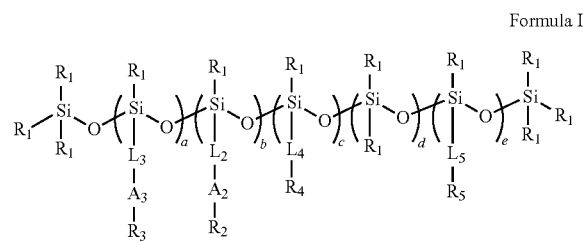

where a is in integer from 0 to 50, b is an integer from 0 to 50, c is an integer from 0 to 50, d is an integer from 0 to 100, and e is an integer from 0 to 20 so long as a+e is greater than or equal to 1 and $R_1$, $R_2$, $R_3$, $R_4$, $R_5$, $L_2$, $L_3$, $L_4$, $L_5$, $A_z$, and $A_3$ are as described below.

In some aspects, a sidechain functionalized organosiloxane compound is provided having a structure according to the following Formula II Formula II

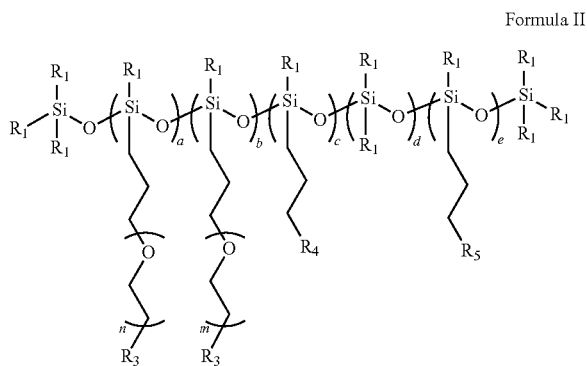

where a is in integer from 0 to 50, b is an integer from 0 to 50, c is an integer from 0 to 50, d is an integer from 0 to 100, and e is an integer from 0 to 20 so long as a+e is greater than or equal to 1 and $R_1$, $R_2$, $R_3$, $R_4$, and $R_5$, are as described below.

In Formula I and Formula II above, each occurrence of $R_1$ can independently be a substituted or unsubstituted $C_1$-$C_{12}$ alkyl, a substituted or unsubstituted $C_1$-$C_7$ alkyl, a substituted or unsubstituted $C_1$-$C_5$ alkyl, a substituted or unsubstituted $C_2$-$C_6$ alkyl, a substituted or unsubstituted $C_1$-$C_{12}$ heteroalkyl, a substituted or unsubstituted $C_1$-$C_7$ heteroalkyl, a substituted or unsubstituted $C_1$-$C_5$ heteroalkyl, a substituted or unsubstituted $C_2$-$C_6$ heteroalkyl, or a substituted or unsubstituted phenyl. In some aspects, each occurrence of $R_1$ is independently $CH_3$, —$CH_2$—$CH_3$, —$CH_2$—$CH_2$—$CF_3$, or phenyl.

In Formula I and Formula II above, each occurrence of $R_2$ can independently be a substituted or unsubstituted $C_1$-$C_5$ alkyl, a substituted or unsubstituted $C_1$-$C_5$ heteroalkyl, or a hydroxyl. In some aspects, R2 is a methyl or a hydroxyl.

In Formula I and Formula II above, each occurrence of $R_3$ is independently a reactive end group selected from the group consisting of alkoxy, enoxy, oxime, primary amine, secondary amine, ethoxy silane, methoxy silane, and acetoxy silane groups that are reactive for silicone condensation cure chemistry; vinyl groups that are reactive for platinum addition cure silicone chemistry; epoxide groups reactive with epoxy chemistry; —$NH_2$ groups reactive with epoxy and polyurethane chemistry; and —NCO and —OH groups reactive with polyurethane chemistry. In some aspects, each occurrence of $R_3$ is independently a methoxy silane, ethoxy silane, or acetoxy silane.

In Formula I and Formula II above, each occurrence of $R_4$ can independently be a substituted or unsubstituted organosiloxane or a substituted or unsubstituted alkyl or any other non-reactive sidechains. In some aspects, each occurrence of $R_4$ is independently —$Si(CH_3)_3$, —$Si(CH_2CH_3)_3$, —$[Si(CH_3)_2$—O—$]_{n3}$—$Si(CH_3)_3$, —$[Si(CH_2CH_3)_2$—O—$]_{n3}$—$Si(CH_3)_3$, —$CF_3$, or —$(CF_2)_{n3}$—$CF_3$, where n3 is an integer from 1 to 10.

In Formula I and Formula II above, each occurrence of $R_5$ can independently be a reactive end group selected from the group consisting of alkoxy, enoxy, oxime, primary amine, secondary amine, ethoxy silane, methoxy silane, and acetoxy silane groups that are reactive for silicone condensation cure chemistry; vinyl groups that are reactive for platinum addition cure silicone chemistry; epoxide groups reactive with epoxy chemistry; —$NH_2$ groups reactive with epoxy and polyurethane chemistry; and —NCO and —OH groups reactive with polyurethane chemistry. In some aspects, each occurrence of $R_5$ is independently is independently a methoxy silane, ethoxy silane, or acetoxy silane.

In Formula I above, each occurrence of $L_2$, $L_3$, $L_4$, and $L_5$ can independently be a substituted or unsubstituted $C_1$-$C_{12}$ alkyl or a substituted or unsubstituted $C_1$-$C_{12}$ heteroalkyl. In some aspects, each occurrence of $L_2$, $L_3$, $L_4$, and $L_5$ is independently a $C_1$-$C_5$ alkyl.

In Formula I above, each occurrence of $A_2$ and $A_3$ can independently be a substituted or unsubstituted hydrophilic polyalkylene glycol. In some aspects, each occurrence of $A_2$ is —$(O(CH_2)_o)_m$— and each occurrence of $A_3$ is —$(O(CH_2)_o)_n$— where m is an integer from 2 to 20, n is an integer from 2 to 20, and o is an integer from 2 to 4.

In some aspects of Formula I and Formula II above, a sum of a+b+c+d+e is about 20 to about 50, about 25 to about 35 about 35 to about 45, about 20 to about 30, or about 30 to about 40.

In some aspects of Formula I and Formula II above, e is about 1 to 10, about 1 to 8, about 1 to 5, about 2, 3, 4, 5, or 6. In some aspects of Formula I and Formula II above, a is 0. In some aspects of Formula I and Formula II above, d is about 10 to 30, about 15 to 25, or about 17 to 23 and e is about 1, 2, 3, 4, or 5. In some aspects of Formula I and Formula II above, b is about 1 to 30, about 1 to 20, 2 to 20, about 2 to 18, about 2 to 12, or about 12 to 20. In some aspects of Formula I and Formula II above, c is about 1 to 30, about 1 to 20, 2 to 20, about 2 to 18, about 2 to 12, or about 12 to 20. In some aspects of Formula I and Formula II above, a is 0, b is 3 to 10, c is 0, d is 15 to 25, and e is 1 to 5. In some aspects of Formula I and Formula II above, a is 0, b is 0, c is 3 to 10, d is 15 to 25, and e is 1 to 5. In some aspects of Formula I and Formula II above, a is 0, b is 1 to 5, c is 1 to 5, d is 15 to 25, and e is 1 to 5. In some aspects of Formula I and Formula II above, a is 0, b is 15 to 25, c is 15 to 25, d is 0, and e is 1 to 5.

Introduce ZW and BX according to Formula I and II.

In some aspects, a biocidal functionalized organosiloxane is provided having a structure according to the following formula:

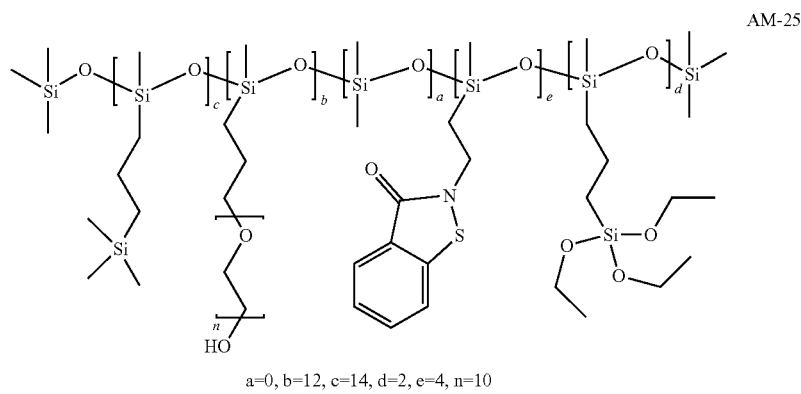

AM-25 a=0, b=12, c=14, d=2, e=4, n=10

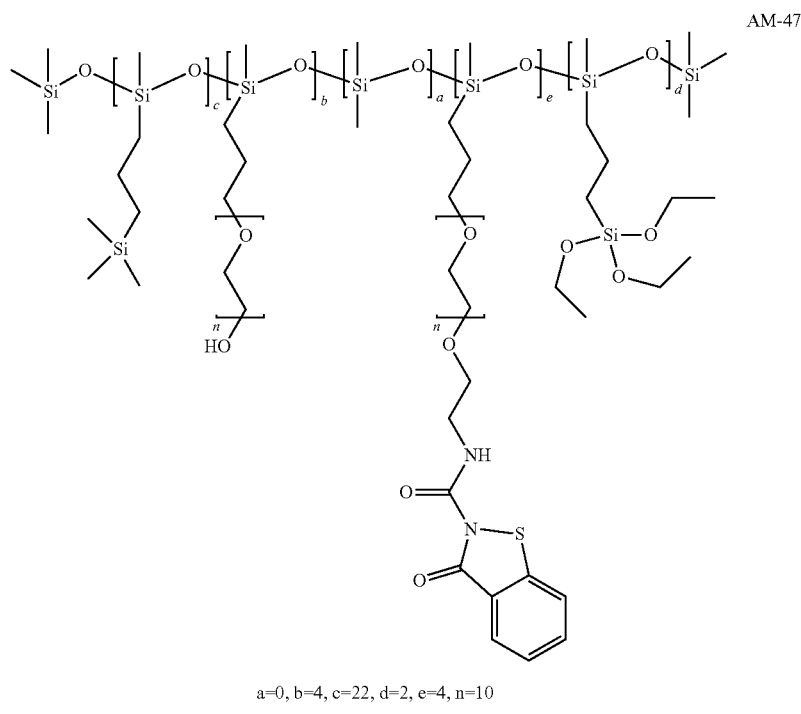

AM-47 a=0, b=4, c=22, d=2, e=4, n=10 where n is an integer from 6 to 20;

where b is an integer from 2 to 20, preferably from 8 to 16;

where c is an integer from 0 to 20, preferably from 8 to 16;

where d is an integer from 1 to 10; preferably from 1 to 6; and where e is an integer from 1 to 20; preferably 2 to 12, more preferably 2 to 8.

In some aspects, a biocidal functionalized organosiloxane is provided having a structure according to the following formula:

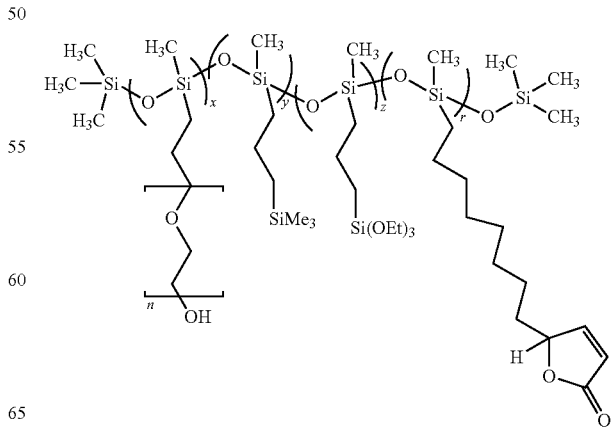

where n is an integer from 6 to 20; where x is an integer from 2 to 20, preferably from 8 to 16; where y is an integer from 0 to 20, preferably from 8 to 16; where z is an integer from 1 to 10; preferably from 1 to 6; and where r is an integer from 1 to 20; preferably 2 to 12, more preferably 2 to 8.

In some aspects, the biocidal moiety is selected from the group consisting of organic compounds such as dihydropyridazinones; pyridazinones, Diuron, Irgarol 1051, Dichlofluanid, TCMTB, Chlorothalonil, TCMS pyridine, SeaNine 211, Folpet, 4-chloro-meta-cresol, Econea, phenylborane pyridine, and Selektope; essential oils, and organic oils such as oregano and clove bud oil, and functional fragments thereof. In some aspects, the biocidal moiety is selected from the group consisting of phenols, halogenated phenols, halogen-containing compounds, thiazoles, azoles, sulfoamides, isothiazolinones, butenolides and their derivatives, 2-furanone, ascorbic acid, aldehyde-containing compounds, guanidines, sulfones, thiocyanates, pyrithiones, benzoic acid, sorbic acid, quaternary ammonium salts, peroxides, perchlorates, amides, amines, carbamates, glyphosates, antibiotics such as β-lactam antibiotics, biocidal enzymes, biocidal polypeptides, combinations thereof, and functional fragments thereof. In some aspects, the biocidal moiety is selected from the group consisting of butenolides and their derivatives such as 2-furanone and ascorbic acid.

Methods of Making Sidechain Functionalized Organosiloxanes

The general synthetic routes for surface active polymers (SAPs) include coupling precursor materials with a reactive end group to a corresponding reactive site present in an organosiloxane backbone. Such coupling reactions comprise commonly used chemistry but not limited to addition chemistry such as hydrosylilation between a vinyl group and a hydride group, condensation reaction such as between an alkoxy group and a hydride, click chemistry such as between a vinyl group and a thiol group, amine coupling such as between a succinimide and an amine, Michael addition such as between an acrylate and an amine, epoxy formation such as between an epoxy and an amine, urethane formation such as between an isocyanate and a hydroxyl group, and urea formation such as between an isocyanate and an amine.

In some aspects, the sidechain functionalized organosiloxanes can be prepared via platinum catalyzed hydrosilylation starting from a hydride resin and the appropriate alkene functionalized monomers (see examples). Additionally, many new catalysts and methods have been developed for the hydrosilylation of alkenes including other catalysts such as Fe, Co, and Ni catalysts. See, for example Du and Huang, *ACS Catal.* 7, 2, 1227-1243 (2017).

Lubricating Liquids

The compositions and coatings can, in some aspects, include a lubricating liquid. The terms "lubricating liquid" and "lubricant" are generally used interchangeably herein. In some aspects, the lubricating liquid is chemically and physically matched with the base resin in such a way that, when cured therewith to form a cured composition, the lubricating liquid is incorporated within the cured composition. The lubricating liquid can include an amphiphilic lubricant, a partially fluorinated lubricant, or a combination thereof. The lubricating liquid can be a polysiloxane having one or more polyalkyllene glycol sidechains attached thereto. In some aspects, the lubricating liquid can be a polysiloxane having one or more partially or fully fluorinated alkyl sidechains attached thereto. In some aspects, the lubricating liquid has an average molecular weight of about 7000 g/mole to about 14000 g/mole. In some aspects, the use of the sidechain modified organosiloxanes increases miscibility of hydrophilic silicone lubricating liquids in non-silicone or low silicone binder systems (e.g. epoxies, urethanes), providing improved preparation and processing of the compositions and biofouling control in such binder systems.

In some aspects, the lubricating liquids can be selected from the Formula I or II without the reactive groups, R3 and R5.

Biocides

In some aspects, applicants have found that improved anti-fouling properties can be achieved by incorporating a biocide into the coating matrix. Traditional anti-fouling coatings with active biocides provide biofouling protection with a heavy environmental cost. There have been efforts to combine the anti-fouling benefits of biocides with fouling release technology of nonstick coatings. The resulting coating system can be effective with lower concentrations of biocides and be more environmentally friendly compared to conventional biocidal coatings, however biocides have been found to release too quickly from conventional siloxane foul release coatings to provide effective biofouling protection. By combining the biocides with siloxane coatings containing the sidechain functionalized organosiloxanes described herein, applicants have found improved biocide retention and release profiles (more prolonged and sustained release) as compared to the same coatings without the sidechain functionalized organosiloxanes.

In some aspects, one or more biocidal agents are included in the compositions which, when cured therewith, are incorporated into the cured base resin and released from the base resin. Suitable biocidal agents can include metal biocides such as Copper(I) oxide, Copper thiocyanate, Copper pyrithione, Cu powder, Chromium trioxide, Zinc pyrithione, Ziram, Zineb; organic compounds such as dihydropyridazinones; pyridazinones, Diuron, Irgarol 1051, Dichlofluanid, TCMTB, Chlorothalonil, TCMS pyridine, SeaNine 211, Folpet, 4-chloro-meta-cresol, Econea, phenylborane pyridine, and Selektope; essential oils, and organic oils such as oregano and clove bud oil. The biocidal agents can be incorporated at an effective amount determined by the composition, the specific biocide, and the nature of the intended application. In some aspects, the biocidal agents are present at an amount from about 2% or about 5% to about 15% by weight based upon a total weight of the composition.

Coating Compositions and Methods of Making Coating Compositions

A variety of coating compositions are provided. In some aspects, a polymer composition is provided capable of curing on a substrate to form a surface that is resistant to biofouling, the polymer composition including: (a) a base resin composition containing (i) one or more different polymeric precursors capable of curing to form a cured resin and (ii) a sidechain functionalized organosiloxane described herein that has reactive end groups capable of reacting with the one or more different polymeric precursors, and (b) an (optional) lubricating liquid. This can allow the reactive end groups in the sidechain functionalized organosiloxane compound to react with the one or more different polymeric precursors so that the sidechain functionalized organosiloxane compound is integrated into the cured resin. The sidechain functionalized organosiloxane compound can then stratify to the surface and/or can present free sidechains at the surface that present a dynamic wetting behavior at the surface. Such dynamic wetting behavior can include a decrease in a water contact angle for the surface when measured over the first two minutes of exposing the surface to water.

The base resin composition can include polymeric precursors for a variety of compatible resins. For example, in some aspects the one or more different polymeric precursors comprises acrylic precursors; and the reactive end groups are reactive with acrylic resins. In some aspects, the one or more different polymeric precursors comprises condensation curable silicone precursors; and the reactive end groups are reactive with condensation cure silicon resins. In some aspects, the one or more different polymeric precursors comprises addition curable silicone precursors; and the reactive end groups are reactive with addition cure silicon resins. In some aspects, the one or more different polymeric precursors comprises epoxide precursors; and the reactive end groups are reactive with epoxy resins. In some aspects, the one or more different polymeric precursors comprises polyurethane precursors; and the reactive end groups are reactive with urethane resins.

The compositions can be prepared by combining and mixing the various components as a one-part or as a two-part coating resin, which can be determined by the nature of the coating compositions. Mixing and or agitation can be applied to ensure a suitable level of mixing. The compositions can then be applied to create coated articles as described below.

Pigments and Other Additives

In particular embodiments, the curable composition further comprises a pigment, a filler, a liquid additive, and combinations of thereof. In some embodiments, pigments are included in the composition to create color, improve coating hiding power, and provide UV stability. Suitable pigments can be selected from the materials comprising but not limited to titanium dioxide, iron oxide, zinc oxide, carbon black, graphite, copper chromite, and molybdate. In some embodiments, fillers are included in the composition to increase viscosity, extend pigments and improve coating durability. Suitable fillers can be selected from the materials comprising but not limited to silica, fumed silica, clay and organoclay compounds such as kaolin, bentonite and montmorillonite, calcium carbonate, magnesium oxide, barium sulfate, carbon nanotubes, graphene, and nanocrystalline cellulose. In some aspects, the fillers can be zero dimensional (i.e. spherical), one dimensional (i.e. linear or rod shape), two dimensional (i.e. planar or sheet-like), or three dimensional structure. In some embodiments, liquid additives are included in the composition as wetting aids, dispersing aids, rheological modifiers, leveling aids or pot life extenders.

Coated Articles and Methods of Coating Articles

The compound and coating compositions can be used to coat substrates in a variety of articles. Articles are therefore provided including a substrate and a fouling-resistant coating on a surface of the substrate, wherein the fouling-resistant coating comprises a plurality of sidechain functionalized organosiloxane compounds. In some aspects, the substrate is functionalized with reactive groups such that the reactive end groups in the sidechain functionalized organosiloxane are capable of binding directly to the substrate. In other aspects, a coating composition described herein is applied to the substrate and cured or dried to create the fouling-resistant coating. A lubricating liquid can further be provided, either in or with the polymer composition or applied to the surface after curing. In either case, in some aspects, the lubricating liquid is chemically and physically matched with the fouling-resistant coating in such a way the lubricating liquid is incorporated into the fouling-resistant coating.

The coatings can be applied to a variety of substrates, including a polymer, a metal, a sapphire, a glass, a carbon, a ceramic, or a composite thereof. This allows the coatings to be used in a wide range of applications. For example, the articles can include a ship, boat, submarine, or other marine vessel; an unmanned underwater vehicle; an aquaculture netting; a sensor; a seismic cable; or other article intended for exposure to an aqueous or marine environment. In some aspects, the coating is applied as a topcoat on an anticorrosive primer, such as epoxy. In some aspects, the coating is applied as a topcoat on a tiecoat, such as silicone epoxy, which is needed to improve adhesion between the topcoat and anticorrosive primer. The articles can also include a drum, vat, or tank; a pipe or conduit; a membrane; or other article intended for exposure to water or aqueous systems, including aqueous waste handling systems. The articles can also include a catheter, stent, or other implantable medical device; a surgical tool; a bag or a container; or other article or surface intended for exposure to blood, bodily fluid, or potential pathogens.

Coated articles can be prepared by applying the coating compositions in a variety of ways generally known in the art. Such methods can include dipping, casting, spraying, brushing, and the like to achieve a coating of sufficient thickness for the intended application. The coatings can be cured or dried, and if needed lubricating liquid can be subsequently applied if not already a part of the coating composition.

Modularity and Control of Chemistry, Morphology, and Consequently Biofouling Resistance The current invention describes a versatile strategy to design and synthesize sidechain functionalized polysiloxanes. These compounds by themselves or combined with lubricant and other additives can be easily incorporated in to formulations which then make cured compositions. The resulting coatings demonstrate controlled dynamic wetting properties, phase-separated features of controlled size distribution and concentration, and biofouling control. Series of experimental evidence suggest that the modularity of the sidechains of the polysiloxane play an important role in determining the surface composition and morphology of the coatings allowing biofouling control properties. Miscibility experiment suggest that the graft density of the polyalkylene oxide vs. trimethyl silane side chains affect the phase stabilization/separation behavior. Optical imaging of the top surface view of the coatings with polyalkylene oxide sidechain functionalized polysiloxane (AM-24, AM-41, AM-42) demonstrate the ability to influence the amphiphilic domain formation and the % surface coverage of such domains both based on amphiphilic content in the molecule itself and the total concentration of the molecule in the formulation. The chemical identity of the observed discontinuous, spherical domains as well as the continuous, surrounding areas was confirmed by Raman spectroscopy. The interior of the spherical domain contains largely polyalkylene oxide with relatively small amount of polysiloxane, while the continuous, surrounding areas contain largely polysiloxane with evidence of some polyaljylene oxide. Hence, they are regarded as amphiphilic domains which are able to influence the settlement and the adhesion of bio-foulants. Further the analysis of the coating cross sections suggests that the modular design principle of side chain functionalized polysiloxanes allow tunable self-stratification of such molecules. Depth profiling experiments conducted on cured compositions suggest that the sidechain functionalized polysiloxanes have the ability to self-stratify upon curing (Concentration of polyethylene glycol and the said compounds decrease monotonically from the surface to the bulk of the coating). The degree to which they stratify has a strong correlation to the modularity of the sidechains. Such behavior can still be observed with combination of lubricants and other additives. Overall the ability to modulate the design of polysiloxanes with select side chains allows to control the presentation of hydrophilic, hydrophobic, bioactive, and other functional moieties on the surface providing the desired function (biofouling in this case) to the coating.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Materials

The materials described in the following tables were used throughout the examples unless otherwise specified and can be purchased from the manufacturer indicated.

| Polydimethylsiloxane-co-methylhydrosiloxane (Hydride resin) | | | | | | |
|---|---|---|---|---|---|---|
| Chemical Name | Commercial ID | Manufacturer | CAS Number | Viscosity (cSt) | Molecular Weight (g/mol) | Specific Gravity |
| Trimethylsilyl terminated methyl hydrogen silicone fluid | SiSiB ® HF2020 | SiSiB Silicones | 63148-57-2/ 9004-73-3 | 16-24 | N/A | 0.990-0.998 |
| Hydride terminated methylhydrosiloxane dimethylsiloxane copolymer | SiSiB ® HF2060 | SiSiB Silicones | 69013-23-6 | N/A | N/A | N/A |
| Hydride terminated methylhydrosiloxane dimethylsiloxane copolymer | SiSiB ® HF2068 | SiSiB Silicones | 115487-49-5 | N/A | N/A | N/A |
| Trimethylsilyl terminated methylhydrosiloxane dimeethylsiloxane copolymer | SiSiB ® HF2050 | SiSiB Silicones | 68037-59-2 | N/A | N/A | N/A |
| Trimethyl or hydrogen terminated dimethyl diphenyl polysiloxane copolymer | SiSiB ® HF2082 | SiSiB Silicones | N/A | N/A | N/A | N/A |
| (25-35% methylhydrosiloxane)-dimethylsiloxane copolymer, trimethylsiloxane terminated | HMS-301 | Gelest | 68037-59-2 | 25-35 | 1,900-2,000 | 0.98 |
| Polymethylhydrosiloxane, trimethylsilyl terminated | H MS-992 | Gelest | 63148-57-2 | 20-35 | 1,800-2,100 | 0.99 |
| (45-55% methylhydrosiloxane)-dimethylsiloxane copolymer, trimethylsiloxane terminated | HMS-501 | Gelest | 68037-59-2 | 10-15 | 900-1,200 | 0.96 |

| Modular Side Chain Groups | | | | | | |
|---|---|---|---|---|---|---|
| Chemical Name | Commercial ID | Manufacturer | CAS Number | Viscosity (cSt) | Molecular Weight (g/mol) | Specific Gravity |
| PEG-12 Dimethicone | Xiameter ® OFX-193 | Dow Corning | 68937-54-2 | 260 | N/A | 1.07 |
| Polyalkylene glycol monoallyl ether | Polyglykol A 400 | Clariant | 27274-31-3 | ~35 | 400 | 1.09 |
| Polyalkylene glycol monoallyl ether | Polyglykol A 500 | Clariant | 27274-31-3 | ~58 | 500 | 1.09 |
| Polyalkylene glycol monoallyl ether, methyl terminated | Polyglykol AM 450 | Clariant | 27252-80-8 | 18-20 | ~450 | 1.052 |
| Polyalkylene glycol monoallyl ether, methyl terminated | Polyglykol AM 350 | Clariant | 27252-80-8 | 9-10 | ~320 | 1.03 |
| Allyloxy(polyethylene oxide) (8-12 EO) | ENEA0260 | Gelest | 27274-31-3 | N/A | ~480 | 1.089 |
| Allyloxy(polyethylene oxide), methyl ether (6-8 EO) | ENEA0360 | Gelest | 27252-80-8 | N/A | ~350 | 1.03 |
| Allyloxy(polyethylene oxide) (1-4 EO) | ENEA0253 | Gelest | 27274-31-3 | N/A | ~200 | 1.004 |
| Monovinyl terminated polydimethylsiloxane, asymmetric | MCR-V21 | Gelest | 68951-99-5 | 80-120 | 5.500-6.500 | 0.97 |
| Monovinyl functional polydimethylsiloxane, symmetric | MCS-V212 | Gelest | 67762-94-1 | 16-24 | 1,200-1,400 | 0.97 |
| Allyltrimethylsilane | SIA0555.0 | Gelest | 762-72-1 | N/A | 114.26 | 0.7193 |
| (Perfluorodecyl)ethylene | 019129 | Oakwood Chemical | 30389-25-4 | N/A | 546 | 1.71 |
| 1-Hexene | 320323 | Sigma-Aldrich | 592-41-6 | N/A | 84 | 0.678 |
| Allyltriethoxysilane | SIA0525.0 | Gelest | 2550-04-1 | N/A | 204.34 | 0.903 |

| Chemical Name | Commercial ID | Manufacturer | CAS Number | Viscosity (cSt) | Molecular Weight (g/mol) | Specific Gravity |
|---|---|---|---|---|---|---|
| Solvent | | | | | | |
| Anhydrous Toluene | TX0732-6 | Merck | 108-88-3 | N/A | 92 | 0.867 |
| Xylene | 214736 | Sigma-Aldrich | 1330-20-7 | N/A | 106 | 0.86 |
| Anhydrous Dimethylformamide | DX1727-6 | Merck | 68-12-2 | N/A | 73 | 0.94 |
| Catalyst | | | | | | |
| Platinum-divinyltetramethyldisiloxane complex (low color) | SIP6831.2LC | Gelest | 68478-92-2 | N/A | 474.68 | 0.8852 |
| Dibutyltin dilaurate | 291234 | Sigma-Aldrich | 77-58-7 | N/A | 631.56 | 1.066 |

| Chemical Name | Commercial ID | Manufacturer | CAS Number | Viscosity (cSt) | Molecular Weight (g/mol) | Specific Gravity | Other |
|---|---|---|---|---|---|---|---|
| Binder | | | | | | | |
| Silanol terminated polydimethylsiloxane | DMS-S45 | Gelest | 70131-67-8 | 50,000 | 110,000 | 0.98 | |
| Silanol terminated polydimethylsiloxane | DMS-S35 | Gelest | 70131-67-8 | 5,000 | 49,000 | 0.98 | |
| Silanol terminated polydimethylsiloxane | DMS-S31 | Gelest | 70131-67-8 | 1,000 | 26,000 | 0.98 | |
| Silanol terminated polydimethylsiloxane | DMS-S27 | Gelest | 70131-67-8 | 700-800 | 18,000 | 0.97 | |
| Silanol terminated polydimethylsiloxane | DMS-S15 | Gelest | 70131-67-8 | 45-85 | 2,000-3,500 | 0.96 | |
| Acrylic Polyol Oligomer | Joncryl 909 | BASF | N/A | 4,000-9,000 | N/A | 1.03 | Tg: 25° C. |
| Acrylic Polyol Oligomer | Joncryl 507 | BASF | N/A | 3,800 | N/A | 1.04-1.10 | Tg: −7° C. |
| Acrylic Polyol Oligomer | Joncryl 911 | BASF | N/A | 4,000-9,000 | N/A | 1.05-1.13 | Tg: 7° C. |
| Silicone-epoxy resin | Sllikopon EF | Evonik | N/A | 1,500 | N/A | 1.00-1.20 | |
| Silicone-epoxy resin | Silikopon ED | Evonik | N/A | 1,500 | N/A | 1.14-1.15 | |
| Silicone-epoxy resin | Silikopon EC | Evonik | N/A | 1,000 | N/A | 1.07-1.10 | |
| Monocarbinol terminated polydimethylsiloxane, asymmetric | MCR-C18 | Gelest | 207308-30-3 | 60-120 | 5,000 | 0.97 | |

| Chemical Name | Commercial ID | Manufacturer | CAS Number | Specific Gravity |
|---|---|---|---|---|
| Filler | | | | |
| C.I. Pigment Black 28 * CI Constitution #77428 * CPMA # 13-38-9 | Black 30C965 | Shepherd | 68186-91-4 | 5.4 |
| 8086 Rutile titanium dioxide pigment white 6 | LANSCO 8086 | Lansco Colors | 13463-67-7 | 4.25 |
| Fumed silica | Aerosil R972 | Evonik | 68611-44-9 | 2.2 |

| Chemical Name | Commercial ID | Manufacturer | CAS Number | Viscosity (cSt) | Molecular Weight (g/mol) | Specific Gravity |
|---|---|---|---|---|---|---|
| Lubricant | | | | | | |
| Trifluoromethyl C1-4 Alkyl Dimethicone | DM-100 | Grant Industries | 63148-56-1 | N/A | N/A | 0.99 |
| Dimethylsiloxane-(25-30% ethylene oxide) block copolymer | DBE-224 | Gelest | 68938-54-5 | 400 | 10,000 | 1.02 |
| Dimethylsiloxane-(50-55% ethylene oxide) block copolymer | DBE-621 | Gelest | 68938-54-5 | 100 | 2,500 | 1.03 |

-continued

| Chemical Name | Commercial ID | Manufacturer | CAS Number | Viscosity (cSt) | Molecular Weight (g/mol) | Specific Gravity |
|---|---|---|---|---|---|---|
| | | Lubricant | | | | |
| Silicone PEG-PPG block copolymer (30-40% PEG, 30-40% PPG, 20-40% PDMS) | Commercial Lubricant 1 | BYK | N/A | N/A | 3,000-7,000 | 1.035 |
| Soy Lecithin Powder | Soy Lecithin Powder | Modernist Pantry | N/A | N/A | N/A | N/A |

| Chemical Name | Commercial ID | Manufacturer | CAS Number | Viscosity (cSt) | Molecular Weight (g/mol) | Specific Gravity |
|---|---|---|---|---|---|---|
| | | Biocide | | | | |
| 4,5-Dichloro-2-n-octyl-4-isothiazolin-4-one | SeaNine 211N | Dow Chemical | 64359-81-5 | N/A | N/A | 0.94 |
| Tralopyril 4-bromo-2-(4-chlorophenyl)-5-(trifluoromethyl)-1H-pyrrole-3-carbonitrile | Econea | Janssen | 122454-29-9 | N/A | 349.54 | 1.714 |
| 2-isopropyl-5-methylphenol | Thymol | Sigma-Aldrich | 89-83-8 | N/A | 150.22 | 0.965 |
| Origanum vulgare | Oregano Oil | Plant Therapy | N/A | N/A | N/A | N/A |
| Syzygium aromaticum | Clove Bud Oil | Plant Therapy | N/A | N/A | N/A | N/A |

| Chemical Name | Commercial ID | Manufacturer | CAS Number | Viscosity (cSt) | Molecular Weight (g/mol) | Specific Gravity |
|---|---|---|---|---|---|---|
| | | Crosslinkers | | | | |
| Poly(diethoxysiloxane) | PSI-021 | Gelest | 68412-37-3/ 11099-06-2 | N/A | 134.2 | 1.05-1.07 |
| Aliphatic Polyisocyanate (IPDI Trimer) | Desmodur Z 4470 BA | Covestro | 53880-05-0 | 600 | N/A | 1.06 |
| Aliphatic Polyisocyanate (HDI Trimer) | Desmodur N 3300A | Covestro | 28182-81-2 | 3,000 | ~500 | 1.16 |
| Aliphatic Polyisocyanate (HDI Trimer) | Desmodur N 3800 | Covestro | 164250-92-4 | 6,000 | ~500 | 1.12 |
| 3-Aminopropyltriethoxysilane | Dynasylan AMEO | Evonik | 919-30-2 | 1.95 | 221 | 0.95 |
| 3-Aminopropyltrimethoxysilane | Dynasylan AMMO | Evonik | 13822-56-5 | 1.95 | 179 | 1.02 |
| | | Other | | | | |
| Molsiv adsobents 4A powder molecular sieve | Molsiv 4A | UOP | 1318-02-01 | N/A | N/A | N/A |

General Synthesis Procedure

Unless otherwise specified, reactions were carried under inert atmosphere. Hydride resin was added to the reaction flask. Modular blocking group and curing groups were added that are capable of reacting with the hydride groups. Twice the amount of toluene based on the weight of the solid was added, and the resulting mixture was stirred using an overhead stirrer. Temperature of the reaction flask was brought to 80° C. Catalyst diluted with xylene, 30 ppm (based on solid content) was added dropwise such that the reaction temperature remained within 5° C. of the set temperature. After the complete addition of catalyst solution, the reaction mixture was allowed to stir for 1 h. Toluene equivalent to double the amount of allylPEG was charged into the reaction flask followed by addition of allylPEG that was capable of reacting with the hydride. The reaction mixture was stirred until the temperature of the internal thermocouple stabilized near 80° C. 30 ppm of catalyst diluted with xylene, based on the amount of allylPEG in the flask, was added dropwise such that the reaction temperature remained within 5° C. of the set temperature. The reaction was allowed to stir for 1 h before cooling to room temperature and stored under argon.

Synthesis of SAP AM-14

Precursor PEG grafted silicone (90 g, XIAMETER OFX-193) was transferred into a round bottom flask equipped with overhead stirring and Ar purging. A small amount (0.947 g from a 1% by wt. solution) of dibutyl tin dilaurate (DBTDL) diluted in xylene was added to the reaction flask. Isocyanatopropyltriethoxysilane (11.65 g) was added dropwise using an addition funnel overtime. Stirring was continued throughout and the reaction was maintained at room temperature. The reaction was monitored using FTIR for the disappearance of the isocyanate peak.

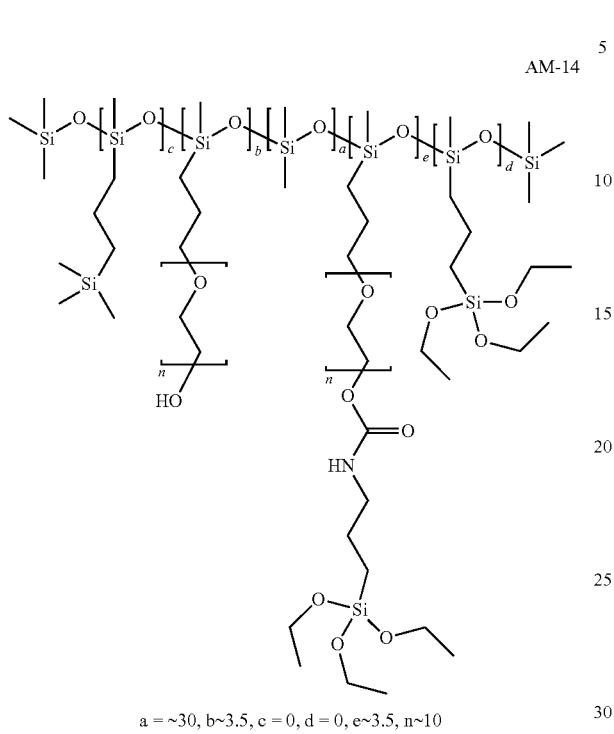

AM-14 a = ~30, b~3.5, c = 0, d = 0, e~3.5, n~10

Synthesis of SAP AM-24

Hydride resin (50.537 g, HMS-992, hydride Eq. Wt. 65) was transferred into a round bottom flask kept under a positive Argon atmosphere. Then, 39.091 g of allyltrimethylsilane (SIA 0555.0, hydride Eq. Wt. 114.26), 10.109 g of allyltriethoxysilane, 202.292 g of anhydrous toluene, were added in to the reaction flask. The content was allowed to mix till the the reaction temperature reached near 80° C. Next, the catalyst, 146.8 mg of 2% Pt divinyl complex in xylene, mixed with additional 4.994 g of xylene was added in to the reaction. The content was stirred for 1 h. After 1 h of reaction, 384.313 g of anhydrous toluene was added followed by 199.610 g of allylPEG (Eq. Wt 500) to the reaction mixture. After 15 min of mixing, 301.7 mg of 2% Pt divinyl complex in xylene, mixed with additional 4.0038 g of xylene, was added to the reaction mixture. Reaction mixture was allowed to stir for 1 h. A chaser (24.9 mg of the same catalyst diluted in 0.4808 g of xylene) was added and continued stirring for 15 mins. The resin (AM-24) was cooled to room temperature and stored under Argon argon atmosphere.

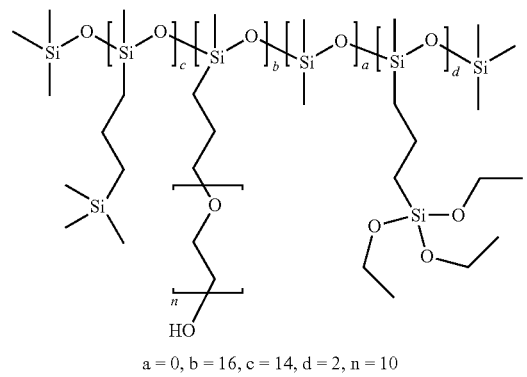

AM-24 a = 0, b = 16, c = 14, d = 2, n = 10

Synthesis of SAP AM-20

Synthesis of SAP AM-20

A copolymer with 75% polyethylene glycol grafts was synthesized using hydride resin HMS-301 following the procedure for AM-22 (except no allyltrimethylsilane was added). The remaining hydride was reacted with 25% curing groups to obtain AM-20).

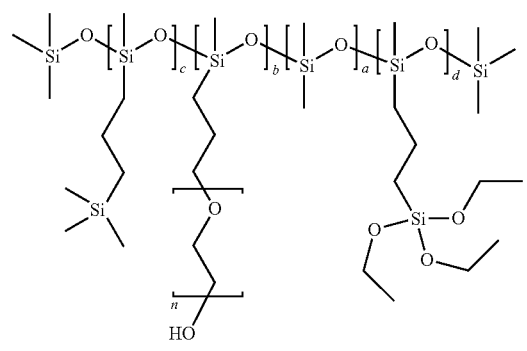

AM-20 a = 19, b = 6, c = 0, d = 2, n = 10

Synthesis of SAP AM-21

A copolymer of polydimethylsiloxane wherein 75% modular blocking group was reacted with hydride resin derived from HMS-301 and curing group that will balance out remaining 25% of hydride equivalents was synthesized following synthesis of AM-22 without any allylPEG.

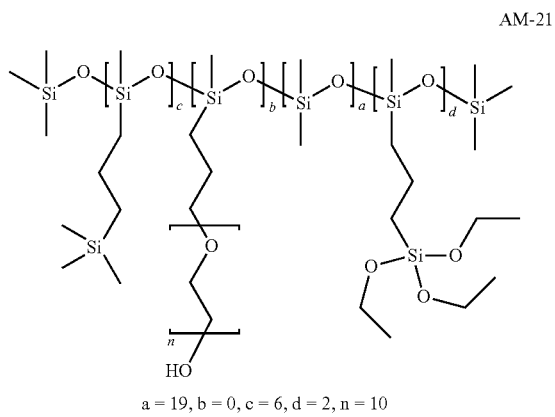

AM-21 a = 19, b = 0, c = 6, d = 2, n = 10

Synthesis of SAP AM-22

Hydride resin (20.397 g, HMS-301, hydride Eq. Wt. 250) transferred into a round bottom flask kept under a positive Ar atmosphere. Then, 3.496 g of allyltrimethylsilane (SIA 0555.0, hydride Eq. Wt. 114.26), 4.098 g of allyltriethoxysilane, 36.288 g of anhydrous toluene, were added in to the reaction flask. The content was allowed to mix till the reaction temperature reached near 80° C. Next the catalyst, 42.3 mg of 2% Pt divinyl complex in xylene, mixed with additional 2.244 g of xylene was added in to the reaction. The content was stirred for 1 h. After 1 h of reaction, 32.417 g of anhydrous toluene was added followed by 15.766 g of allylPEG (Eq. Wt 500) to the reaction mixture. After 15 min of mixing, 22.6 mg of 2% Pt divinyl complex in xylene, mixed with additional 1.2034 g of xylene, was added to the reaction mixture. Reaction mixture was allowed to stir for 1 h. A chaser (12.4 mg of the same catalyst diluted in 0.9313 g of xylene) was added and stirring continued for 15 mins. The resin (AM-22) was cooled to room temperature and stored under Argon atmosphere.

AM-22

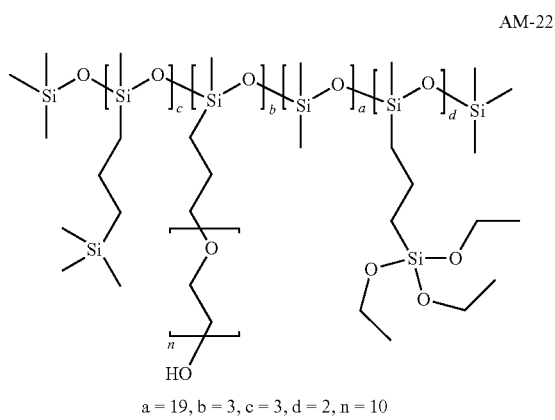

a = 19, b = 3, c = 3, d = 2, n = 10

Synthesis of SAP AM-25

2-Allyl-2-hydrobenzo[d]isothiazol-3-one was synthesized following the procedure described in Tetrahedron, 73 (2017) 1745-1761, Fiorenza Viani et al. Proton NMR spectrum of the product matched published data in Bioorganic and Medicinal Chemistry, 21, 2013, 2960-2967, Dazhi Liu et al. AM-25 was synthesized following general procedure outlined for the synthesis of modified polydimethylsiloxane copolymers. Briefly, hydride resin was first reacted with 37.5% blocking group, 6.25% curing group and 12.5% allyl biocide group using Pt (Karstedt's) catalyst and toluene as solvent at 80° C. for 1 h. In the second step, allylPEG was added after addition of more toluene. Contents are stirred and mixed at 80° C. Karstedt's catalyst was added dropwise. Mixture is stirred for 1 h, cooled to room temperature and stored under argon. This resin contains a bound biocidal group.

AM-25

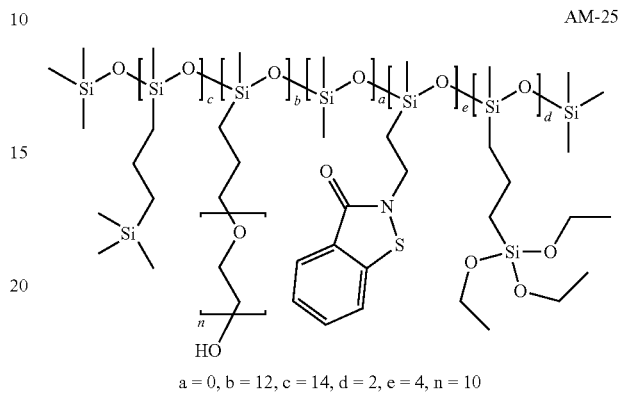

a = 0, b = 12, c = 14, d = 2, e = 4, n = 10

Synthesis of SAP AM-30

A copolymer of polydimethylsiloxane with PEG, blocking groups and curing groups attached to the end of PEG chain was synthesized following the synthesis of AM-24 without allyltriethoxysilane. 43.6% of the hydride were reacted with the blocking group and 56.5% of the hydride were reacted with allylPEG. Isocyanatropropyltriethoxysilane was added to the reaction, which reacted with the hydroxyl group of 6.5% of grafted allylPEG. 1,4-Diazabicyclo[2.2.2]octane was used a catalyst. The reaction was monitored for the disappearance of the isocyanate peak through infrared spectroscopy.

AM-30

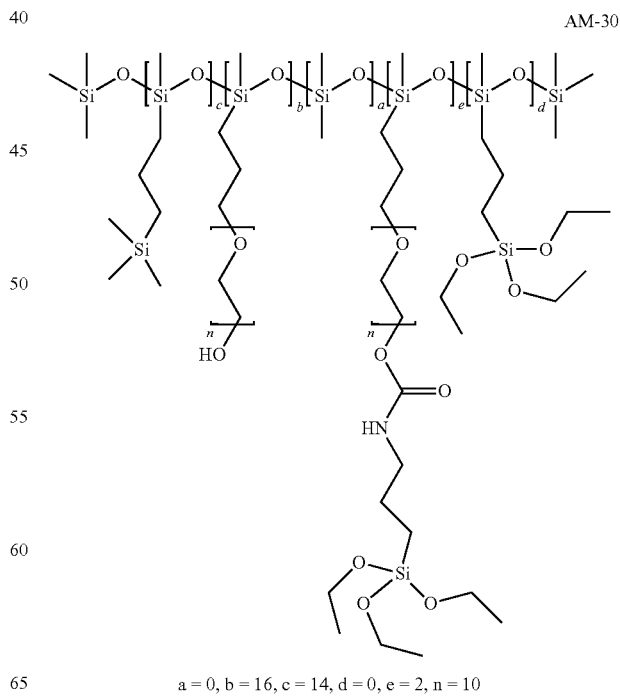

a = 0, b = 16, c = 14, d = 0, e = 2, n = 10

Synthesis of SAP AM-31

A copolymer with 56.25% polyethylene glycol grafts was synthesized by following the synthesis procedure for AM-24, wherein the corresponding amount of polyethylene glycol was reacted with 56.25 mol % (18 eq) of the hydride equivalent of HMS-992. Keeping the amount of curing group the same as AM-24, (Perfluorodecyl)ethylene was used as the modular blocking group and the amount added balanced out the remaining 3 hydride equivalents.

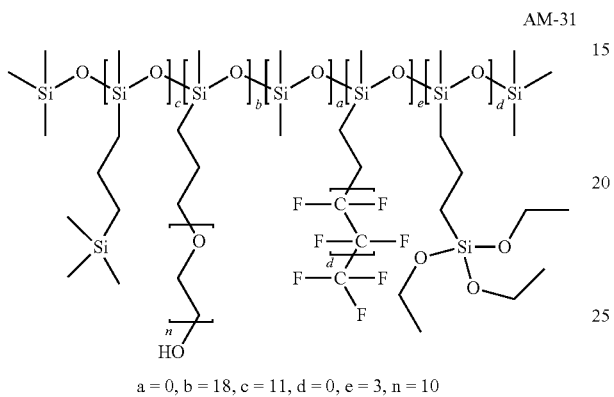

AM-31

$a = 0, b = 18, c = 11, d = 0, e = 3, n = 10$

Synthesis of SAP AM-41

A copolymer with 25% polyethylene glycol grafts was synthesized by following the synthesis procedure for AM-24, wherein the corresponding amount of polyethylene glycol was reacted with 25 mol % of the hydride equivalent. Keeping the amount of curing group the same as AM-24, the amount of modular blocking group added balanced out the remaining hydride equivalents.

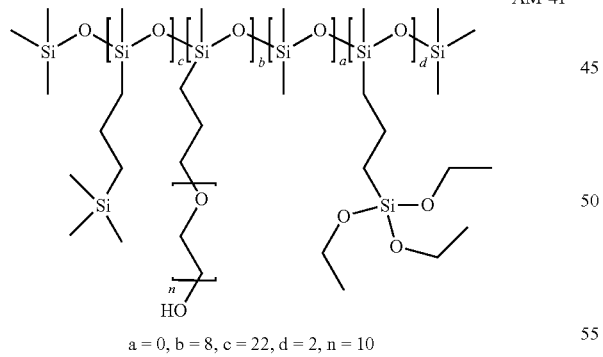

AM-41

$a = 0, b = 8, c = 22, d = 2, n = 10$

Synthesis of SAP AM-42

A copolymer with 10% polyethylene glycol grafts was synthesized by following synthesis of AM-24, wherein the corresponding amount of polyethylene glycol was reacted with 10 mol % of the hydride equivalent. Keeping the amount of curing group the same as AM-24, the amount of modular blocking group added balanced out the remaining hydride equivalents.

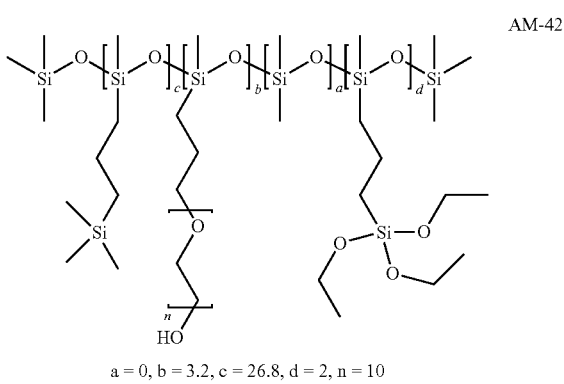

AM-42

$a = 0, b = 3.2, c = 26.8, d = 2, n = 10$

Synthesis of SAP AM-47

Phase 1 of the reaction is conducted following the synthesis of AM-41 (where, 22 equivalences of hydrides from HMS-992 was reacted with allyltrimethylsilane (13.0 g), 2 equivalences of hydrides from HMS-992 was reacted with allyltriethoxysilane (2.06 g) in phase 1. Then in phase 2, 8 equivalences of hydrides from HMS-992 was reacted with Polyglykol A500 (20.09 g.) In Phase 3, NaH (0.445 g) was added and the mixture was heated at 45° C. for 1 hr to convert 4 equivalences of hydroxyl groups to sodium salt. Then, N-(2-chloroethyl)-3-oxo-1,2-benzothiazole-2(3H)-carboxamide (4.476 g) matching 4 equivalences corresponding to the sodium salt was added to the reaction. The temperature was maintained at 55° C. overnight (The resin also contains toluene and THF as solvent). Alternatively AM-47 can be synthesized using BIT modified allyl PEG, where its been added after phase 2 for further hydrosilylation reaction.

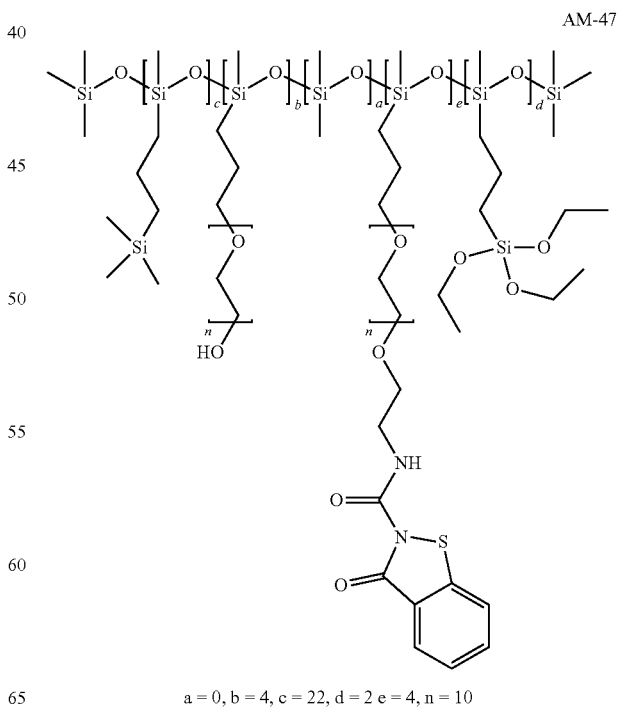

AM-47

$a = 0, b = 4, c = 22, d = 2\ e = 4, n = 10$

Synthesis of 2-(prop-2-en-1-yl)-1,2-benzothiazol-3(2H)-one (Allyl BIT)

Flame dry a 3-neck 250 mL flask with rubber septa and a gas adapter connected to inter gas. Purge Argon gas for at least 10 min by piercing a needle through septum connected to an oil bubbler. Then add 7.975 g Benzothiazol-3(2H)-one (0.0527 mol) by quickly opening the rubber septum. Add 70 mL of anhydrous THF and stir to mix. Chill solution with ice bath and then remove ice bath and quickly add in small portions 1.392 g sodium hydride (0.058 mol). After complete addition, stir for 1 h at room temperature. Add 7.020 g allyl bromide (0.058 mol) dropwise with stirring. Stir for 2 h after complete addition.

Evaporate volatiles under high vacuum. Add 100 mL of ethyl acetate and 50 mL of water. Shake to mix. Separate organic layer and dry over anhydrous sodium sulfate. Filter organic layer by decantation. Remove volatiles under high vacuum to obtain residue and wash residue with 2×30 mL of hexane. Dry residue overnight in air to obtain 2-(prop-2-en-1-yl)-1,2-benzothiazol-3(2H)-one (Allyl BIT).

1H NMR (DMSO-d6, 500 MHz): δ (ppm) 4.40-4.49 (dt, J=5.8, 1.5 Hz, 2H), 5.21-5.30 (m, 2H), 5.87-5.98 (ddt, J=16.4, 10.7, 5.8 Hz, 1H), 7.39-7.48 (ddd, J=8.0, 7.2, 1.0 Hz, 1H), 7.64-7.74 (ddd, J=8.3, 7.1, 1.3 Hz, 1H), 7.83-7.91 (dt, J=7.9, 0.9 Hz, 1H), 7.94-8.00 (dt, J=8.2, 0.9 Hz, 1H)

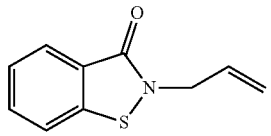

Synthesis of BIT modified allyl PEG

To a dry 3-neck 500 mL flask fitted with rubber septa and a gas inlet adapter, under inert atmosphere add 24.573 g 1,2-Benzothiazol-3-one (BIT-H) (0.1625 mol) by momentarily removing septum. Using a syringe, add 180 mL of anhydrous tetrahydrofuran with stirring. Add dropwise, 21.473 g of 2-chloroethylisocyanate (0.2035 mol). Reaction is exothermic and the rate of addition of isocyanate must be controlled to keep the content of flask near room temperature. White precipitates are formed. After complete addition of isocyanate, stir for 1 h at room temperature. Add reaction contents into a beaker containing 750 mL of hexane with vigorous stirring. Filter the precipitates through Whatman-1 filter paper and transfer it into a beaker. Place beaker in 80° C. oven and dry until constant weight to obtain 38.971 g (93.4%) of N-(2-chloroethyl)-3-oxo-1,2-benzothiazole-2(3H)-carboxamide.

1H NMR (DMSO-d6, 500 MHz): δ (ppm) 3.64-3.73 (m, 2H), 3.75-3.86 (td, J=6.1, 0.6 Hz, 2H), 7.45-7.56 (ddd, J=8.0, 7.2, 1.0 Hz, 1H), 7.76-7.85 (ddd, J=8.3, 7.2, 1.3 Hz, 1H), 7.92-8.00 (ddd, J=8.0, 1.3, 0.7 Hz, 1H), 8.01-8.09 (dt, J=8.2, 0.8 Hz, 1H), 9.07-9.16 (t, J=5.8 Hz, 1H)

Under inert atmosphere, 50 g allyl PEG (0.1 mol) (MW~500) is transferred in to a 500 mL three neck flask fitted with rubber septa and gas inlet adapter. 300 mL of anhydrous THF is added with stirring. Sodium hydride, 2.7 g (0.11 mol) was added in small portions, by briefly removing septum. After complete addition, stir for 15 min. Add 25.671 g (0.1 mol) of N-(2-chloroethyl)-3-oxo-1,2-benzothiazole-2(3H)-carboxamide is added using a powder funnel. Increase temperature to 50° C. and heat for 2 h. Cool the resin to room temperature and filter through Whatman 1 filter paper. Evaporate the solvent to obtain modified BIT substituted on allyl PEG.

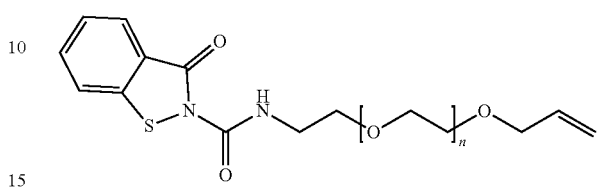

3-oxo-N-(prop-2-en-1-yl)-1,2-benzothiazole-2(3H)-carboxamide (Allyl Urea BIT)

Flame dry a 3-neck 250 mL flask with rubber septa and a gas adapter connected to inter gas. Purge Argon gas for at least 10 min by piercing a needle through septum connected to an oil bubbler. Then add 13.602 g Benzothiazol-3(2H)-one (0.0899 mol) by quickly opening the rubber septum. Add 150 mL of anhydrous THF and stir to mix. Add dropwise, 8.916 g allyl isocyanate (0.1073 mol). Stir for 2 h.

Evaporate volatiles under high vacuum. Dissolve residue in minimum amount of dichloromethane and add it to 1 L of hexane with stirring. Filter the precipitate formed and dry in air to obtain 9.876 g of white powder 3-oxo-N-(prop-2-en-1-yl)-1,2-benzothiazole-2(3H)-carboxamide (Allyl Urea BIT).

Other SAP-BXs

Additionally, ally BIT, allyl PEG BIT and allyl urea BIT can be used to prepare surface active polymers with biocide moieties. Similar procedure as AM-25 can be followed.

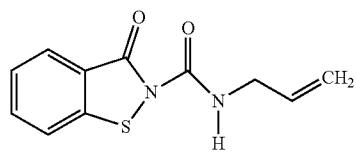 [SMILES: C=CCNC(=O)n1sc2ccccc2c1=O]

Sidechain Functionalized Organosiloxanes Described Herein and/or Lubricant Combinations (APIs) can be Used as an Additive, Surface Modifier and a Solution.

One or more PAO side chain functionalized Organosiloxanes can be combined with one or more corresponding lubricants, one or more solvents and other additives to prepare an Active Performance Ingredients (API) package (liquid or solid form). The API package can then be used as an additive in coating systems, as surface treatment of substrates, or a treatment solution to provide (but not limited to) biofouling control, anti-ice, anti-graffiti, and easy clean properties in the final form.

In a particular case, AM-24 was combined with amphiphilic silicone lubricant at a 1:1.11 weight ratio. Additionally, N,N-Dimethylformamide (20% by weight) was added to obtain the final API package. The package may also contain other additives for purposes other than mentioned above.

Examples of Active Performance Ingredients Package

| Material Name | Commercial Ref | API Package 1 | API Package 2 |
|---|---|---|---|
| Lubricant | | | |
| Hydrophilic polysiloxane fluid | Commercial Lubricant 1 | 21.35% | 20.53% |
| Sidechain Functionalized Organosiloxane | | | |
| Surface active polymer (34% solids, 66% Toluene) | AM-24 | 58.65%* | 56.39%* |
| Other ingredients | | | |
| Molecular sieve moisture scavenger | Molsiv 4A | | 3.08% |
| N,N-dimethylformamide | DMF | 20% | 20% |
| Total | | 100 | 100 |

*Weight percent considered at 100% solids

General Coating Formulation Procedure for Silicone Binder Systems

Silanols with varying molecular weights were combined and speedmixed at 3500 rpm for 1 min using a Flacktek mixer. Then the corresponding fillers, pigments and additives were incorporated by speedmixing; $1^{st}$ a 20 sec ramp to 3500 rpm and holding for 1 min of additional mixing at that rpm. Next the lubricant/s, SAPs and polydiethoxysiloxane were added to the mixture and speedmixed for 1 min at 2500 rpm. Finally, DBTDL was added and speedmixed for 1 min at 2500 rpm. The coating was applied onto previously primed and tie-coated panels using a drawdown bar with a 7.5 mil WFT. Such systems can also be packaged into a two-part coating system that reacts upon mixing, or a one-part system that reactions upon exposure to water, or humidity present in the environment.

Formulations Made Using Polyalkylene Oxide Sidechain Functionalized Organosiloxanes, Pigments and Additives

| Material Name | Commercial Ref | 100028 | 100031 | 100033 | 100034 | 100035 | 100036 |
|---|---|---|---|---|---|---|---|
| Binder/Filler/Pigment | | | | | | | |
| Silanol Terminated Polydimethylsiloxanes | | 75.07% | 67.72% | 60.19% | 67.72% | 75.25% | 67.72% |
| Black Pigment | Black 30C965 | 0.39% | 0.35% | 0.32% | 0.35% | 0.39% | 0.35% |
| White Pigment | LANSCO 8086 | 0.99% | 0.90% | 0.80% | 0.90% | 1% | 0.90% |
| Filler | Aerosil R972 | 2.56% | 2.31% | 2.06% | 2.31% | 2.57% | 2.31% |
| Pigments Total | | 1.38% | 1.25% | 1.12% | 1.25% | 1.39% | 1.25% |
| Pigments + Filler Total | | 3.94% | 3.56% | 3.18% | 3.56% | 3.96% | 3.56% |
| Lubricant | | | | | | | |
| Fluorinated polysiloxane fluid | DM-100 | | | | | | 10% |
| Hydrophilic polysiloxane fluid | DBE-224 | 10% | 10% | 20.01% | | | |
| Hydrophilic polysiloxane fluid | Commercial Lubricant 1 | | | | | 10% | |
| Sidechain Functionalized Organosiloxane | | | | | | | |
| Surface active polymer | AM-14 | | 9.91% | 8.81% | 9.91% | 11.01% | 9.91% |
| Other ingredients | | | | | | | |
| Polydiethoxysiloxane | PSI-021 | 10.20% | 8.10% | 7.19% | 8.10% | 8.99% | 8.10% |
| Dibutyltin dilaurate | DBTDL | 0.79% | 0.71% | 0.63% | 0.71% | 0.79% | 0.71% |
| Total | | 100 | 100 | 100 | 100 | 100 | 100 |

* Weight percent considered at 100% solids

Formulations Made Using Polyalkylene Oxide Sidechain Functionalized Organosiloxanes, Pigments and Additives

| Material Name | Commercial Ref | 100037 | 100038 | 100040 | 100106 |
|---|---|---|---|---|---|
| Binder/Filler/Pigment | | | | | |
| Silanol Terminated Polydimethylsiloxanes | | 67.45% | 67.66% | 61.01% | 69.43% |

-continued

| Material Name | Commercial Ref | 100037 | 100038 | 100040 | 100106 |
|---|---|---|---|---|---|
| Black Pigment | Black 30C965 | 0.35% | 0.35% | 0.32% | 0.36% |
| White Pigment | LANSCO 8086 | 0.89% | 0.89% | 0.81% | 0.92% |
| Filler | Aerosil R972 | 2.29% | 2.29% | 2.08% | |
| Pigments Total | | 1.24% | 1.24% | 1.13% | 1.28% |
| Pigments + Filler Total | | 3.53% | 3.53% | 3.21% | 1.28% |
| Lubricant | | | | | |
| Hydrophilic polysiloxane fluid | DBE-224 | 10% | 10% | 10% | 10.21% |
| Sidechain Functionalized Organosiloxane | | | | | |
| Surface active polymer | AM-14 | 9.80% | 9.80% | 17.86% | |
| Surface active polymer (33.25% solids, 66.75% Toluene) | AM-20 | | | | |
| Surface active polymer (33.00% solids, 67.00% Toluene) | AM-22 | | | | |
| Surface active polymer (29.71% solids, 70.29% Toluene) | AM-24 | | | | 10.06%* |
| Other ingredients | | | | | |
| Poly(Diethoxysiloxane) | PSI-021 | 8.52% | 8.31% | 7.28% | 8.29% |
| Dibutyltin dilaurate | DBTDL | 0.70% | 0.70% | 0.64% | 0.73% |
| Total | | 100 | 100 | 100 | 100 |

*Weight percent considered at 100% solids

Formulations Made Using Polyalkylene Oxide
Sidechain Functionalized Organosiloxanes,
Pigments and Additives

| Material Name | Commercial Ref | 100107 | 100108 | 100097 |
|---|---|---|---|---|
| Binder/Filler/Pigment | | | | |
| Silanol Terminated Polydimethylsiloxanes | | 69.46% | 69.45% | 78.35% |
| Black Pigment | Black 30C965 | 0.36% | 0.36% | 0.41% |
| White Pigment | LANSCO 8086 | 0.92% | 0.92% | 1.04% |
| Filler | Aerosil R972 | | | |
| Pigments Total | | 1.28% | 1.28% | 1.45% |
| Pigments + Filler Total | | 1.28% | 1.28% | 1.45% |
| Lubricant | | | | |
| Hydrophilic polysiloxane fluid | DBE-224 | 10.21% | 10.21% | |
| Sidechain Functionalized Organosiloxane | | | | |
| Surface active polymer | AM-14 | | | |
| Surface active polymer (33.25% solids, 66.75% Toluene) | AM-20 | 10.02%* | | 10.02%* |
| Surface active polymer (33.00% solids, 67.00% Toluene) | AM-22 | | 10.03%* | |
| Surface active polymer (29.71% solids, 70.29% Toluene) | AM-24 | | | |
| Other ingredients | | | | |
| Poly(Diethoxysiloxane) | PSI-021 | 8.30% | 8.30% | 9.36% |
| Dibutyltin dilaurate | DBTDL | 0.73% | 0.73% | 0.82% |
| Total | | 100 | 100 | 100 |

*Weight percent considered at 100% solids

Formulations Made Using Polyalkylene Oxide Sidechain Functionalized Organosiloxanes, Unpigmented

| Material Name | Commercial Ref | 100139 | 100143 | 100169 | 100204 | 100227 |
|---|---|---|---|---|---|---|
| Binder/Filler/Pigment | | | | | | |
| Silanol Terminated Polydimethylsiloxanes | | 63.73% | 63.73% | 79.88% | 71.68% | 71.68% |
| Lubricant | | | | | | |
| Hydrophilic polysiloxane fluid | Commercial Lubricant 1 | 10% | 10% | | 10% | 10% |
| Zwitterionic fluid | Soy Lecithin | 8.99% | 8.99% | | | |
| Zwitterionic fluid | AM-49 | | | 5% | | |
| Sidechain Functionalized Organosiloxane | | | | | | |
| Surface active polymer | AM-14 | 8.99% | | | | |
| Surface active polymer (34% solids, 66% Toluene) | AM-24 | | 8.99%* | 4.75%* | 9%* | |
| Surface active polymer (31.96% solids, 68.04% Toluene) | AM-35 | | | | | 9%* |
| Other ingredients | | | | | | |
| Polydiethoxysiloxane | PSI-021 | 7.62% | 7.62% | 9.55% | 8.57% | 8.57% |
| Dibutyltin dilaurate | DBTDL | 0.67% | 0.67% | 0.82% | 0.75% | 0.75% |
| Total | | 100 | 100 | 100 | 100 | 100 |

*Weight percent considered at 100% solids

Formulations Made Using Polyalkylene Oxide Sidechain Functionalized Organosiloxanes, Unpigmented

| Material Name | Commercial Ref | 100092 | 100252 | 100257 | 100258 | 100253 | 100261 |
|---|---|---|---|---|---|---|---|
| Binder/Filler/Pigment | | | | | | | |
| Silanol Terminated Polydimethylsiloxanes | | 84.07% | 84.60% | 79.60% | 74.50% | 84.60% | 88.30% |
| Sidechain Functionalized Organosiloxane | | | | | | | |
| Surface active polymer (34% solids, 66% Toluene) | AM-24 | 5.01%* | | | | | |
| Surface active polymer (34.02% solids, 65.98% Toluene) | AM-41 | | 5.00%* | 10.00%* | 15.00%* | | 1.00%* |
| Surface acitve polymer (32.69% solids, 67.21% Toluene) | AM-42 | | | | | 5.00%* | |
| Other ingredients | | | | | | | |
| Poly(Diethoxysiloxane) | PSI-021 | 10.05% | 9.53% | 9.53% | 9.61% | 9.53% | 9.84% |
| Dibutyltin dilaurate | DBTDL | 0.88% | 0.83% | 0.83% | 0.88% | 0.83% | 0.86% |
| Total | | 100 | 100 | 100 | 100 | 100 | 100 |

*Weight percent considered at 100% solids

Formulations Made Using Polyalkylene Oxide Sidechain Functionalized Organosiloxanes, Unpigmented

| Material Name | Commercial Ref | 100093 | 100094 | 100157 | 100160 | 100129 |
|---|---|---|---|---|---|---|
| Binder/Filler/Pigment | | | | | | |
| Silanol Terminated Polydimethylsiloxanes | | 79.50% | 84.07% | 71.68% | 79.64% | 79.61% |
| Lubricant | | | | | | |
| Hydrophilic polysiloxane fluid | DBE-224 | | | 10% | | 10.04% |

-continued

| Material Name | Commercial Ref | 100093 | 100094 | 100157 | 100160 | 100129 |
|---|---|---|---|---|---|---|
| Sidechain Functionalized Organosiloxane | | | | | | |
| Surface active polymer | AM-14 | 10.17% | 5.01% | 9.00% | | |
| Surface active polymer (34% solids, 66% Toluene) | AM-24 | | | | 10.00%* | |
| Other ingredients | | | | | | |
| Poly(Diethoxysiloxane) | PSI-021 | 9.50% | 10.05% | 8.57% | 9.52% | 9.51% |
| Dibutyltin dilaurate | DBTDL | 0.83% | 0.88% | 0.75% | 0.83% | 0.83% |
| Total | | 100 | 100 | 100 | 100 | 100 |

*Weight percent considered at 100% solids

Formulations Made Using Polyalkylene Oxide Sidechain Functionalized Organosiloxanes, Unpigmented

| Material Name | Commercial Ref | 100175 | 100237 | 100210 | 100235 | 100211 |
|---|---|---|---|---|---|---|
| Binder/Filler/Pigment | | | | | | |
| Silanol Terminated Polydimethylsiloxanes | | 79.64% | 80.42% | 85.15% | 80.42% | 85.15% |
| Lubricant | | | | | | |
| Hydrophilic polysiloxane fluid | DBE-621 | | 5% | | | 5% |
| Hydrophilic polysiloxane fluid | Commercial Lubricant 1 | 10% | | 5% | 5% | |
| Sidechain Functionaized Organosiloxane | | | | | | |
| Surface active polymer (34% solids, 66% Toluene) | AM-24 | | 4.75%* | | 4.75%* | |
| Other ingredients | | | | | | |
| Poly(Diethoxysiloxane) | PSI-021 | 9.52% | 9.05% | 9.05% | 9.05% | 9.05% |
| Dibutyltin dilaurate | DBTDL | 0.83% | 0.78% | 0.80% | 0.78% | 0.80% |
| Total | | 100 | 100 | 100 | 100 | 100 |

*Weight percent considered at 100% solids

Figure 1:
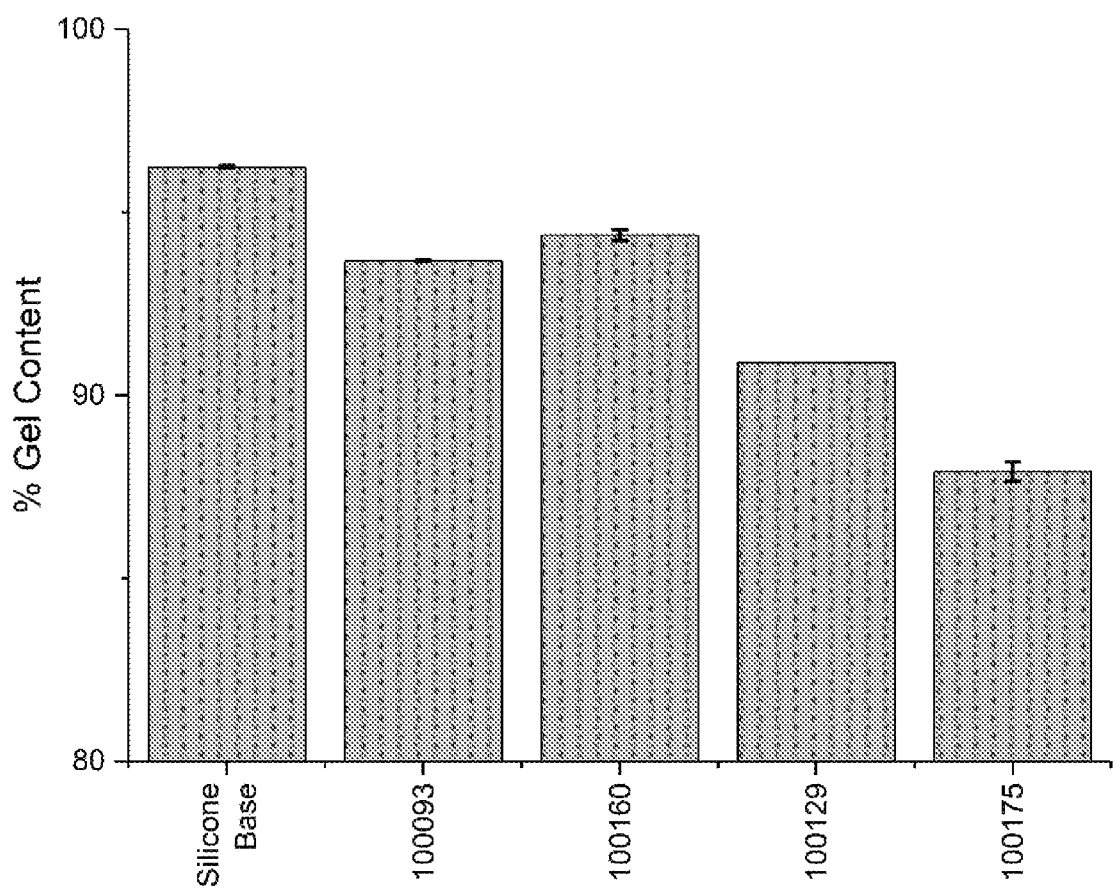
FIG. 1 is a bar graph comparing the percent gel content of cured coatings containing SAPs (AM-14 and AM-24) vs. silicone base resin and silicone resin with lubricant.

Evaluation of Gel Content of Coatings Incorporating SAPs Using Soxhlet Extraction Coatings incorporating 10 wt. % of AM-14, AM-24, Commercial Lubricant 1 (PEG-PPG silicone) and Commercial Lubricant 2 (PEG silicone) were prepared (7.5 mil drawdowns on aluminum panels) and allowed to cure for about 72 hrs. A control silicone with no additives was also prepared the same way and used in the study. Each coating was peeled off the aluminum and cut into 1.6129 $cm^3$ squares. Soxhlet extraction experiment were conducted for each sample set (~1 g of coating squares) using pentane as a solvent at 55-60° C. for 24-48 hours until no further weight loss was observed for each sample. FIG. 1 shows the gel content of each coating tested. The base silicone control shows the highest gel content of 96.25%. The coatings incorporating the 10% of AM-14 and AM-24 show a much higher gel content compared to those with 10% of non-reactive Lubricant 1 and Lubricant 2. The data demonstrates that the SAPs described here are reactive with the base binder (which in this case is a condensation cure silicone).

Evaluation of Release Kinetics of Different Lubricants when SAPs are Introduced to the Silicone Matrix Coating formulations were prepared using combinations of 2 different SAPs and 3 different lubricants. Lubricant 1 is an amphiphilic silicone with PEG-PPG side chains. Lubricants 2 and 3 are amphiphilic silicone lubricants with PEG side chains but Lubricant 2 has significantly higher molecular weight (MW) compared to that of Lubricant 3. Coatings were prepared with 5 wt. % percent AM-24, each with 5 wt. % of Commercial Lubricant 1, Lubricant 2 (DBE-224, Gelest), or Lubricant 3 (DBE-621, Gelest). Coatings with 5 wt. % lubricant only (i.e. without 5 wt. % SAP) were prepared as controls. The formulations were applied with a 7.5 mils drawdown applicator onto aluminum coupons and allowed to fully cure over 3 days at room humidity. In addition, additive free silicone films were also drawn down on aluminum coupons with a 25 mils drawdown applicator, and also left to thoroughly cure (72 hrs).

Figure 2:
FIG. 2 is a schematic of the test setup for measuring release kinetics from example coatings.

The additive free silicone films were cut into rectangles of approximately the same surface area, and each rectangle was weighed prior to use. Then, an additive-free rectangle was placed on top of every additive formulation made, ensuring no air bubbles between the silicone rectangle and the formulation (see FIG. 2). Weight was recorded for each silicone rectangle at 30 minutes, 1 hour, and 24 hours, and normalized based on the area of the silicone rectangle.

Figure 3A:
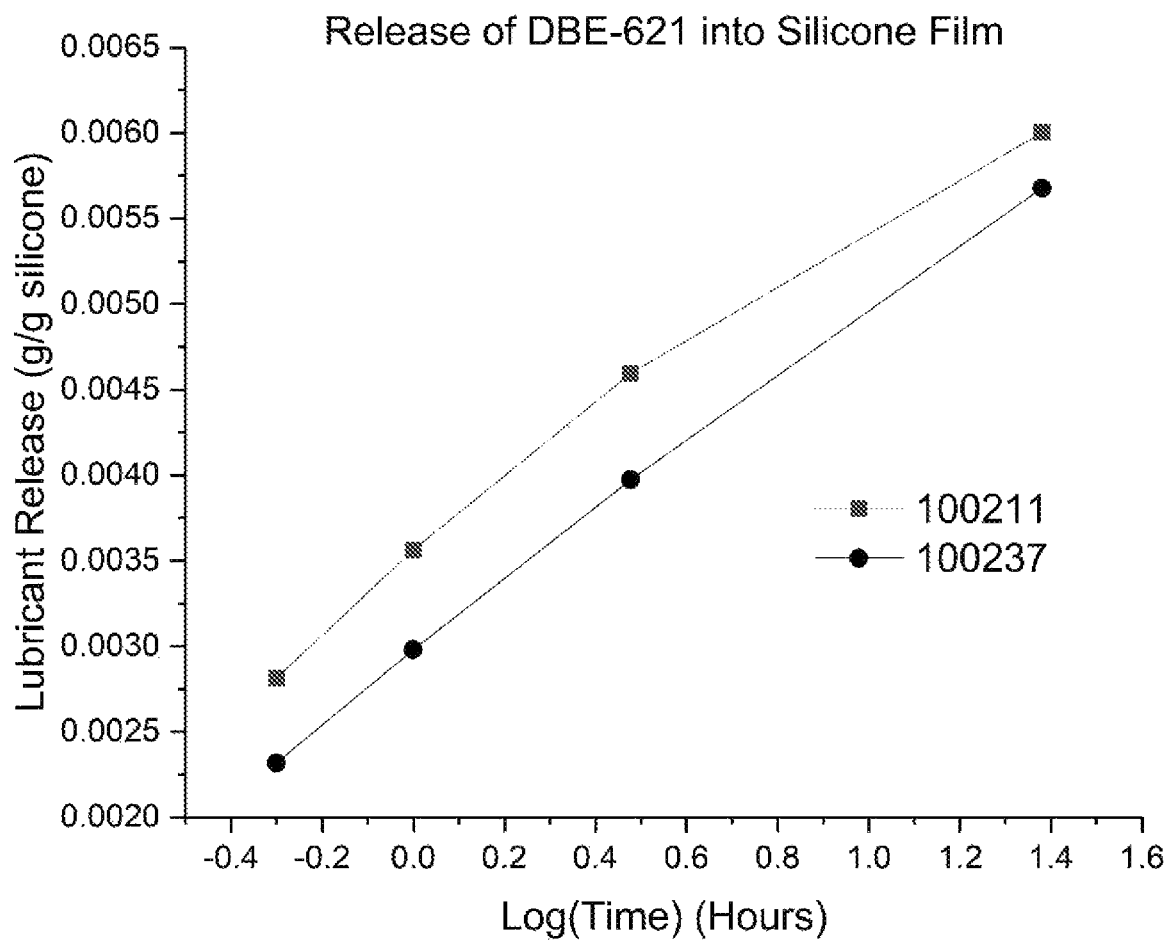
FIGS. 3A-3B are graphs of the release kinetics of amphiphilic lubricants DBE-621 (FIG. 3A), and Commercial Lubricant 1 (FIG. 3B) with and without SAP AM-24 in the matrix.
Figure 3B:
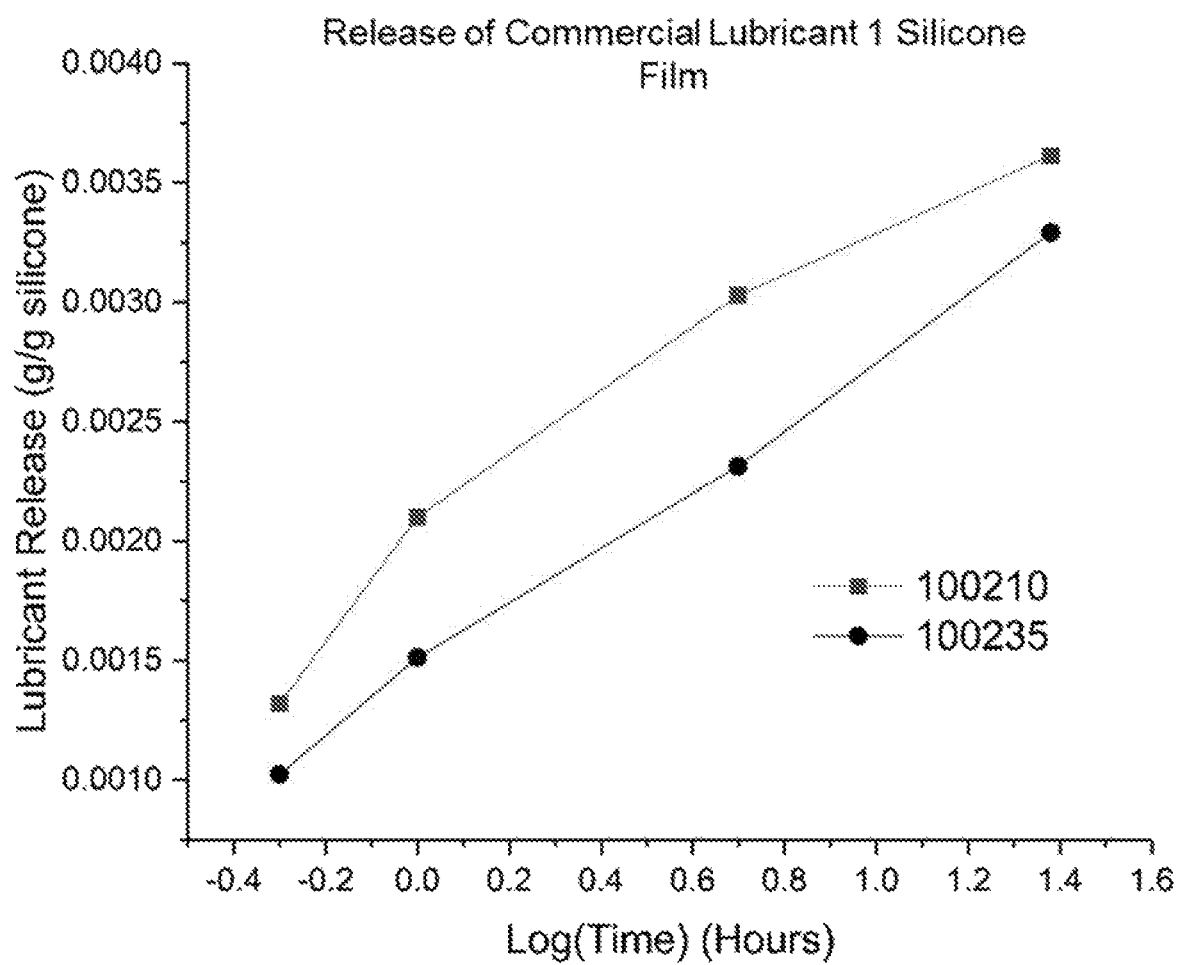

FIGS. 3A-3C demonstrates that SAPs enable controlled release rate of the amphiphilic lubricant it is paired with. It is shown that it is possible to release more or less than the lubricant by itself, depending on the specific lubricant-SAP combination.

Figure 4:
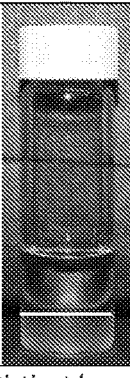
FIG. 4 demonstrates the relative scale used to assess miscibility of SAP and lubricant, with 1 being least miscible and 5 being most miscible.

Sidechain Functionalized Organosiloxanes as Surface Active Polymers Described Herein Demonstrate Tunable Miscibility with Polydimethylsiloxanes and Amphiphilic Silicones In order to demonstrate versatility of sidechain functionalized organosiloxanes as SAPs, a miscibility experiment was conducted using 4 non-reactive silicone fluids (3 amphiphilic, 1 silicone) and 3 SAPs with varying modularity of side chains. In each case, 1 gram of lubricant and 1 gram of sidechain functionalized organosiloxanes were vortex mixed for 15 seconds, and pictures were taken periodically to check the miscibility of the mixtures. They were then scored on a qualitative scale from 1-5, with 1 being immiscible and 5 being completely miscible (FIG. 4).

The three sidechain functionalized organosiloxanes compared here have the same two modular side chains at different grating ratios. The amphiphilic silicone lubricants considered here contain PEG, PEG-PPG according to the manufacturer. The 4$^{th}$ lubricant is polydimethylsiloxane which may represent the siloxane matrix in some examples described here. The data shows that the modularity of SAP sidechains facilitates to create either a (1) relatively stable emulsified or (2) slightly immiscible or (3) completely immiscible mixture with other silicone derivatives. Thus, the modularity of side chains and their relative ratio is an important parameter to tune stratification and surface activity of the SAPs and lubricants. Without being bound to one particular theory, it is believed that controlling the miscibility of SAP and lubricant in the coating facilitates different lubricant release rates, as seen in FIG. 3.

Miscibility of Varying Weight Percent PEG Sidechain Functionalized Organosiloxanes Against Different Chemistry Commercial Lubricants

| SAP | Lubricant | t = 0 | 1 hour | 4 hours | 24 hours |
|---|---|---|---|---|---|
| AM-24 (60% PEG, 8.5% TMS) | Commercial Lubricant 1 | 5 | 1 | 1 | 1 |
| AM-41 (40% PEG, 18% TMS) | (30-40% PEG, 30-40% PPG, 20-40% PDMS) | 5 | 5 | 5 | 5 |
| AM-42 (20% PEG, 28% TMS) | | 5 | 5 | 5 | 5 |
| AM-24 (60% PEG, 8.5% TMS) | DBE-224 (25-30% PEG) | 3 | 2 | 1 | 1 |
| AM-41 (40% PEG, 18% TMS) | | 4 | 2 | 2 | 2 |
| AM-42 (20% PEG, 28% TMS) | | 5 | 5 | 5 | 5 |
| Hempel Control | | 4 | 1 | 1 | 1 |
| AM-24 (60% PEG, 8.5% TMS) | DBE-621 (50-55% PEG) | 3 | 1 | 1 | 1 |
| AM-41 (40% PEG, 18% TMS) | | 5 | 5 | 5 | 5 |
| AM-42 (20% PEG, 28% TMS) | | 5 | 5 | 5 | 5 |
| Hempel Control | | 5 | 1 | 1 | 1 |
| AM-24 (60% PEG, 8.5% TMS) | DMS-T21 (Silicone) | 4 | 4 | 4 | 4 |
| AM-41 (40% PEG, 18% TMS) | | 4 | 3 | 1 | 1 |
| AM-42 (20% PEG, 28% TMS) | | 4 | 1 | 1 | 1 |

Optical Microscopy and AFM Demonstrate the Effect of Sidechain Functionalized Polysiloxanes on Controlling the Final Surface Morphology of Cured Compositions Formulations were prepared using AM-24, AM-41, AM-42 and applied on previously primed and tie-coated panels at 7.5 mil WFT. The coatings were allowed to thoroughly cure under the same environmental conditions before being imaged using an optical microscope (Keyence VHX-6000). The images were analyzed using a MATLAB code to quantify the discrete phase domains observed on the surface of each coating.

Figure 5:
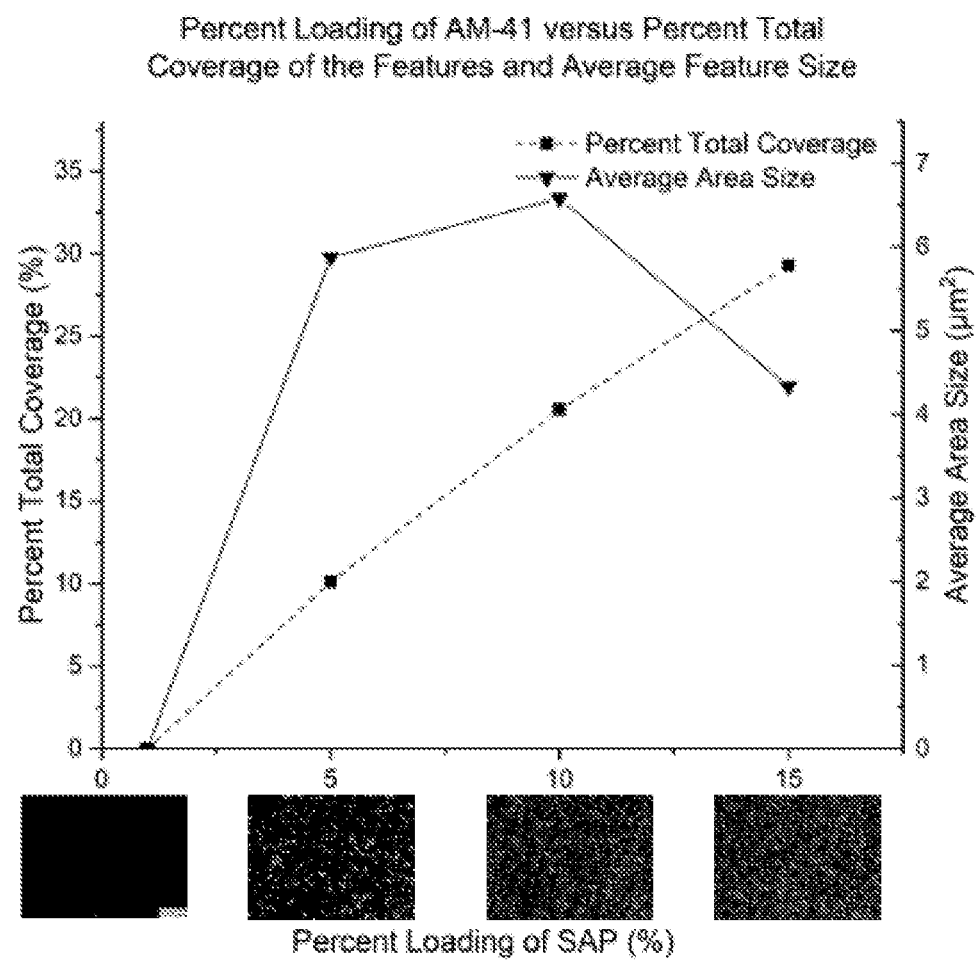
FIG. 5 is a graph displaying the relationship between percent loading of AM-41 (100252, 100257, 100258) in formulation and the percent total surface coverage of the amphiphilic domains and the average area of the amphiphilic domains.
Figure 6:
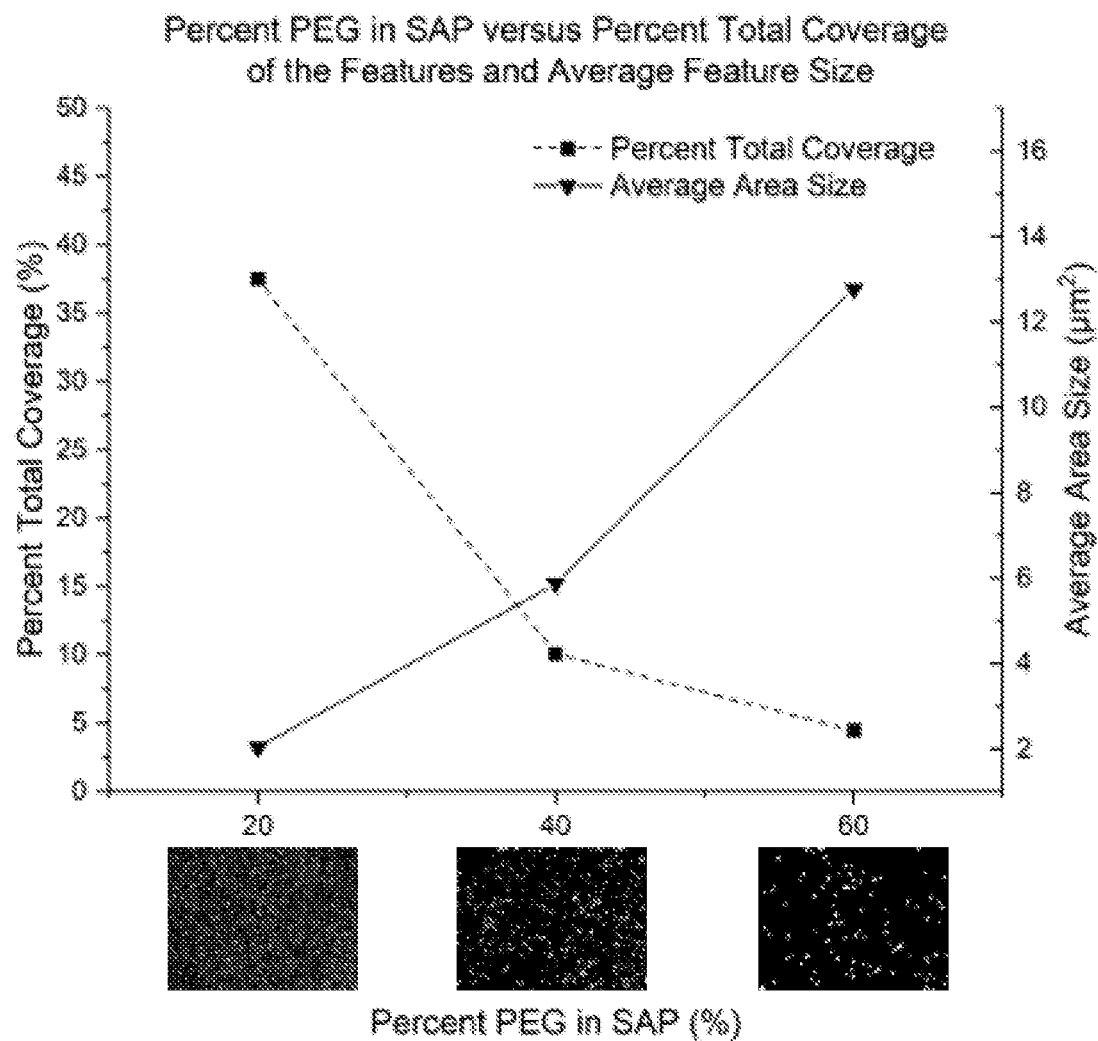
FIG. 6 is a graph displaying the relationship between the number of PEG grafts per SAP at equal loading in formulations (100092, 100252, 100253) and the percent total surface coverage of the amphiphilic domains and the average area of the amphiphilic domains.
Figure 7:
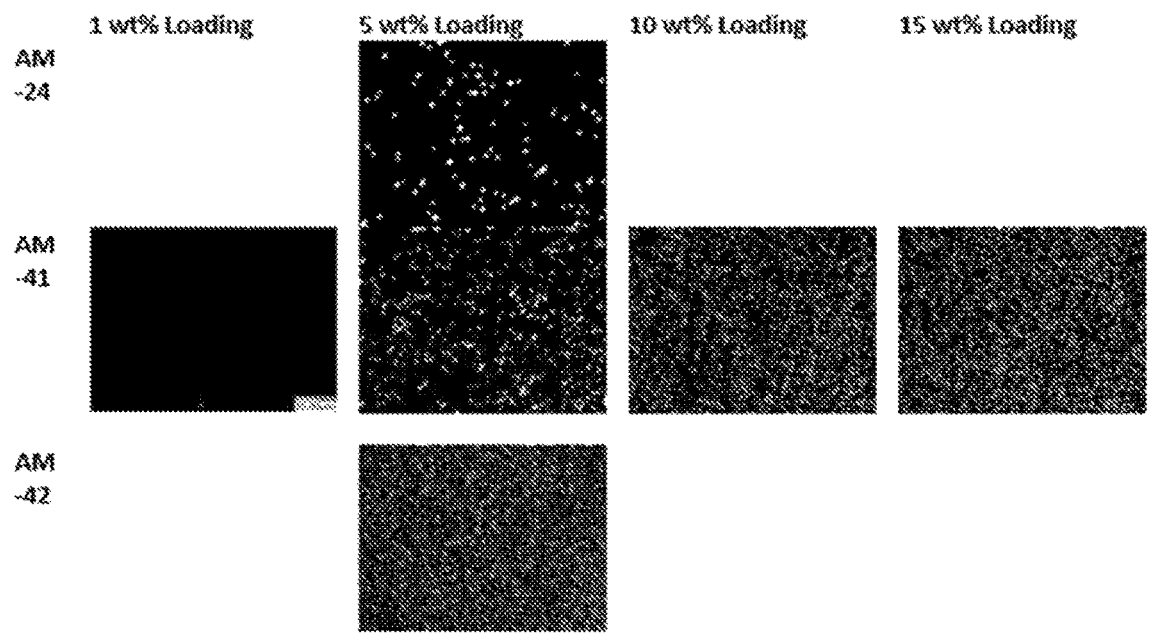
FIG. 7 is a table showing all of the analyzed surface images taken using a Keyence optical microscope at 2000× zoom. As weight percent loading of SAP is increased, the percent surface coverage of features increases. Additionally, as the weight percent PEG in SAP increased, there is more surface coverage but smaller feature sizes.

Changing the modularity (graft density of polyalkylene oxide and modular blocking groups) of the sidechain functionalized polysiloxane influenced the discrete feature size and coating morphology at the coating surface. A higher density of polyethylene oxide sidechains results in larger surface feature sizes at the coating surface (FIG. 5). Higher %) coverage was observed as the number of PEG grafts decreased, whereas the average feature size decreased as the number of PEG grafts decreased, with AM-42 having the highest %, coverage and smallest feature size. Additionally, increasing the concentration of AM-41 results in increased surface coverage of amphiphilic domains, yet there is no trend for average feature size. (FIG. 6). Analyzed optical images clearly demonstrate the aforementioned trends (FIG. 7, 42), highlighting the ability of PAO sidechain graft density and SAP concentration to control surface feature coverage and average feature size.

Figure 8A:
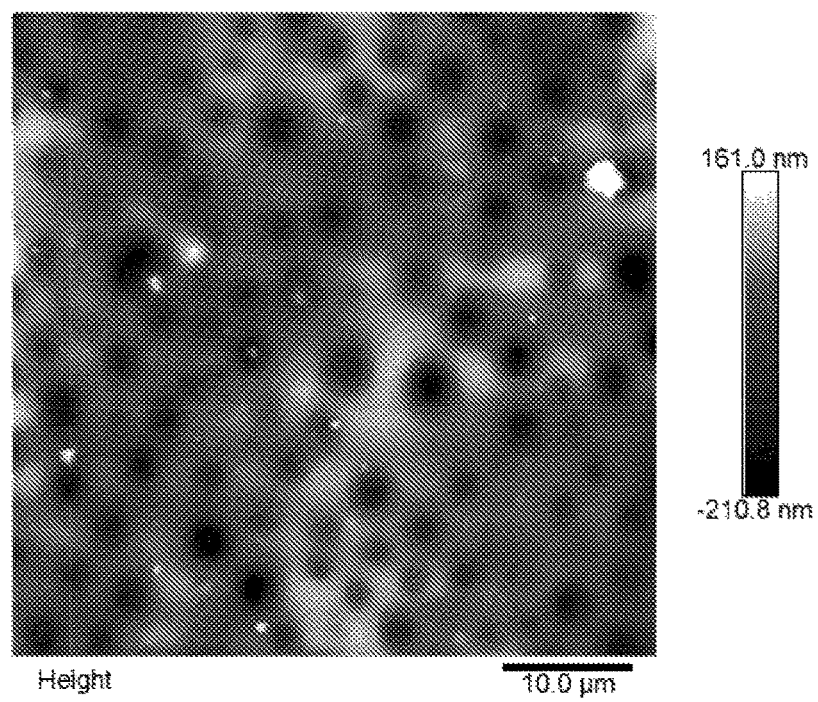
FIGS. 8A-8B are AFM images, height (FIG. 8A) and phase (FIG. 8B), for surfaces prepared from formulation 100093.
Figure 8B:
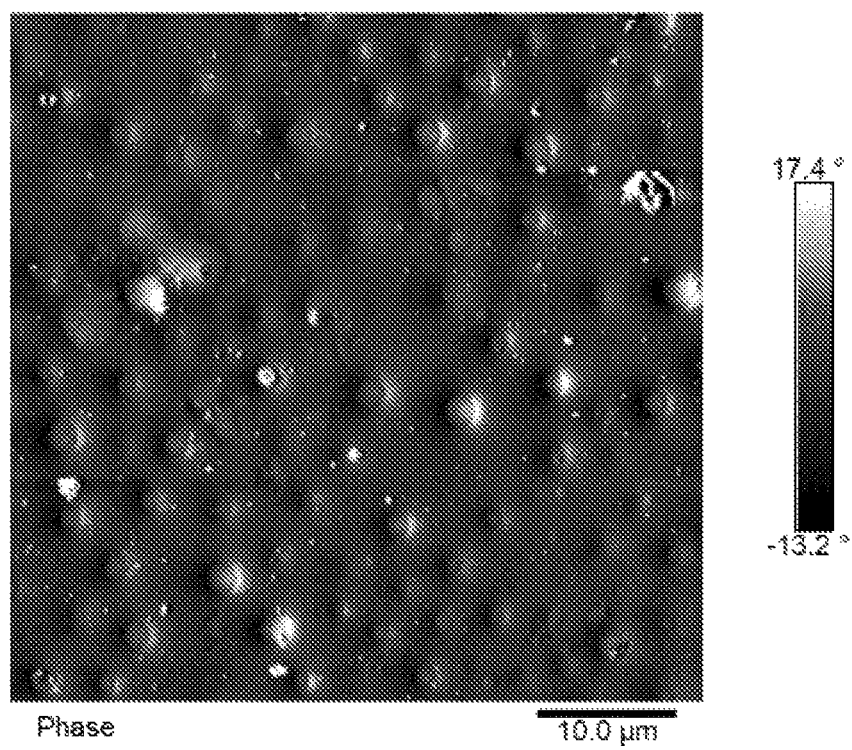
Figure 9A:
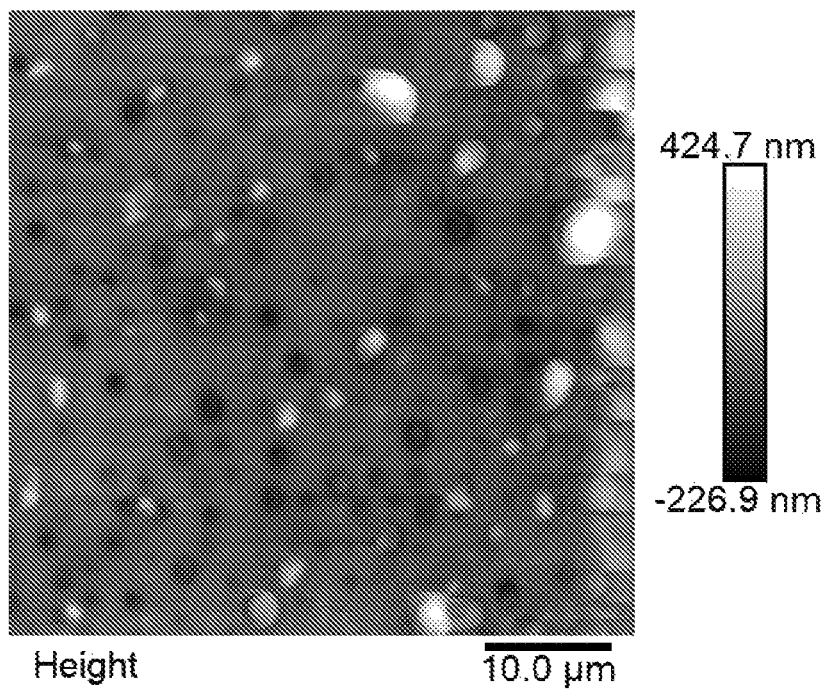
FIGS. 9A-9B are AFM images, height (FIG. 9A) and phase (FIG. 9B), for surfaces prepared from formulation 100157.
Figure 9B:
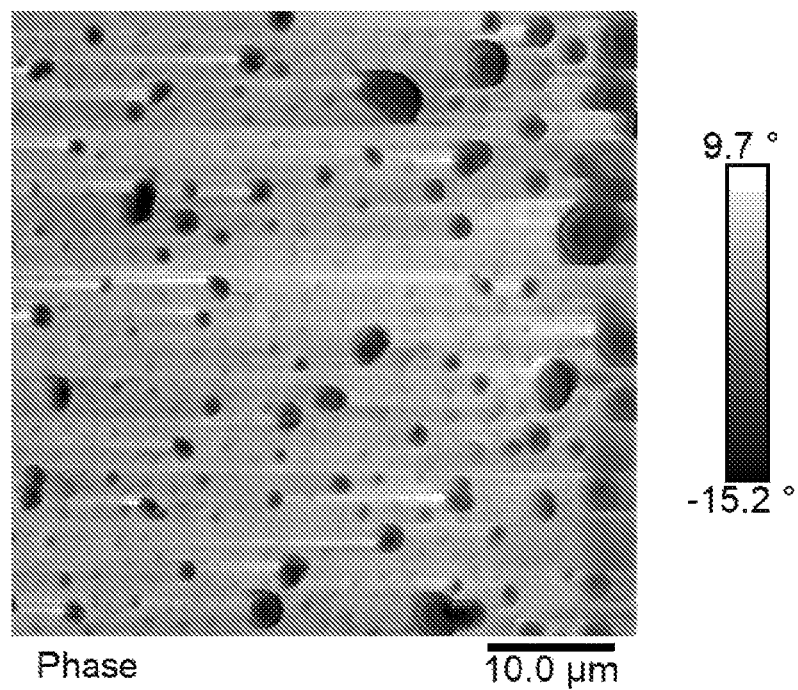

Surface feature size and topography of coatings were confirmed using atomic force microscopy (AFM) in tapping mode for representative formulations, 100093 and 100157, with AM-14 (FIG. 8) and an API package, including AM-14+Commercial Lubricant 1 (FIG. 9), respectively. Coating surfaces were probed using a 0.3 N/m cantilever with a 20 Hz resonant frequency (MicroMasch HQ:CSC37/AI BS).

AFM height images (FIG. 8A, 9A) demonstrate that features are shallow valleys, whereas AFM phase images (FIG. 8B, 9B) provide evidence that the discrete features have a distinct chemical composition relative to the continuous phase.

SEM Cross-Sections Demonstrate the Effect of Sidechain Functionalized Polysiloxanes on Controlling the Final Coating Morphology of Cured Compositions Formulations were prepared using the described formulation method, and then applied onto panels that were first coated with primer and then tiecoat with a 15-mil drawdown gap. Drawdowns were allowed to thoroughly cure before a small piece was cut out using a razor, and the cross section was imaged using SEM. The images were analyzed using a MATLAB code to quantify the discrete phase domains observed on the surface of each coating.

Figure 10:
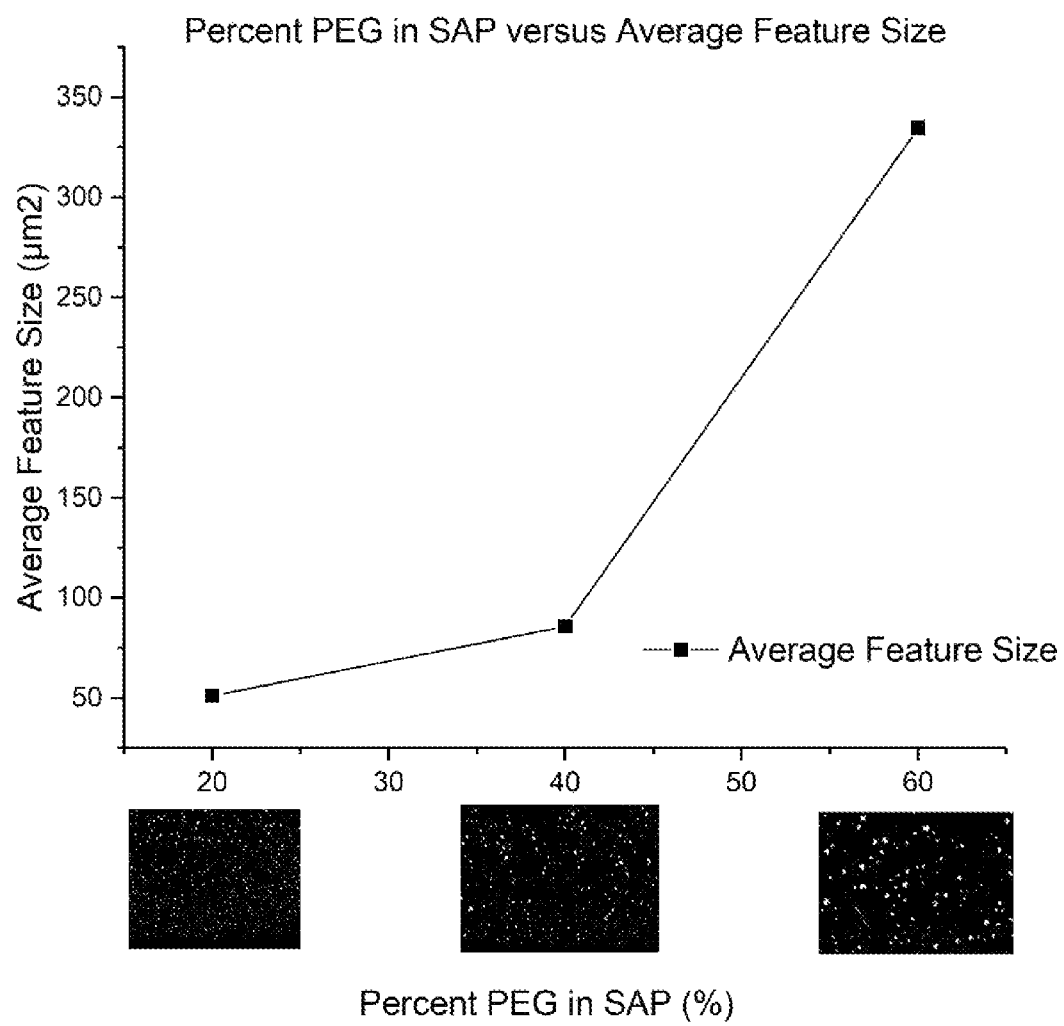
FIG. 10 is a graph showing the relationship between percent PEG in the formulation (100092, 100252, 100253) to the average feature size.

FIG. 10 shows that as a higher density of polyethylene oxide sidechains results in larger surface feature sizes throughout the coating, in line with observations from FIG. 6. This shows that it is possible to control the feature size in formulations by controlling the PEG graft density for PAO functionalized polysiloxanes.

Chemical Characterization of Discrete Features with Confocal Raman

Figure 11A:
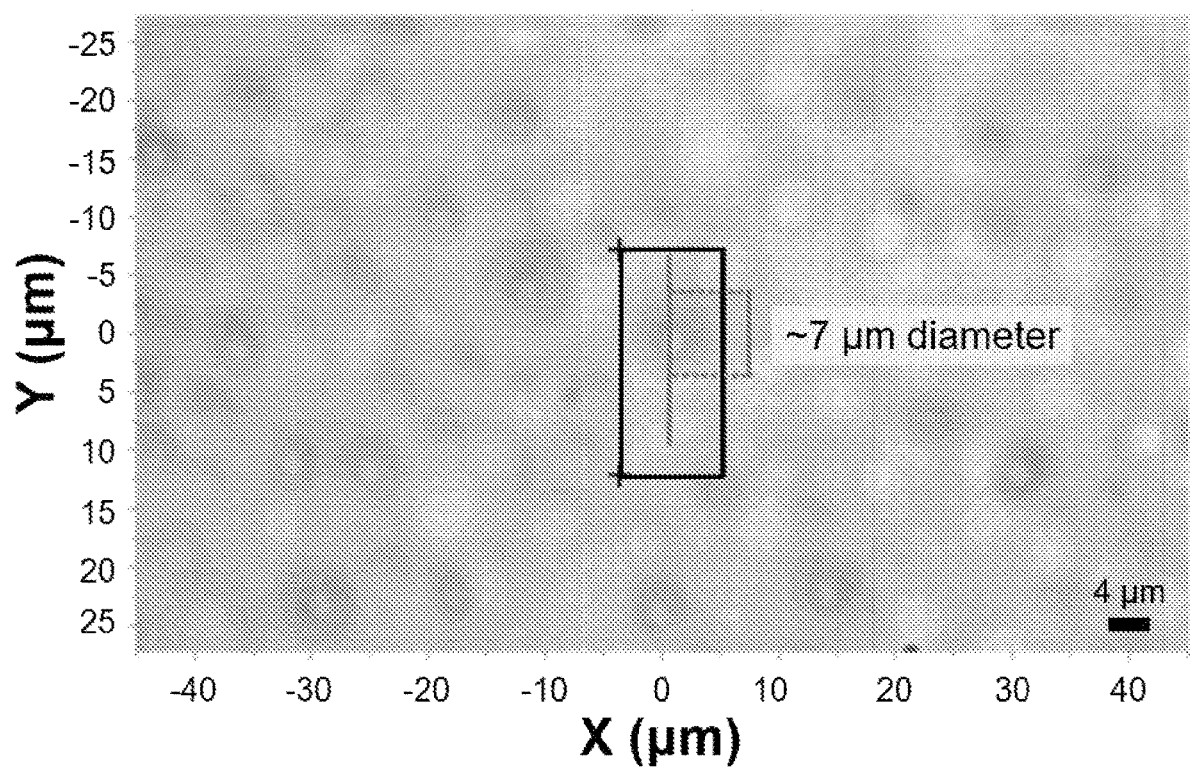
FIGS. 11A-11B include a surface image of example 100093 under an optical microscope (FIG. 11A), demonstrating SAP separation into discrete phases within a continuous silicone matrix.
Figure 11B:
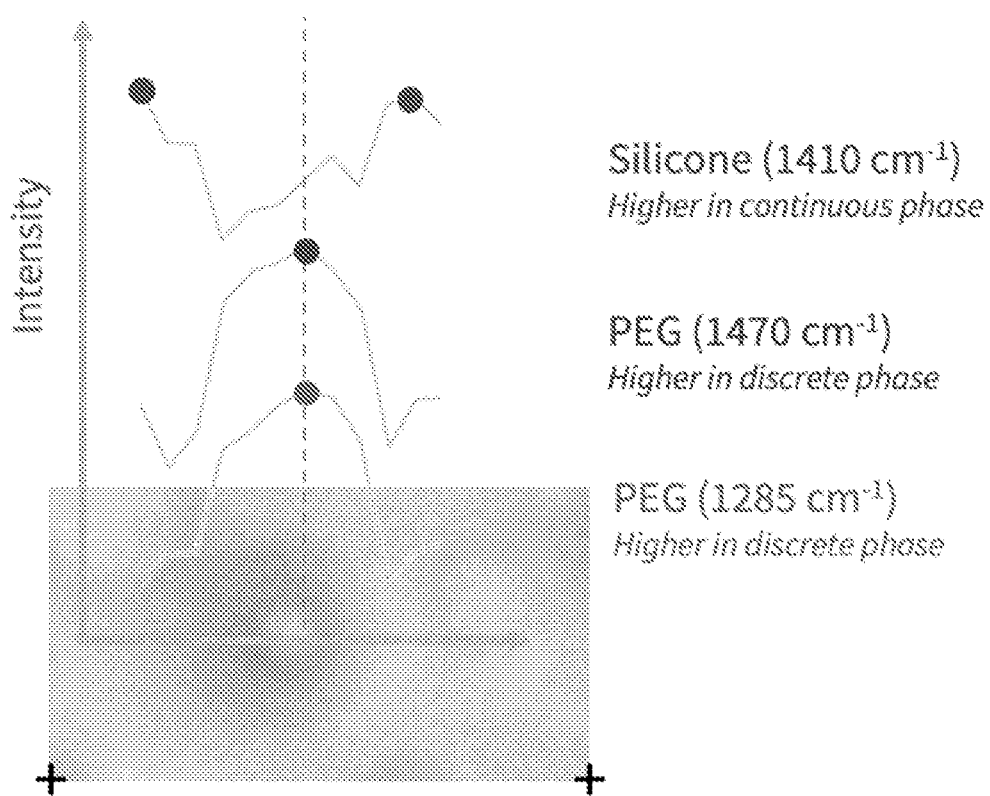

The chemistry of the discrete and continuous phase was mapped for example 100093 using Confocal Raman spectroscopy (Horiba LabRam Evolution) with a 633 nm laser and 600 mm diffraction grating. Raman intensities were measured from 1150 cm$^{-1}$ to 1650 cm$^{-1}$ at 12 different points along a line bisecting a discrete phase observed in 100093 (FIGS. 11A-11B). Unique PEG signal intensities at 1285 cm$^{-1}$ (CH$_2$ twisting) and 1470 cm$^{-1}$ (CH$_2$—CH$_2$ bending) show that the discrete phase is concentrated with PEG, and consequently SAP, whereas unique silicone signal intensity at 1410 cm$^{-1}$ shows that the continuous phase is concentrated with silicone.

XPS Demonstrates the Effect of Sidechain Functionalized Polysiloxanes on Controlling the Final Surface Chemistry of Cured Compositions The surface concentration of SAPs in silicone coating systems was evaluated via X-ray photoelectron spectroscopy (XPS). The surface concentration of SAPs in coatings is determined by quantifying the surface concentration of PEG C—O % from a high resolution C1s XPS spectrum. The stratification ratio is calculated as follows:

$$\text{Stratification Ratio} = \frac{\text{Measured } SAP \text{ surface concentration (wt. \%)}}{SAP \text{ concentration in formulation (wt. \%)}}$$

From this definition, the SAP has stratified to the surface in a coating system if the calculated stratification ratio is greater than 1. Example 100094 demonstrates the high stratification ratio of SAPs in a silicone coating.

Stratification of SAP in a Silicone Coating

| Example | SAP | SAP in Coating (wt. %) | Surface SAP (wt. %) | Stratification Ratio |
|---------|-------|------------------------|---------------------|----------------------|
| 100094  | AM-14 | 5                      | 26                  | 4.4                  |

Figure 12:
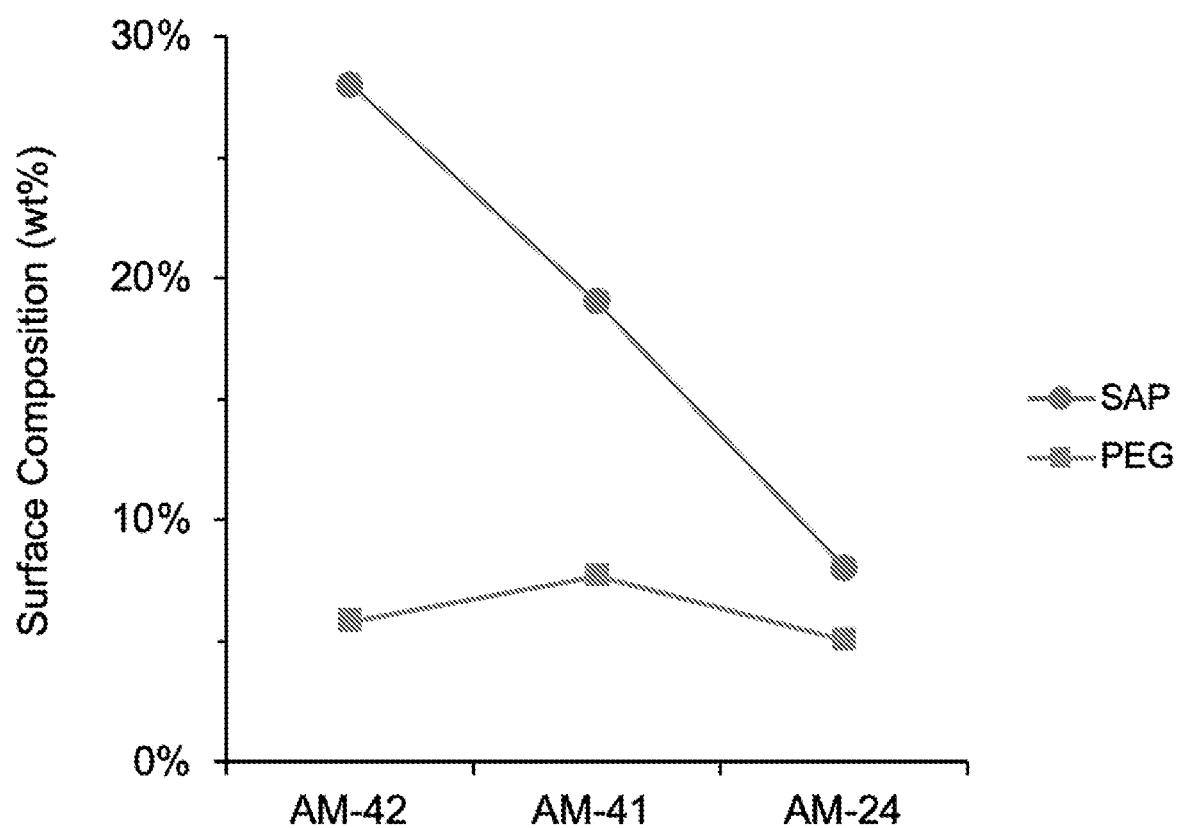
FIG. 12 is a plot of surface concentration of SAP and PEG in a silicone coating, which was quantified by measuring C—O contributions in an XPS $C^{1s}$ high resolution spectrum. Lower SAP hydrophilicity increases the amount of SAP present at the coating surface.

Furthermore, the modular design of SAP enables control of surface stratification. For example, SAPs were synthesized with the same silicone backbone but a different number of PEG sidechain grafts to create SAPs with different hydrophilic weight percentages. Example coatings were formulated with 5 wt % SAP in a silicone matrix, with SAP surface concentration measured by XPS (FIG. 12). SAPs with lower hydrophilicity have increased surface stratification in the silicone coating. As a result, the surface concentration of PEG varies not only with SAP hydrophilicity but also with SAP stratification. Controlled stratification enables the optimal PEG concentration to be presented at the coating surface using the least amount of SAP.

SAP stratification in silicone coatings was confirmed via XPS depth profiling. Silicone coatings were etched at a controlled rate using argon ion milling (monatomic, 10 keV) for 1 hour, with high resolution C1s spectra measured every 180s.

Figure 13:
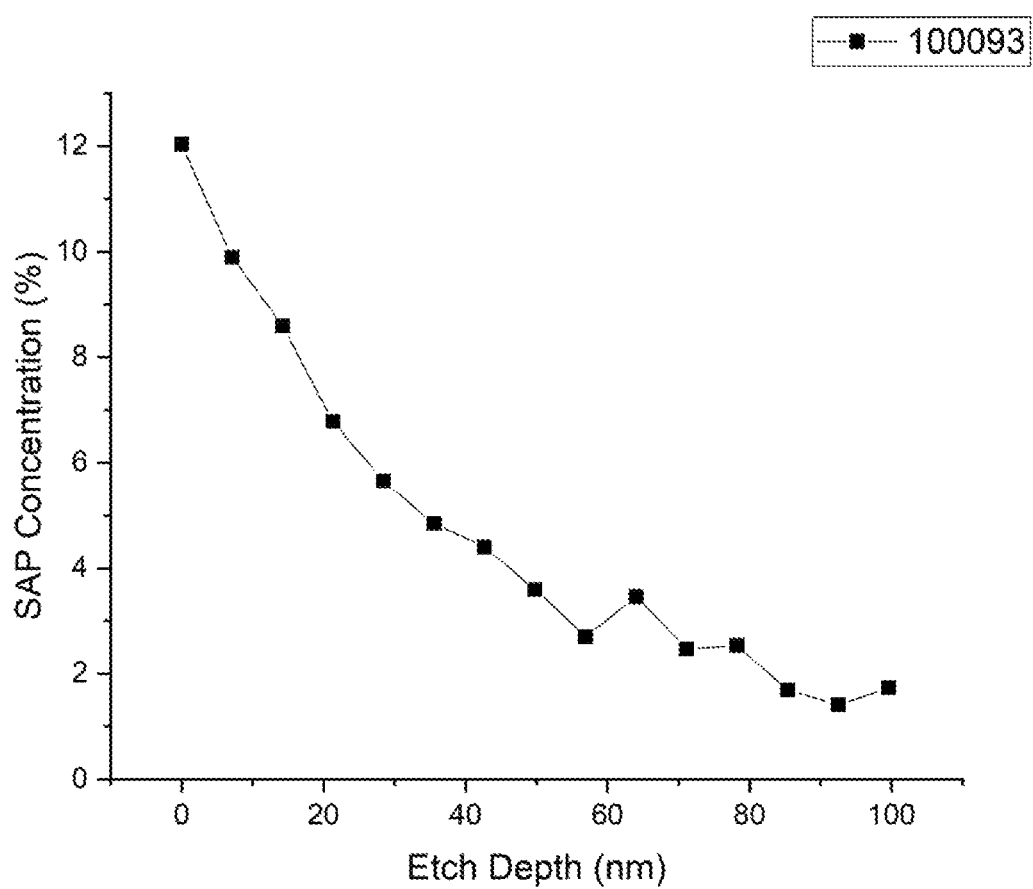
FIG. 13 is an XPS plot of the SAP concentration as a function of etch depth for a coating prepared from an example formulation with AM-14 (100093). SAP concentration is highest at the surface and monotonically decreases, confirming SAP stratification near the coating surface.
Figure 14:
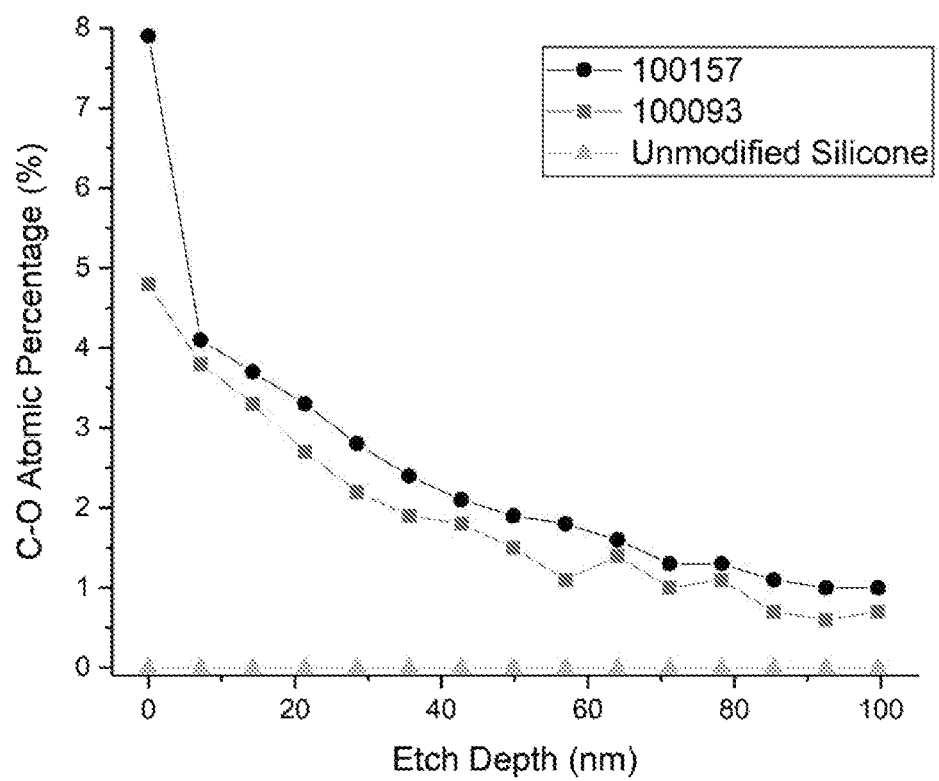
FIG. 14 is an XPS plot of the C—O atomic percentage as a function of etch depth for coatings prepared from example formulations with APIs (100157, 100093) compared to an unmodified silicone coating. API concentration is highest at the surface and monotonically decreases, confirming API stratification near the coating surface.

From example 100093, it is confirmed that SAPs are stratifying, as a higher concentration of SAP is present at the coating surface and decreases monotonically below the surface (FIG. 13). From example 100157, it is confirmed that SAP and lubricant are stratifying, as a higher concentration of C—O is present at the coating surface and decreases monotonically below the surface (FIG. 14).

Figure 15:
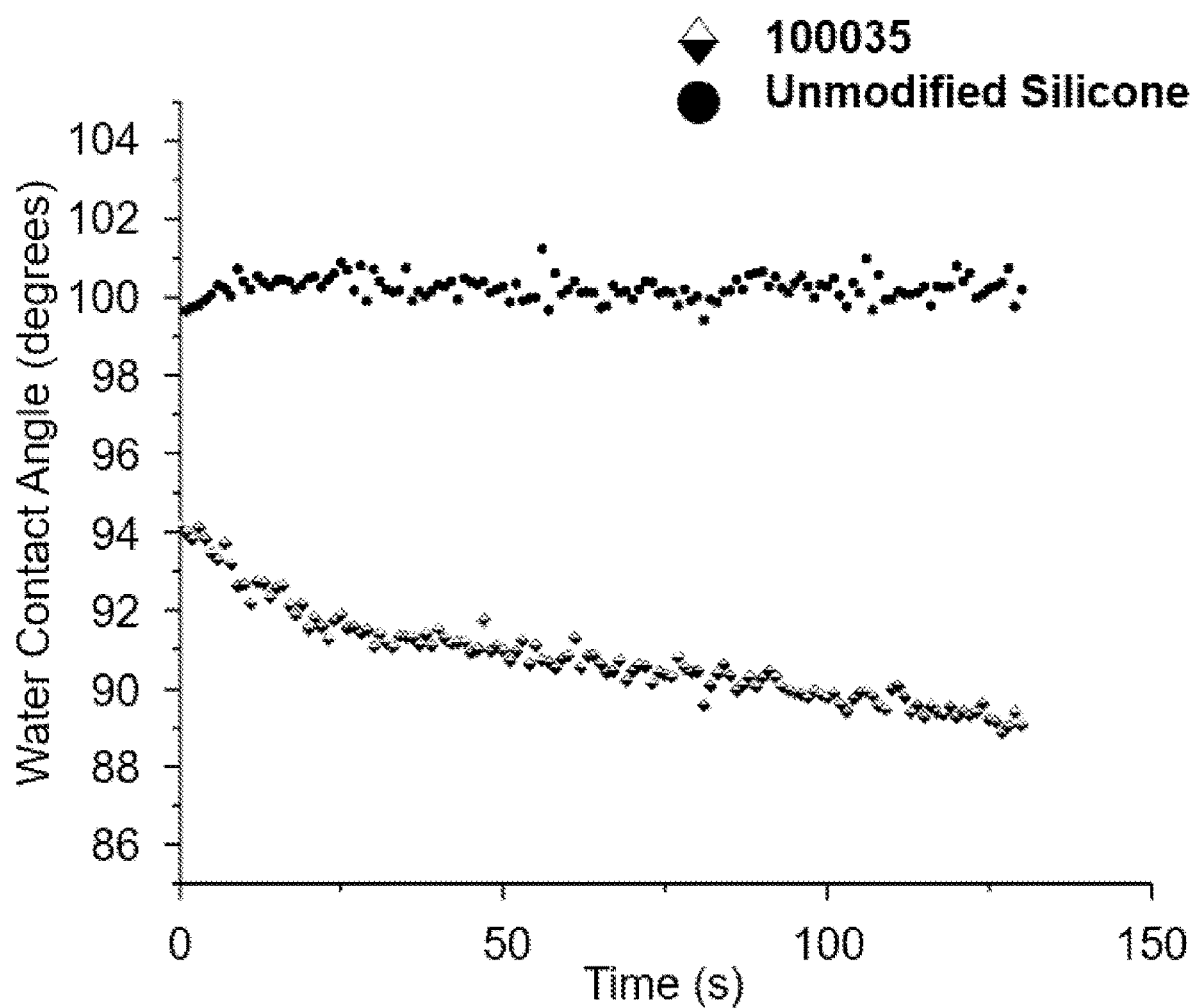
FIG. 15 is a graph of the water contact angle (degrees) as a function of the amount of time (seconds) after being exposed to water for articles coated with a silicone binder system with and without surface active polymer (AM-14).
Figure 16:
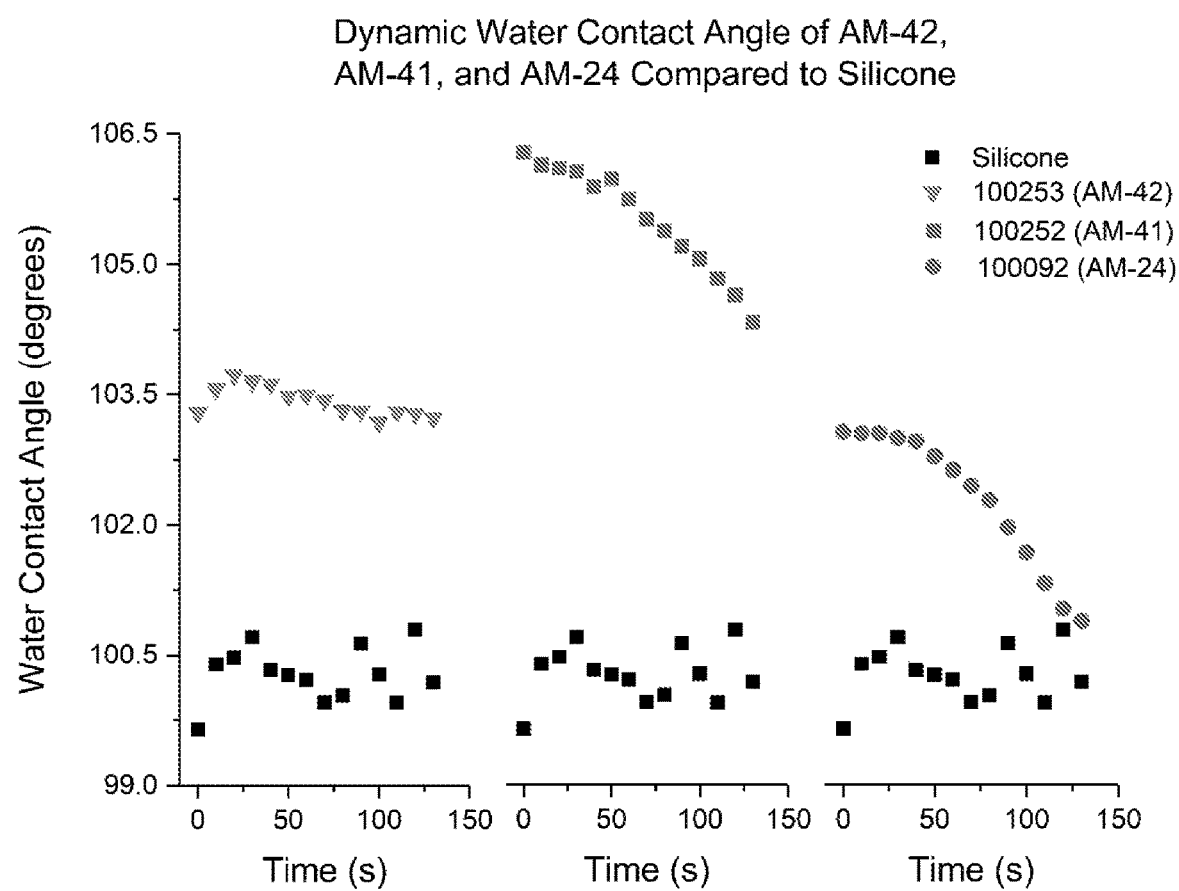
FIG. 16 is a graph displaying the contact angle with water of AM-24 (100092), AM-41 (100252), and AM-42 (100253) over 130 seconds. It shows that adding amphiphilic SAP into the binder creates a dynamic wetting surface.

SAP stratification changed the surface chemistry of coatings by presenting different amounts of PAO sidechain modified organosiloxanes at the coating surface. FIG. 15 and FIG. 16 demonstrate that SAPs create a dynamic wetting contact angle compared to a silicone control.

Coatings incorporating AM-42, AM-41, and AM-24 with varying PEG/trimethylsilane graft density (PEG density from low to high: 100253, 100252, and 100092) were evaluated for dynamic water contact angle. The results shown in FIG. 16 demonstrate that increasing PEG graft density lead to more pronounced spontaneous wetting of the water droplet. Coating 100093 with AM-24 and 100252 with AM-41 show more pronounced dynamic wetting behavior compared to that of 100252 with AM-42. Not bound by particular theory, it suggested that the surface rearrangement of the coating from hydrophobic to hydrophilic upon exposure to water is due to exposure of PEG chains at the coating/water interface. Further, results suggest that having the ability to control the modularity of the SAPs allow for tuning dynamic wetting behavior of the coatings containing SAPs.

Protein Resistance Properties of Silicone Coatings Made with SAPs

Human Fibrinogen (HF) adsorption onto silicone films was measured using a modified immunosorbent assay. Three replicate coated wells of each composition were exposed to 0.15 mL of HF solution prepared in phosphate buffered saline (PBS) (3.0 mg/mL) and statically incubated for 1 h at 37° C. The protein solution was removed and each well was rinsed three times with PBS before the addition of TBS-T20 (0.50 mL), which was incubated for 30 min at 37° C. Wells were then rinsed three times with TBS-T20. Next, to each well was added 0.5 mL goat antifibrinogen (HRP)-conjugated polyclonal detection antibody (1:50 000 dilution in TBS-T20) and statically incubated for 1 h at 37° C. Wells were then rinsed three times with TBS-T20. TMB di-HCl substrate solution (0.5 mL) was added and allowed to incubate for 30 min at 37° C. To stop the reaction, 2 M $H_2SO_4$ was added to each well and plates were shaken on an orbital shaker at RT for 15 min. To quantify the amount of adsorbed HF on each surface, 0.15 mL of each resulting solution was transferred to a 96-well plate, absorbance was measured at 450 nm using a spectrophotometer (Tecan Safire2), and the value was compared to a HF standard curve (0.01 to 10 000 ng/mL). An unmodified silicone coated slide served as a hydrophobic control and demonstrated high protein adsorption.

Figure 17:
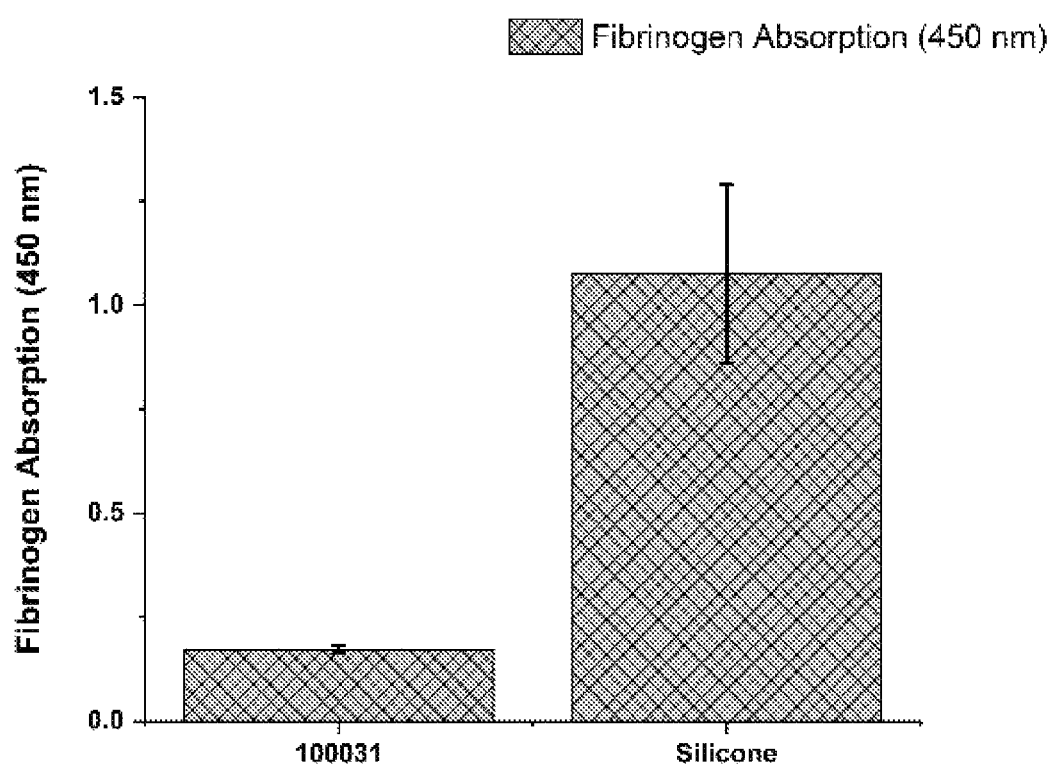
FIG. 17 is a graph of human fibrinogen absorption on a silicone formulation containing an SAP and lubricant (formulation 100031) vs. an unmodified silicone.

Fibrinogen absorption of formulation 100031 containing AM-14 and lubricant was compared against the unmodified silicone control (FIG. 17). The incorporation of AM-14 into silicone coatings significantly lowered Fibrinogen absorption, demonstrating protein resistance properties.

Biofouling Resistance Properties of Silicone Coatings Made with SAPs

Multiple replicate panels of each coating were immersed in Port Canaveral, Fla. for 3 months. Field test panels were prepared by applying an epoxy primer coating on 4"×8" PVC panels. After 12-24 hours, a 3" wide drawdown bar was used to apply example topcoat formulations to the panel, resulting in a dry film thickness (DFT) between 6-10 mils. The remaining uncoated edges (<1") were brush applied with topcoat formulation to minimize edge effect. The panels were immersed (under static conditions) about 0.5-1 m below the waterline. Pictures of the panels were taken to assess the biofouling control properties.

Figure 18:
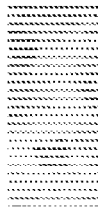
FIG. 18 is images of the accumulation of biomaterials on coated articles following a field test for articles coated with sample formulations containing a surface active polymer as well as for a reference commercial foul release formulation and PVC.
Figure 18:
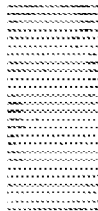
Figure 18:
Figure 18:
Figure 18:
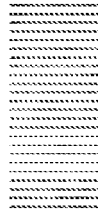
Figure 18:
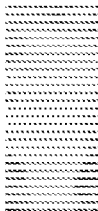
Figure 18:
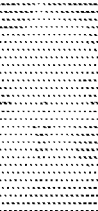
Figure 18:
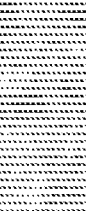

Field results shown in FIG. 18 suggest that AM-14 has significant positive impact on biofouling performance (formulation 100035 show lower fouling coverage compared to PVC and comparable performance to commercial FR). Incorporating amphiphilic lubricant DBE-224 with AM-14 (100031, 100033, and 100037) show superior biofouling performance compared to the combination of partially fluorinated lubricant DM-100 and AM-14 (100036), commercial FR, and the PVC control or incorporating DBE-224 alone.

Figure 19:
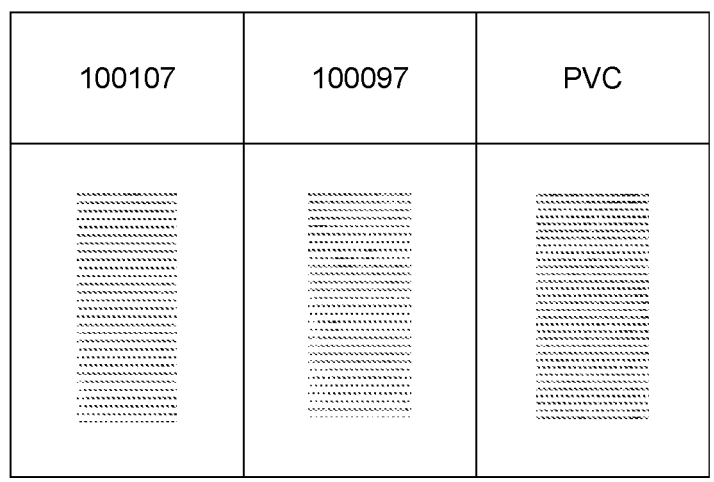
FIG. 19 is images of panel testing demonstrating field performance of coating containing AM-20 compared to PVC control.

Field results in FIG. 19 suggest that AM-20 has a significant positive impact on biofouling performance (formulation 100097 lover biofouling coverage compared to PVC control). Further incorporating amphiphilic lubricant DBE-224 and AM-20 together also show significant biofouling performance compared to the PVC control.

Compositions Containing Polyalkylene Oxide Sidechain Functionalized Organosiloxanes with One or More Releasing Biocidal Group: Formulation Examples Silanols of varying molecular weight were combined and speedmixed at 3500 rpm for 1 min. Then the corresponding fillers, pigments and additives were incorporated by speedmixing; $1^{st}$ a 20 sec ramp to 3500 rpm and holding for 1 min of additional mixing at that rpm. Next the lubricant/s, SAPs, and releasing biocides were added to the mixture and speed mixed for 1 min at 2500 rpm. Finally, polydiethoxysiloxane and DBTDL were added and speedmixed for 1 min at 2500 rpm. The coating was applied onto previously primed and tie-coated panels using a drawdown bar with a 7.5 mil WFT. Such systems can also be packaged into a two-part coating system that reacts upon mixing, or a one-part system that reactions upon exposure to water, or humidity present in the environment.

Formulations Made Using Polyalkylene Oxide Sidechain Functionalized Organosiloxanes with One or More Releasing Biocides, Pigments and Additives

| Material Name | Commercial Ref | 100013 | 100014 | 100015 | 100016 | 100018 |
|---|---|---|---|---|---|---|
| Binder/Filler/Pigment | | | | | | |
| Silanol Terminated Polydimethylsiloxanes | | 71.38% | 71.38% | 78.82% | 68.97% | 63.34% |
| Black Pigment | Black 30C965 | 0.37% | 0.37% | 0.41% | 0.36% | 0.33% |
| White Pigment | LANSCO 8086 | 0.95% | 0.95% | 1.04% | 0.91% | 0.84% |
| Filler | Aerosil R972 | 2.44% | 2.44% | 2.69% | 2.36% | 2.16% |
| Pigments Total | | 1.32% | 1.32% | 1.45% | 1.27% | 1.17% |
| Pigments + Filler Total | | 3.76% | 3.76% | 4.14% | 3.63% | 3.33% |
| Lubricant | | | | | | |
| Hydrophilic polysiloxane fluid | DBE-224 | | | | 9.97% | 10.04% |
| US EPA, EU BPR Approved Biocides | | | | | | |
| Biocide | SeaNine 211N | | | | 3.00% | 10.04% |
| Naturally Occurring Biocides | | | | | | |
| Natural Compound or Oil | Thymol | | | 0.55% | | |
| Natural Compound or Oil | Oregano Oil | 9.95% | | | | |
| Natural Compound or Oil | Clove Bud Oil | | 9.95% | | | |
| Other ingredients | | | | | | |
| Surface Active Polymer | AM-14 | 5.22% | 5.22% | 5.77% | 5.05% | 4.63% |
| Poly(Diethoxysiloxane) | PSI-021 | 8.95% | 8.95% | 9.89% | 8.65% | 7.95% |
| Dibutyltin dilaurate | DBTDL | 0.75% | 0.75% | 0.82% | 0.72% | 0.66% |
| Total | | 100 | 100 | 100 | 100 | 100 |

Formulations Made Using Polyalkylene Oxide Sidechain Functionalized Organosiloxanes with One or More Releasing Biocides, Pigments and Additives

| Material Name | Commercial Ref | 100019 | 100020 | 100021 | 100022 | 100024 |
|---|---|---|---|---|---|---|
| Binder/Filler/Pigment | | | | | | |
| Silanol Terminated Polydimethylsiloxanes | | 68.97% | 63.34% | 63.34% | 68.97% | 66.57% |
| Black Pigment | Black 30C965 | 0.36% | 0.33% | 0.33% | 0.40% | 0.35% |
| White Pigment | LANSCO 8086 | 0.91% | 0.84% | 0.84% | 0.91% | 0.88% |
| Filler | Aerosil R972 | 2.36% | 2.16% | 2.16% | 2.36% | 2.27% |
| Pigments Total | | 1.27% | 1.17% | 1.17% | 1.31% | 1.23% |
| Pigments + Filler Total | | 3.63% | 3.33% | 3.33% | 3.67% | 3.50% |
| Lubricant | | | | | | |
| Fluorinated polysiloxane fluid | DM-100 | 9.97% | 10.04% | | | |
| Hydrophilic polysiloxane fluid | DBE-224 | | | | 9.97% | 9.97% |
| Hydrophilic polysiloxane fluid | Commercial Lubricant 1 | | | 10.04% | | |
| US EPA, EU BPR Approved Biocides | | | | | | |
| Biocide | SeaNine 211N | 3.00% | 10.04% | 10.04% | | |
| Biocide | Econea | | | | 3.00% | 6.03% |

-continued

| Material Name | Commercial Ref | 100019 | 100020 | 100021 | 100022 | 100024 |
|---|---|---|---|---|---|---|
| Other ingredients | | | | | | |
| Surface Active Polymer | AM-14 | 5.05% | 4.63% | 4.63% | 5.05% | 4.87% |
| Poly(Diethoxysiloxane) | PSI-021 | 8.65% | 7.95% | 7.95% | 8.65% | 8.35% |
| Dibutyltin dilaurate | DBTDL | 0.72% | 0.66% | 0.66% | 0.72% | 0.70% |
| Total | | 100 | 100 | 100 | 100 | 100 |

Figure 20:
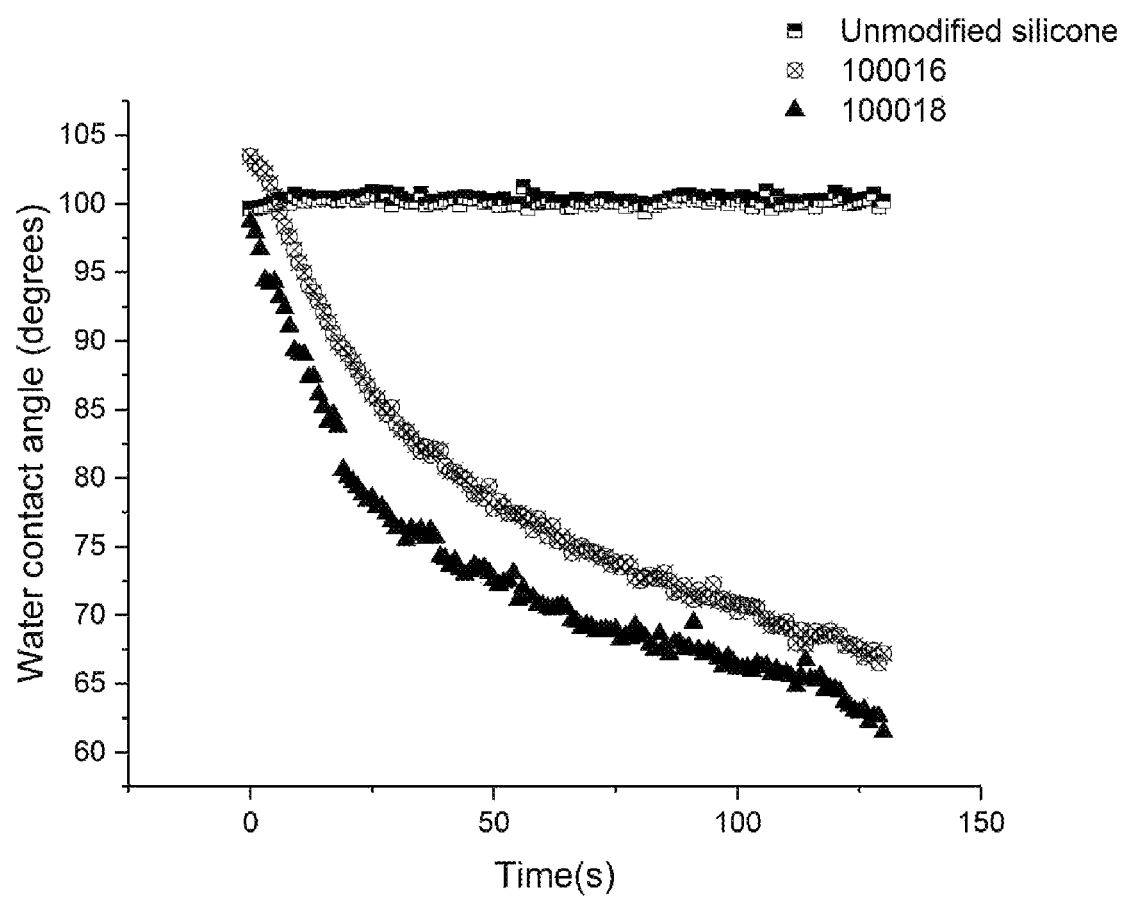
FIG. 20 is a graph of the water contact angle for an unmodified silicone coating and a silicone coating modified with SAP AM-14. Measurements were conducted in air after the coatings were subjected to 8 weeks of continuous submersion in tap water for 8 weeks. The addition of biocide does not compromise the dynamic water contact angle behavior.

Formulations Made Using Polyalkylene Oxide Sidechain Functionalized Organosiloxanes with One or More Releasing Biocides, Pigments and Additives FIG. 20 shows the water contact angle (WCA) measured in air. The formulations modified with SAP AM-14 and biocide display dynamic wetting behavior. Modifying a

| Material Name | Commercial Ref | 100025 | 100026 | 100027 | 100041 | 100049 | 100198 |
|---|---|---|---|---|---|---|---|
| Binder/Filler/Pigment | | | | | | | |
| Silanol Terminated Polydimethylsiloxanes | | 68.97% | 66.57% | 66.57% | 65.59% | 71.38% | 68.93% |
| Black Pigment | Black 30C965 | 0.36% | 0.35% | 0.35% | 0.34% | 0.37% | |
| White Pigment | LANSCO 8086 | 0.91% | 0.88% | 0.88% | 0.87% | 0.95% | |
| Filler | Aerosil R972 | 2.36% | 2.27% | 2.27% | 2.24% | 2.44% | |
| Pigments Total | | 1.27% | 1.23% | 1.23% | 1.21% | 1.32% | |
| Pigments + Filler Total | | 3.63% | 3.50% | 3.50% | 3.45% | 3.76% | |
| Lubricant | | | | | | | |
| Fluorinated polysiloxane fluid | DM-100 | 9.97% | 9.97% | | | | |
| Hydrophilic polysiloxane fluid | DBE-224 | | | | 10.05% | 9.95% | |
| Hydrophilic polysiloxane fluid | Commercial Lubricant 1 | | | 9.97% | | | 10.00% |
| US EPA, EU BPR Approved Biocides | | | | | | | |
| Biocide | SeaNine 211N | | | | 2.97% | | 2.70% |
| Biocide | Econea | 3.00% | 6.03% | 6.03% | | | |
| Other ingredients | | | | | | | |
| Surface Active Polymer | AM-14 | 5.05% | 4.87% | 4.87% | 9.71% | 5.22% | 9.00% |
| Poly(Diethoxysiloxane) | PSI-021 | 8.65% | 8.35% | 8.35% | 7.54% | 8.95% | 8.65% |
| Dibutyltin dilaurate | DBTDL | 0.72% | 0.70% | 0.70% | 0.69% | 0.75% | 0.72% |
| Total | | 100 | 100 | 100 | 100 | 100 | 100 |

Biocide Miscibility Screening

Each component was mixed as 50:50 (based on active solids) mixture. The content was allowed to sit for 24 hrs before photographing.

SeaNine 211N is miscible with both AM-14 and AM-24 amphiphiles while it did not show complete miscibility with PDMS (silanol). Econea displays good miscibility with AM-24. However, Econea is only partially miscible with AM-14 and PDMS (silanol). Econea and SeaNine 211N are not miscible with each other.

| C1 (AM-24-SeaNine) | C2 (AM-14-SeaNine) | C4 (SeaNine-Econea) | C5 (Silanol-SeaNine) |
|---|---|---|---|
| Miscible | Miscible | Not miscible | Phases |
| D1 (AM-24-Econea) | D2 (AM-14-Econea) | D3 (Econea-SeaNine) | D5 (Silanol-Econea) |
| Miscible | Phases | Not miscible | Not miscible |

Surface Chemistry

Water contact angle of unmodified silicone coating and a silicone coating modified with SAP AM-14. Measurements were conducted in air after the coatings were subjected to 8 weeks of continuous submersion in tap water for 8 weeks. silicone binder system with said SAP (AM-14 in this embodiment) creates an amphiphilic surface.

Evaluation of Biocide Release Control by SAPs

Coating formulations were prepared incorporating AM-14 and active leachable biocide SeaNine 211N. The coatings were applied onto metal disks that was primed and tie-coated previously. After the coatings have dried, the disks were then glued to the bottom of 24 well assay plates. The samples were pre-leached/conditioned in a water tank which is equipped to drain and refill every 4 hours, accelerating the leaching process. Formulation 100049 was pre-leached in a separate tank (under that same condition as other samples) to avoid cross contamination of biocide. The coatings were allowed to pre-leach for 28 days. After 28 days, a standard volume of artificial seawater was added in to each well plate and set for 24 hrs allowing biocide to leach. These aliquots were considered as leachates. The toxicity of the leachates were assessed by introducing *N. incerta* algae culture and evaluating the growth/death of algae after 48 hrs via fluorescence of chlorophyll. Growth in coating leachates was reported as a fluorescence ratio to a positive growth control (fresh nutrient medium). A negative growth control (medium+bacteria+triclosan) was also included in the analysis. Each extract was diluted to achieve 100%, 50%, 25%, 12.5% and 6.25% of original leachate strength/concentration. The 100% leachate strength represents the toxicity of the extract collected over 24 hrs. Lower fluorescence values show algae death compared to the positive growth control indicating the presence of biocide in the extracts. After the first exaction at 28 days, the coatings were resubmerged in the leach tanks for additional 14 days (adding to total of 42 days of pre-leaching) and toxicity of the extracts were evaluated again.

Figure 21A:
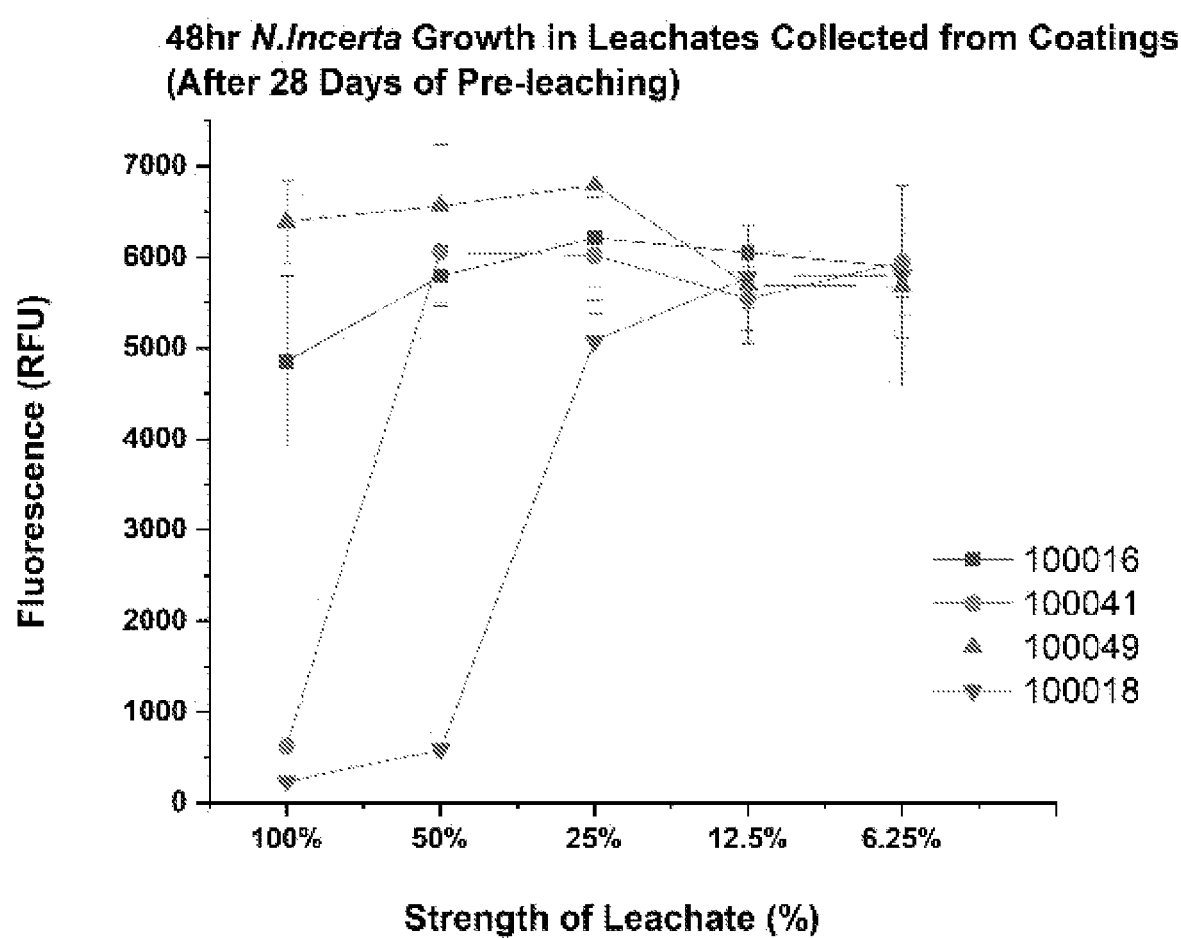
FIGS. 21A-21B are graphs of the growth of *N. incerta* in leachates (strengths 100% to 6.25% dilutions) collected from formulations after 28 days of pre-leaching (FIG. 21A) and 42 days of pre-leaching (FIG. 21B).
Figure 21B:
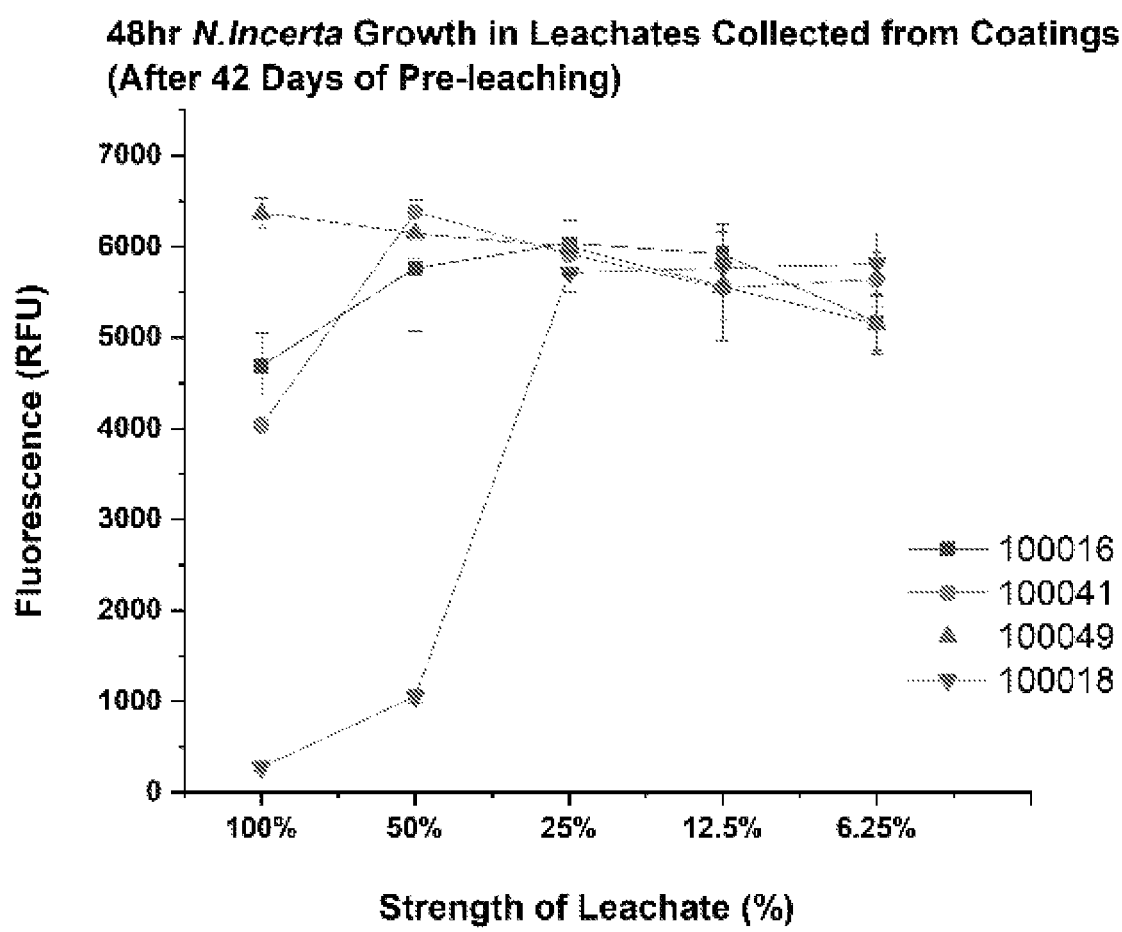

FIG. 21A demonstrates that, after 28 days, extracts from the formulation with 10% AM-14 (100041) displayed higher biocide concentration compared to extracts from the formulation with 5% of AM-14 (100016). Although both of these formulations contained the same amount of biocide, having double the concentration of AM-14 resulted in extended activity of the biocide. The same trend was still observable after 42 days of pre-leaching (FIG. 21B) although the high loading (10% of SeaNine 211N) shows the highest biocide activity. The results suggest that the surface active polymer have the ability to tune the release rate of active materials, which in this case is a biocide.

Biocide Laboratory Biological Testing

Anti-fouling properties of the coatings were tested using laboratory biological assays. In certain cases, the coatings were pre-leached in tap water for 7, 14, 28, and 42 days before analysis (this provide better resolution in to the data as burst release of the biocide can be avoided). Coatings were tested against gram negative marine bacteria *H. marina, P. atlantica* and marine diatom *N. incerta*. Detailed experimental procedure for laboratory assays can be found in papers; Stafslien S. J. et al. *J. Comb. Chem.*, 2006, 8, 156-162, Kugel A. J. et al. *J. Coat. Technol. Res.*, 2009, 6, 107-121, and Majumdar P. et al. *J. Comb. Chem.*, 2009, 11, 1115-1127. Typically, overnight extracts from the coatings were used to analyze the bacterial biofilm growth in leachates. ATP bioluminescence assay was also conducted to evaluate the growth on the coating surface.

Figure 22:
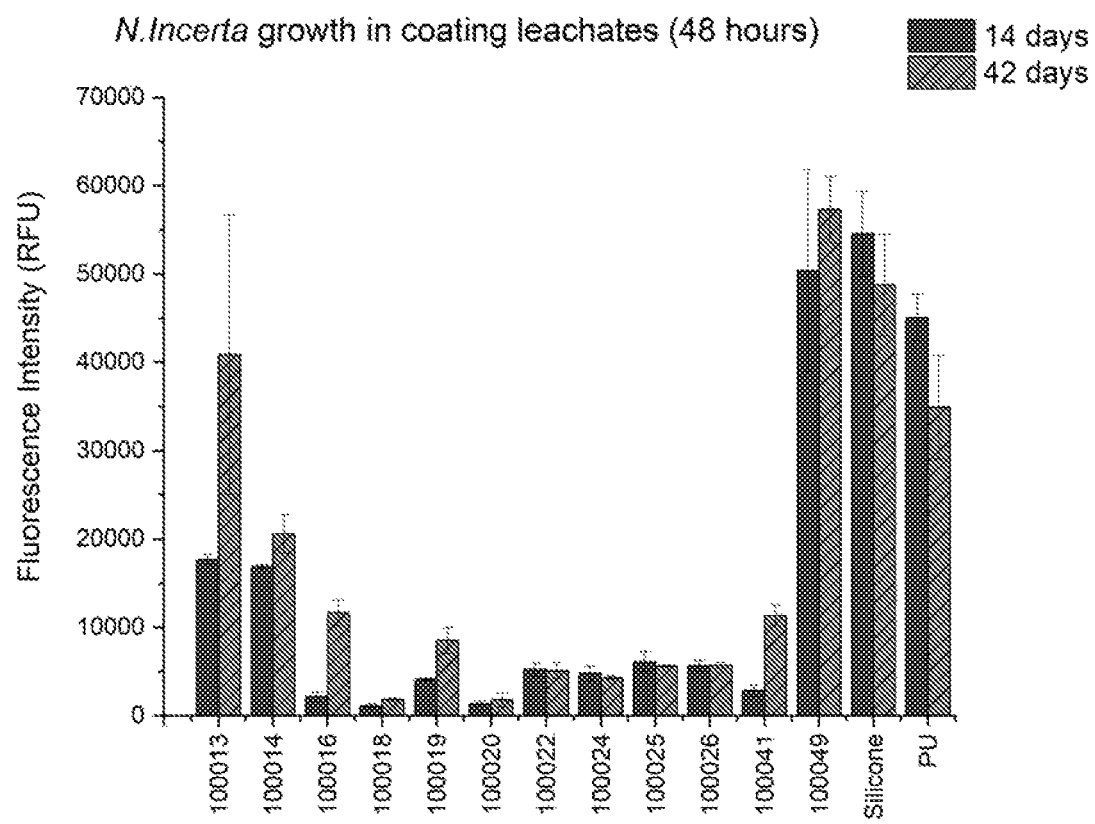
FIG. 22 is a bar chart of the measured fluorescence intensity of *N. incerta* cell growth in leachates for various coating formulations measured at 14 days and again at 42 days. The small error bars indicate that the biocide is released from the coating at a consistent and effective rate.

Incorporating a biocide (organic or natural) significantly inhibits the growth of marine diatoms (*N. incerta*) compared to a formulation that did not contain a biocide (FIG. 22). *N. incerta* cell growth in leachates from formulations 100013, 100014, 100016, 100018, 100019, 100020, 100022, 100024, 100025, 100026, 100041 are significantly lower compared to that of 100049, silicone, polyurethane (PU).

Higher concentration of organic biocide SeaNine211N shows greater anti-fouling properties. Organic biocides have higher antifouling efficiency compared to natural oils. Leachates for 100049 (with AM-14 and lubricant) is similar to silicone indicating lack of toxicity without the biocide.

Figure 23:
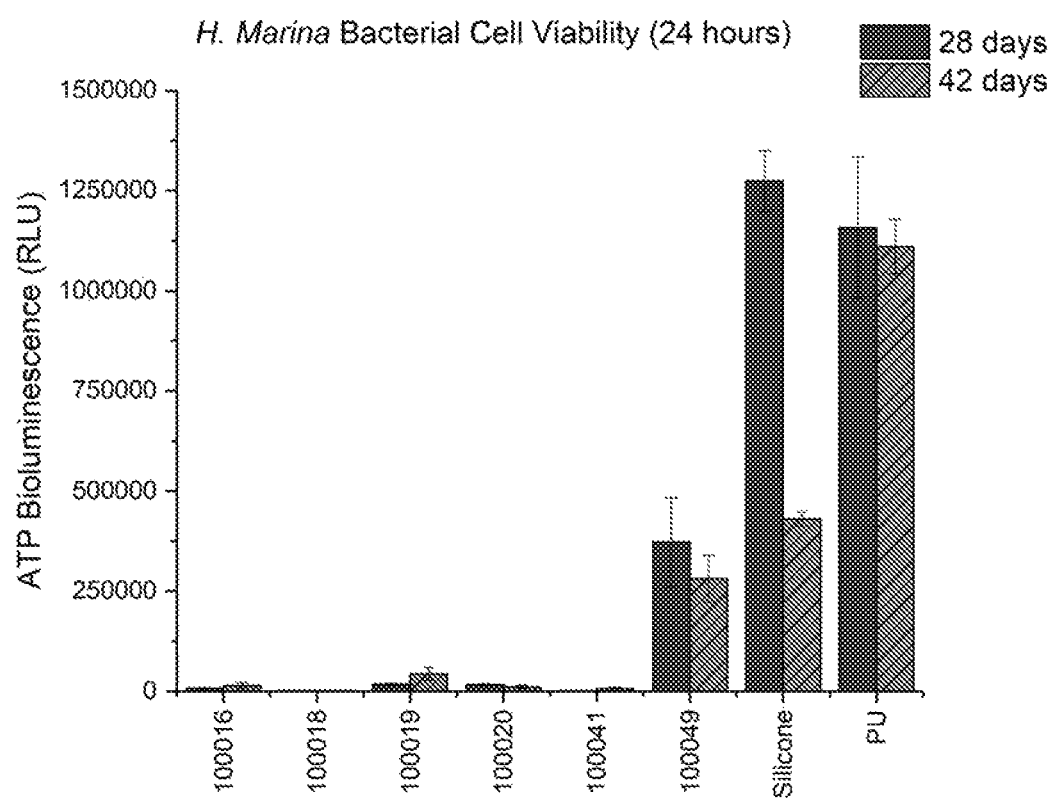
FIG. 23 is a bar chart of the bacterial cell viability for *H. Marina* for various coating formulations measured at 28 days and again at 42 days.

Incorporating biocide into the formulation significantly reduced the bacterial biofilm formation, resulting in surface antifouling/biofouling inhibition properties (FIG. 23). Significantly low bacterial biofilm formation was observed for coatings 100016, 100018, 100019, 100020, 100041 compared to formulation 100049, silicone, and PU without biocide.

Figure 24:
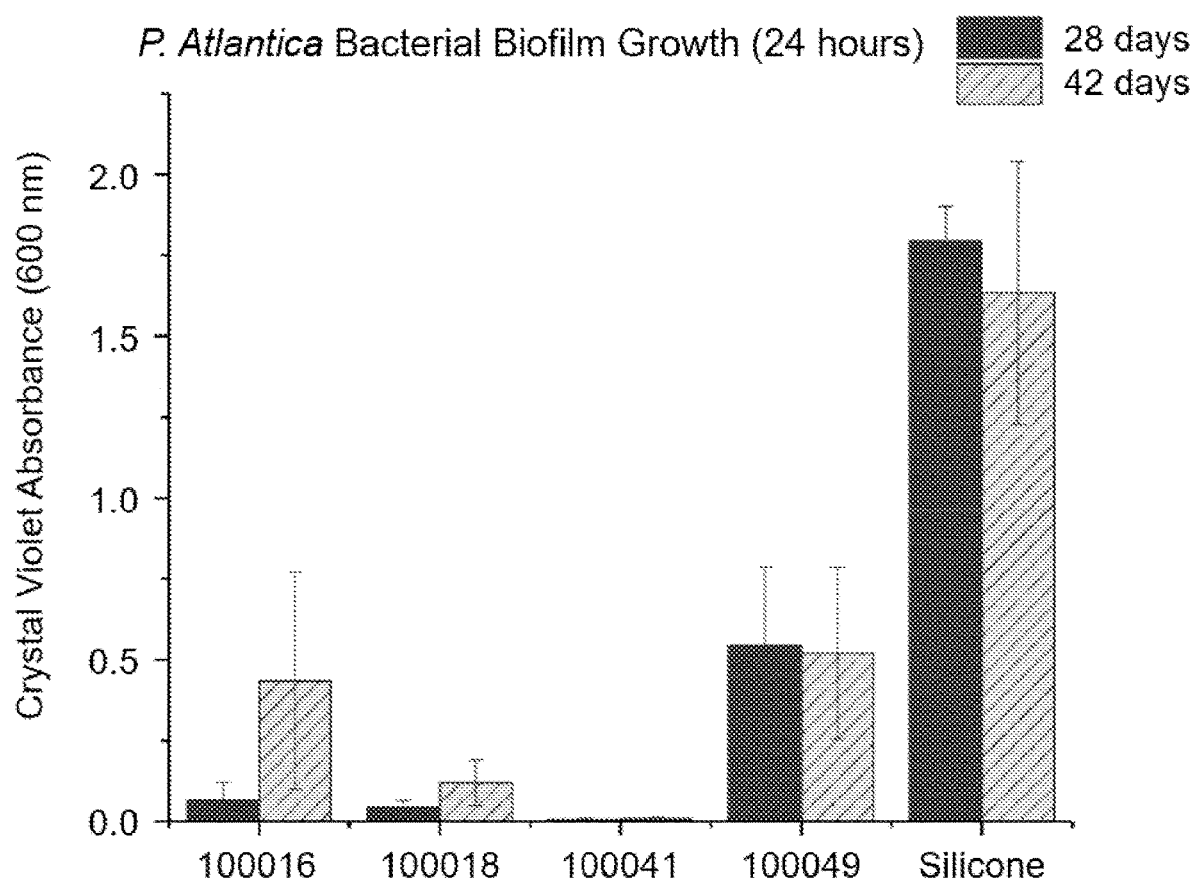
FIG. 24 is a bar chart of the growth of *P. Atlantica* bacterial biofilm measured via crystal violet absorbance intensity for various coating formulations measured at 28 days and again at 42 days.

Increased loading of AM-14 (from 5% to 10% by wt., formulations 100016 and 100041) may have resulted in slower release of biocide (FIG. 24). Leachates from 100041 formulation show higher inhibition of *P. atlantica* compared to that of 100016 formulation. Both have the same biocide concentration but 100041 had double the amount of SAP AM-14.

Biocide Field Immersion Testing

Multiple replicate panels of each coating were immersed in Port Canaveral, Fla. for 5-12 weeks. The panels were immersed (under static conditions) about 0.5-1 m below the waterline. Pictures of the panels were taken to assess the biofouling control properties.

Figure 25:
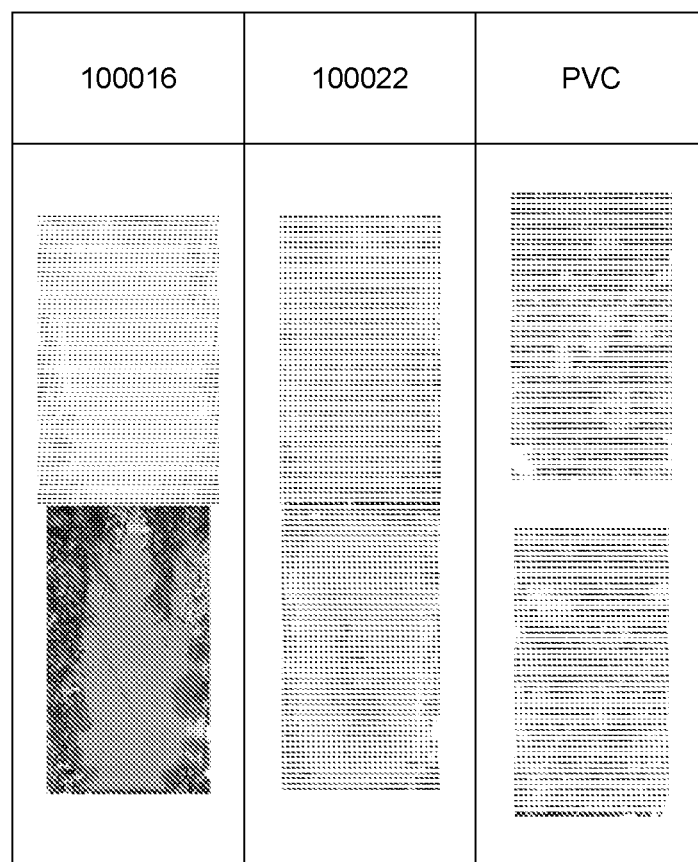
FIG. 25 demonstrates that biofouling accumulation in field test is reduced by use of SAP (100016) and is further reduced by the use of a combination of SAP and biocide (100022).

Several formulations show anti-fouling properties during a field trial conducted in Port Canaveral, Fla., USA (FIG. 25). The test formulations 100016 and 100022 show significant anti-fouling performance compared to the PVC control after 11 weeks of field exposure.

Figure 26:
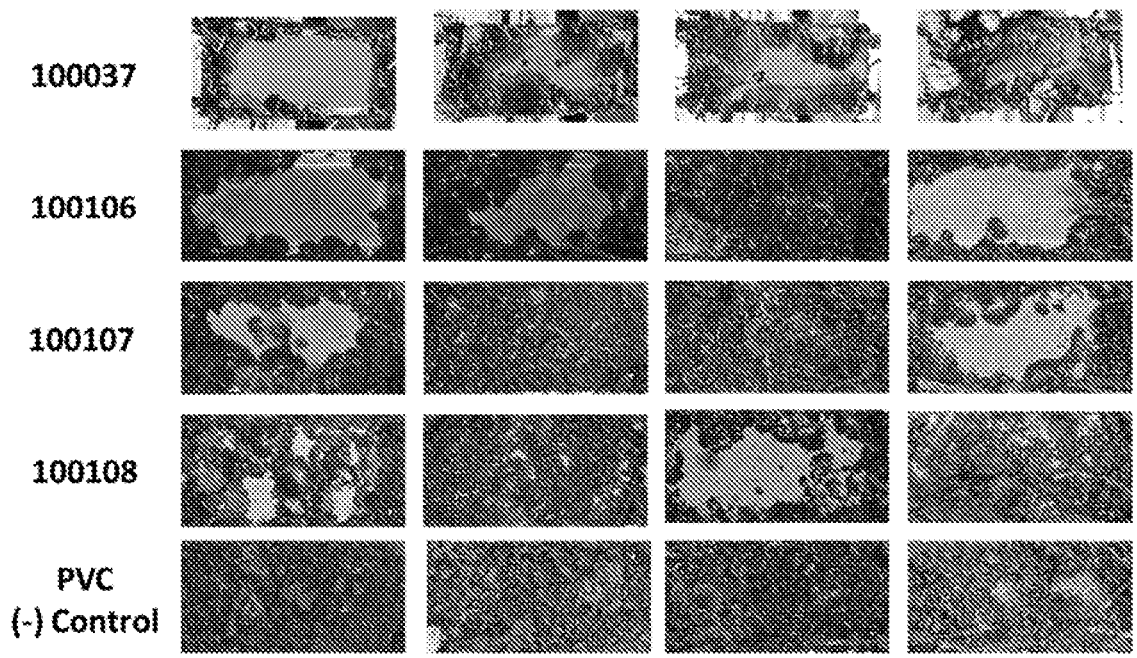
FIG. 26 is photographs of the biofouling accumulated on coated PVC panels containing SAPS as compared to an uncoated PVC panel used as the negative control and each treatment had 4 replicates.
Figure 27:
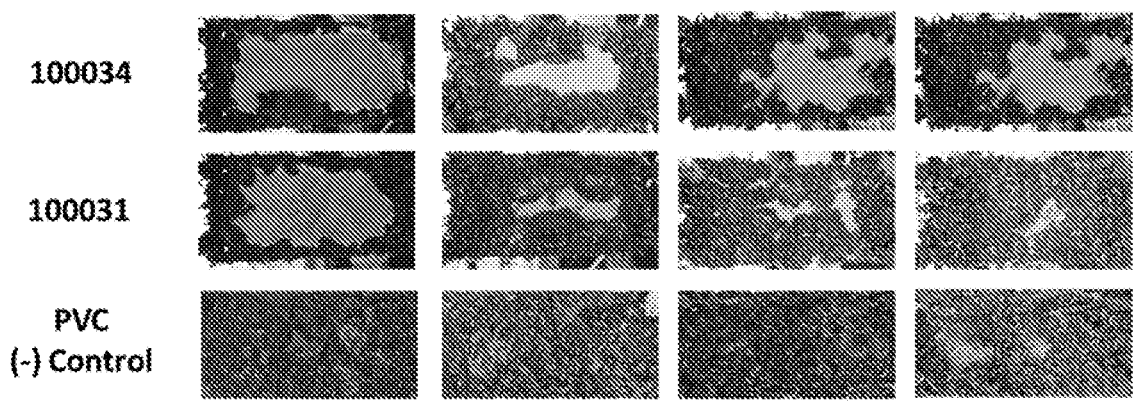
FIG. 27 is photographs of the biofouling accumulated on coated PVC panels (n=4, left to right) containing SAPS and lubricants (formulations 100034 and 100031) as compared to an uncoated PVC panel.

Field Performance of Compositions Containing Polyalkylene Oxide Sidechain Functionalized Organosiloxanes with One or More Releasing Biocidal Group The field performance (FIG. 26) indicates that the coating composition with AM-24 demonstrated the best performance. Performance of the coating compositions with AM-14, AM-20 and AM-22 were ranked $2^{nd}$, $3^{rd}$, $4^{th}$ respectively. The results suggest that the modularity of the sidechains have a noticeable effect on biofouling performance. The field performance also indicates that some amphiphilic lubricant may show slightly better performance compared to others while having the same reactive SAP (FIG. 27). In this case both formulations contain AM-14 while the formulation with Commercial Lubricant 1 (100034) shows better performance compared to the formulation with DBE-224 (100031). This effect may be related to the synergy between the reactive SAP and the lubricant.

Figure 28:
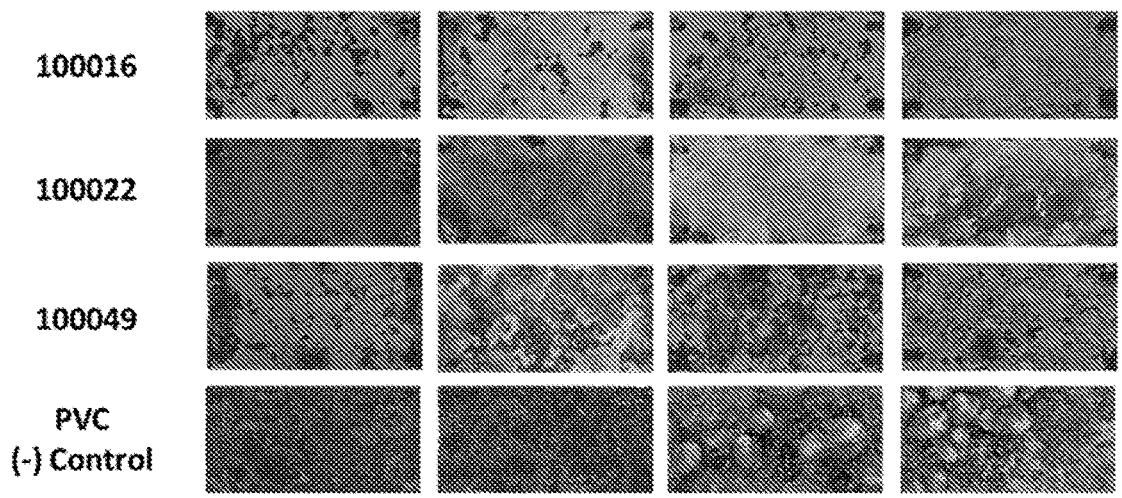
FIG. 28 is photographs of the biofouling accumulated on coated PVC panels (n=4, left to right) containing SAPS and lubricants with and without biocide. An uncoated PVC panel was used as the negative control.

FIG. 28 demonstrates that formulations containing US EPA/EU BPR approved releasing biocides (100016, and 100022) performs significantly better than the same formulation without any biocide (100049). The results show that the said invention can be combined with releasing biocides to further boost the biofouling performance.

Compositions Containing Polyalkylene Oxide Sidechain Functionalized Organosiloxanes with One or More Covalently Tethered Biocidal Group: Formulation Examples Silanols of varying MWs were combined and speedmixed at 3500 rpm for 1 min. Then the corresponding fillers, pigments and additives were incorporated by speedmixing; $1^{st}$ a 20 sec ramp to 3500 rpm and holding for 1 min of additional mixing at that rpm. Next the lubricant/s, SAPs were added to the mixture and speed mixed for 1 min at 2500 rpm. Finally, polydiethoxysiloxane and catalyst were added and speedmixed for 1 min at 2500 rpm. The coating was applied onto previously primed and tie-coated panels using a drawdown bar with a 7.5 mil WFT. Such systems can also be packaged into a two-part coating system that reacts upon mixing, or a one-part system that reactions upon exposure to water, or humidity present in the environment.

Formulations Made Using Polyalkylene Oxide Sidechain Functionalized Organosiloxanes with One or More Covalently Tethered Biocidal Group, Pigments and Additives

| Material Name | Commercial Ref | 100100 | 100101 | 100102 | 100259 |
|---|---|---|---|---|---|
| Binder/Filler/Pigment | | | | | |
| Silanol Terminated Polydimethylsiloxanes | | 75.43% | 69.47% | 69.47% | 69.47% |
| Black Pigment | Black 30C965 | 0.39% | 0.36% | 0.36% | 0.36% |
| White Pigment | LANSCO 8086 | 1.00% | 0.92% | 0.92% | 0.92% |
| Filler | Aerosil R972 | 2.58% | | | |
| Pigments Total | | 1.39% | 1.28% | 1.28% | 1.28% |
| Pigments + Filler Total | | 3.97% | 1.28% | 1.28% | 1.28% |
| Lubricant | | | | | |
| Hydrophilic polysiloxane fluid | DBE-224 | | 10.26% | | |
| Hydrophilic polysiloxane fluid | Commercial Lubricant 1 | | | 10.26% | 10.26% |
| Sidechain Functionalized Organosiloxane | | | | | |
| Surface active polymer (33.75% solids, 66.25% Toluene) | AM-25 | 11.04%* | 10.17%* | 10.17%* | |
| Surface active polymer | AM-47 | | | | 10.17% |
| Other ingredients | | | | | |
| Poly(Diethoxysiloxane) | PSI-021 | 8.78% | 8.09% | 8.09% | 8.09% |
| Dibutyltin dilaurate | DBTDL | 0.79% | 0.73% | 0.73% | 0.73% |
| Total | | 100 | 100 | 100 | 100 |

*Weight percent considered at 100% solids

Figure 29:
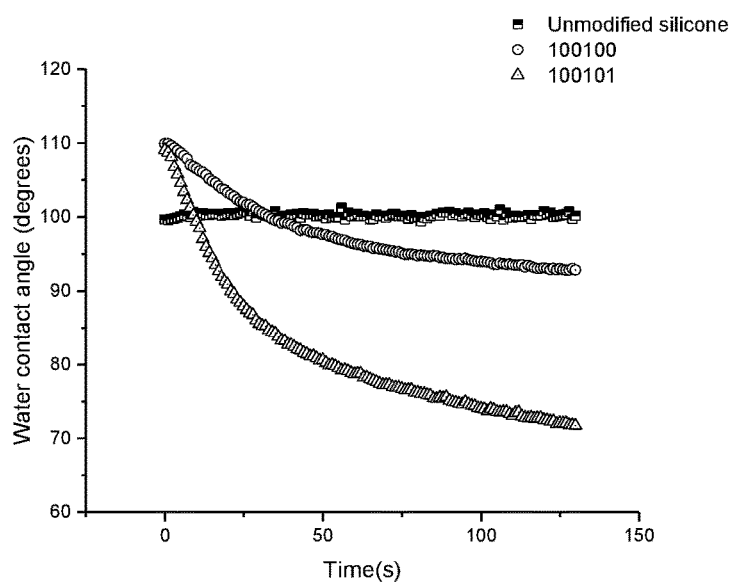
FIG. 29 shows the dynamic wetting properties displayed by formulations 100100 and 100101 demonstrated by the dynamic water contact angle measurement. The water contact angle for unmodified silicone stays unchanged during the testing.

Compositions Containing Polyalkylene Oxide Sidechain Functionalized Organosiloxanes with One or More Covalently Tethered Biocidal Group: Lab Test and Field Test Results Surface Chemistry Testing Formulations with SAP-BX display surfaces with amphiphilic character. When the coatings with SAP-BX is exposed to water, the WCA decrease over 130 s period indicating that the hydrophilic PEG groups are orienting at the water-coating interface (FIG. 29). Such behavior is not observed for the unmodified silicone coating.

Figure 30:
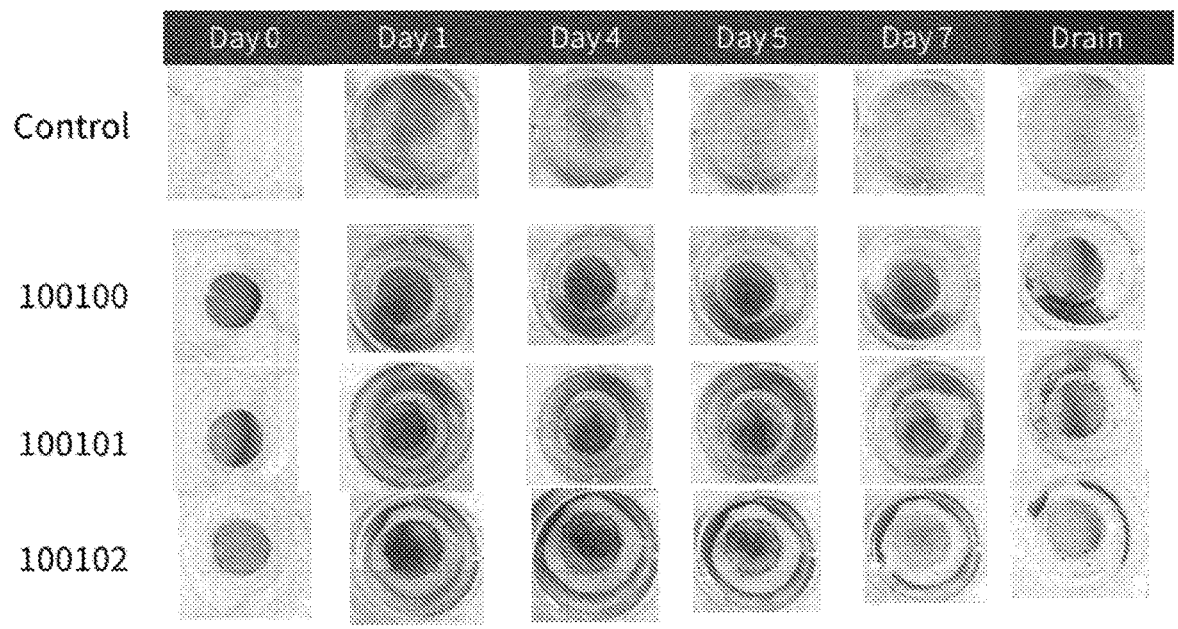
FIG. 30 Circular tokens (15 mm diameter) with candidate coatings were placed in well plates. Each well plate was splashed with standard amount of Algae culture. A blank well with no coating was used as the assay control. Photographs were taken over 7 days. The coatings 100100, 100101, and 100102 show algae inhibition (less green color) and pooling of algae (receding of the algal biofilm from the center where the coated token is placed).

Circular tokens (15 mm diameter) with candidate coatings were placed in well plates. Each well plate was splashed with standard amount of Algae culture. A blank well with no coating was used as the assay control. Photographs were taken over 7 days. The coatings 100100, 100101, and 100102 show algae inhibition (less green color) and pooling of algae-receding of the algal biofilm from the center where the coated token is placed (FIG. 30). The algae films were easily released upon draining. This indicates that coatings with SAP-BX s show anti-fouling and fouling release properties.

Key Conclusions Based on Field Performance

Figure 31:
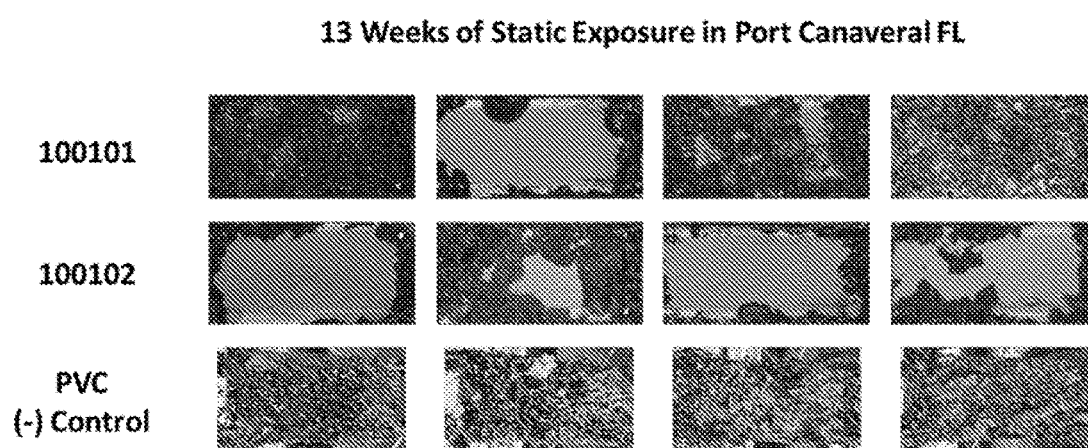
FIG. 31 is photographs of the biofouling accumulated on coated PVC panels panels (n=4, left to right). An uncoated PVC panel was used as the negative control.

FIG. 31 demonstrates that the coating composition with AM-25 demonstrates biofouling control performance. The results suggest that AM-25 may be more effective with amphiphilic silicone PEG-PPG lubricant compared to amphiphilic silicone PEG lubricant.

General Formulation Procedure for Silicone-Epoxy and Polyurethane Binder Systems To prepare formulations M1 and M2, the amphiphilic material (SAP), acrylic polyol oligomer and xylenes were combined in a plastic cup and mixed at 2500 rpm for 1 minute using a FlackTek Speedmixer. The aliphatic isocyanate was added to the formulation and mixed at 2500 rpm for 1 min. Lastly, DBTDL was added and mixed at 2500 rpm for 1 min.

To prepare formulation M3, the monofunctional terminated polydimethylsiloxane, aliphatic isocyanate, lubricant and xylenes were combined in a plastic cup and mixed at 2500 rpm for 1 min using a FlackTek Speedmixer. Half the amount of DBTDL was added to the formulation and mixed at 2500 rpm for 1 min, then allowed to rest for 20 min. The acrylic polyol oligomer and amphiphilic material (SAP) were added to the formulation and mixed at 2500 rpm for 1 min. Lastly, the remaining half of DBTDL was added to the formulation and mixed at 2500 rpm for 1 min.

To prepare M4 and M5, the formulations were produced as a one-pot mixture. Silicone epoxy resin, 3-aminopropyltriethoxysilane, xylenes, amphiphilic material (SAP) and lubricant were combined in a plastic cup and mixed at 2500 rpm for 1 min using a FlackTek Speedmixer.

All coatings were applied onto previously primed panels using a drawdown bar, resulting in a dry film thickness of 8 to 10 mils.

List of SAP Containing Coating Examples for Alternative Binder Systems

| Material Name | Commercial Ref | M1 | M2 | M3 | M4 | M5 |
|---|---|---|---|---|---|---|
| Binder/Filler/Pigment | | | | | | |
| Acrylic Polyol Oligomer | Joncryl 909 | 49% | 36% | 43% | 0% | 0% |
| Silicone-Epoxy Resin | Silikopon EF | 0% | 0% | 0% | 68% | 65% |
| Monocarbinol Terminated Polydimethylsiloxane, asymmetric, 60-120 cSt | MCR-C18 | 0% | 0% | 6% | 0% | 0% |
| Aliphatic Polyisocyanate (IPDI Trimer) | Desmodur Z 4470 BA | 29% | 24% | 26% | 0% | 0% |
| 3-Aminopropyltriethoxysilane | Dynasylan AMEO | 0% | 0% | 0% | 16% | 15% |
| Lubricant | | | | | | |
| Dimethylsiloxane- (25-30% Ethylene Oxide) Block Copolymer, 400 cSt | DBE-224 | 0% | 0% | 6% | 0% | 5% |
| Other | | | | | | |
| Amphiphilic Material (SAP) | AM14 | 6% | 18% | 6% | 10% | 9% |
| Dibutyltin dilaurate | DBTDL | 0.01% | 0.01% | 0.01% | 3% | 3% |
| Xylenes | — | 17% | 22% | 13% | 3% | 3% |
| Total | | 100% | 100% | 100% | 100% | 100% |

Physiochemical Testing

The surface concentration of SAPs in different coating systems was evaluated via X-ray photoelectron spectroscopy (XPS). The surface concentration of SAPs in coatings is determined by quantifying the surface concentration of PEG C—O % from a high resolution $C^{1s}$ XPS spectrum. The stratification ratio is calculated as follows:

$$\text{Stratification Ratio} = \frac{\text{Measured SAP surface concentration (wt. \%)}}{\text{SAP concentration in formulation (wt. \%)}}$$

From this definition, the SAP has stratified to the surface in a coating system if the calculated stratification ratio is greater than 1. For coatings with C—O bonds present in the matrix (e.g. epoxy and polyurethane) in addition to the SAP, the minimum stratification ratio is calculated by subtracting the matrix C—O bond contributions (using a baseline matrix spectrum) whereas the maximum stratification ratio is calculated by assuming all C—O bonds measured at the surface originate from the PEGylated SAP.

From the table, the examples (100093, M2, M4) illustrate that SAPs successfully stratify in coatings with different matrix chemistries, with a stratification ratio greater than 1. Surface Stratification of PAO Sidechain Functionalized Polysiloxanes in Different Binders

| Example | Coating | SAP | SAP in Coating (wt. %) | Surface SAP (wt. %) | Stratification Ratio |
|---|---|---|---|---|---|
| 100093 | Silicone | AM-14 | 10 | 28 | 2.8 |
| M2 | Polyurethane | | 30 | 40-72 | 1.3-2.4 |
| M4 | Silicone-Epoxy | | 10 | 13-36 | 1.3-3.6 |

The mechanical properties of durable binder coatings with APIs (e.g. M3 and M5) were evaluated by measuring gouge resistance and abrasion resistance 3 days after application and 21 days after application. Full details of experimental procedure can be found elsewhere, for example, ASTM 3363 and ASTM 4060 respectively. A commercial fouling releasing (FR) silicone coating (Intersleek 1100SR, Akzo Nobel, referred hereafter as 'Commercial FR') was also measured for reference. Intersleek 1100SR is one of the market leading products for fouling release coatings, but suffers from poor abrasion and gouge resistance in adverse marine conditions, as is the case for silicone coatings in general.

Figure 32:
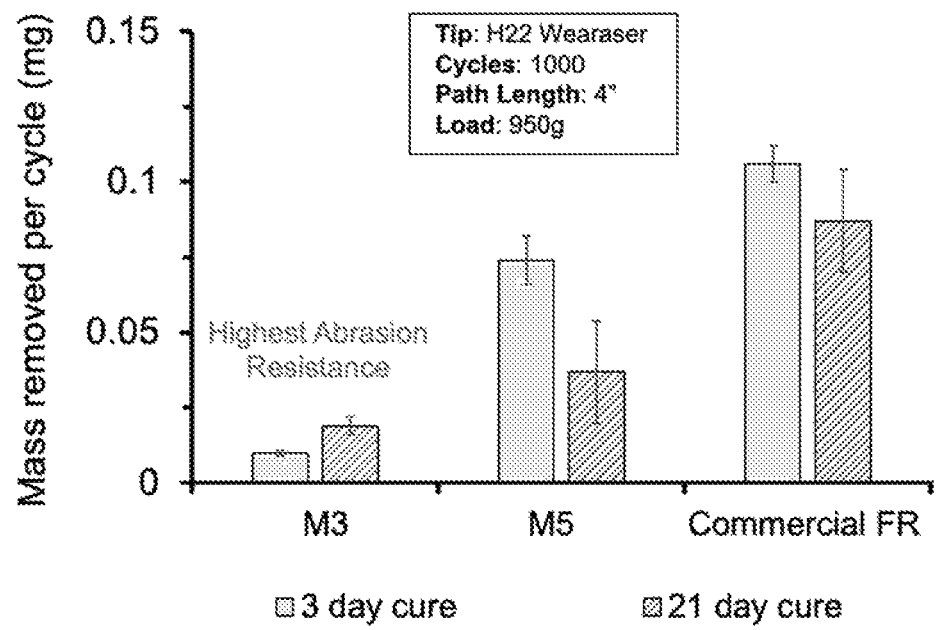
FIG. 32 is a graph of relative hardness (measured via ASTM 3363) for polyurethane and silicone epoxy coatings with APIs (M3, M5), compared to a commercial fouling release coating.
Figure 33:
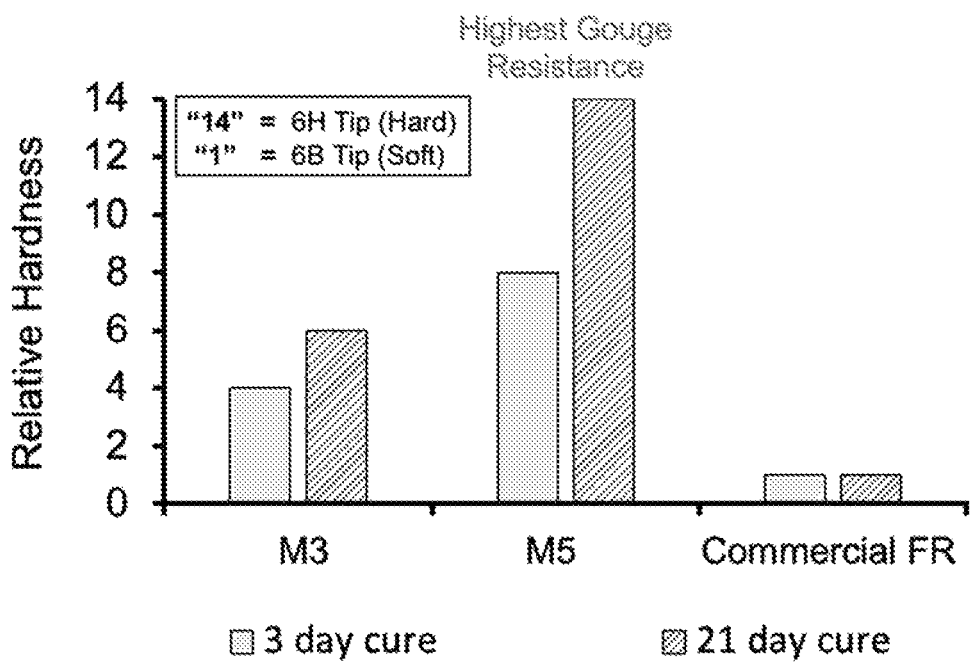
FIG. 33 is a graph of abrasion resistance (measured via ASTM D4060) for polyurethane and silicone epoxy coatings with APIs (M3, M5), compared to a commercial fouling release coating.

From examples M3 and M5, the gouge resistance for polyurethane and silicone-epoxy coatings with APIs is 4-8× higher than the commercial FR product after 3 days of curing and 6-14× higher than the commercial FR product after 21 days of curing (FIG. 32). From examples M3 and M5, the abrasion resistance for polyurethane and silicone-epoxy coatings with APIs is 1.5-10× higher than the commercial FR product after 3 days of curing and 3-5× higher than the commercial FR product after 21 days of curing (FIG. 33).

Coating lubricity was observed by placing a 15 μL DI water droplet on an inclined coating, with sliding angle defined as the minimum tilt angle required for the water droplet to slide on the coating. Coating sliding angle was tested 1 week and 4 weeks after tap water immersion. A lower water sliding angle indicates higher coating lubricity, and vice-versa.

Figure 34:
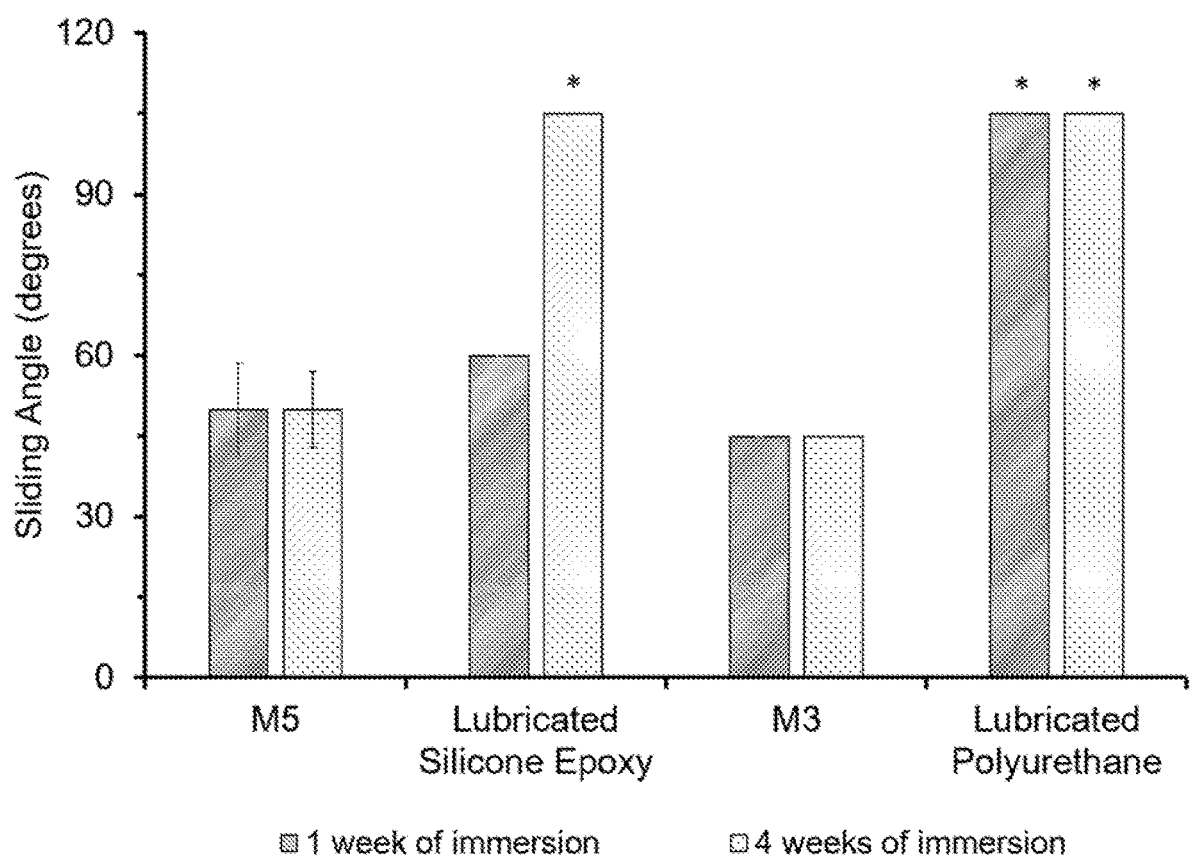
FIG. 34 is a graph of the sliding angle (degrees) after 1 week and 4 weeks of water immersion for a silicone epoxy coating with APIs (M5) and a polyurethane coating with APIs (M3), compared to reference lubricated coatings. Data marked with an asterisk (*) did not have any measurable sliding at the maximum tilt angle (90°). Coatings with APIs had higher lubricity as measured by lower sliding angle, and maintained their lubricity after 4 weeks of immersion compared to reference lubricated coatings.

From examples M3 and M5, it is observed that SAPs improve lubricant retention in durable binder coatings (FIG. 34). M3 and M5 have a consistent sliding angle of 45° after 4 weeks of immersion, whereas lubricated polyurethane and silicone-epoxy coatings that do not contain SAP have a higher sliding angle or do not slide at all after 1 week and 4 weeks of immersion. The higher lubricity of SAP-containing compared to non-SAP durable coatings confirm that SAPs are positively synergizing with lubricant to extend coating lubricity lifetime.

Dynamic wetting for durable coatings was measured by observing the contact angle of a 5 μL water at 5 seconds and 125 seconds after placing the droplet on a coating. Before dynamic wetting measurements, coatings were immersed for 1 month in tap water and then air dried.

Figure 35:
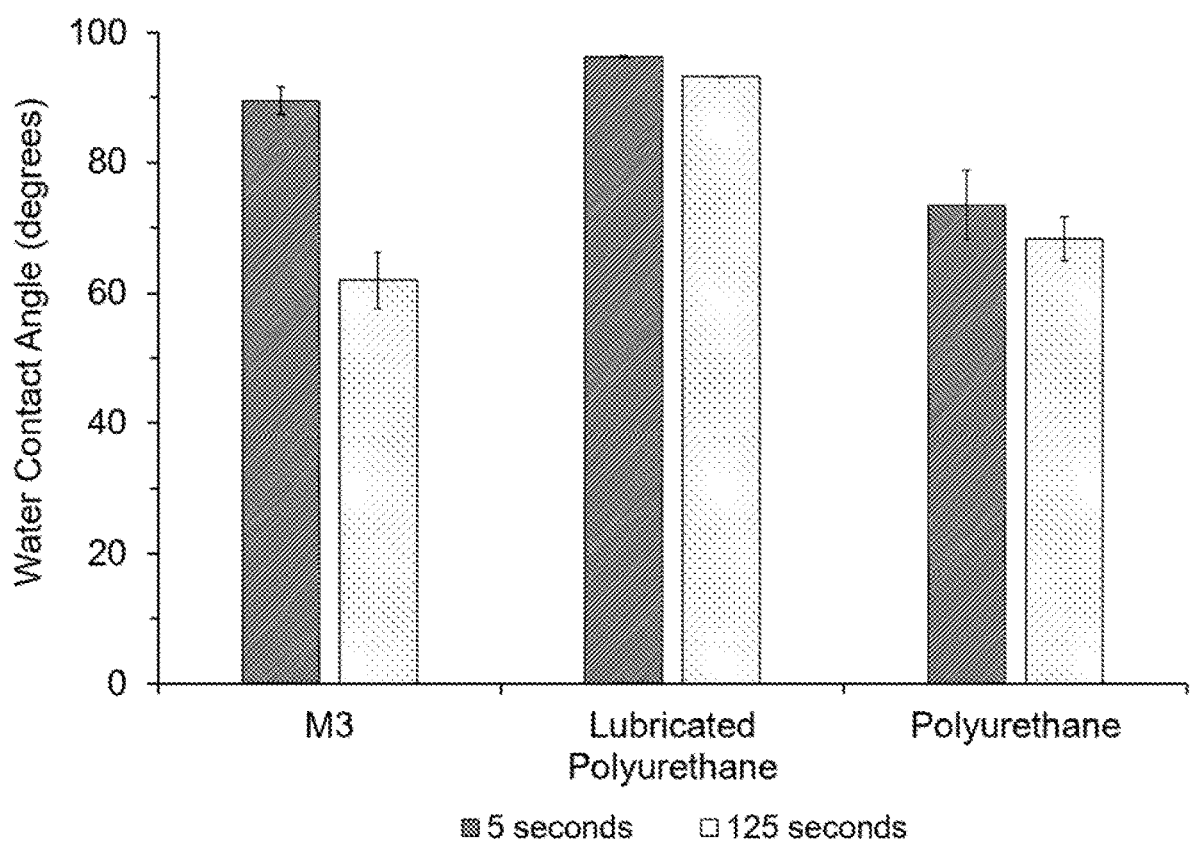
FIG. 35 is a graph of the water contact angle (degrees) at 5 s and 125 s for a polyurethane coating with APIs (M3), compared to reference polyurethane and lubricated polyurethane coatings. The APIs created a polyurethane coating with dynamic wetting.
Figure 36:
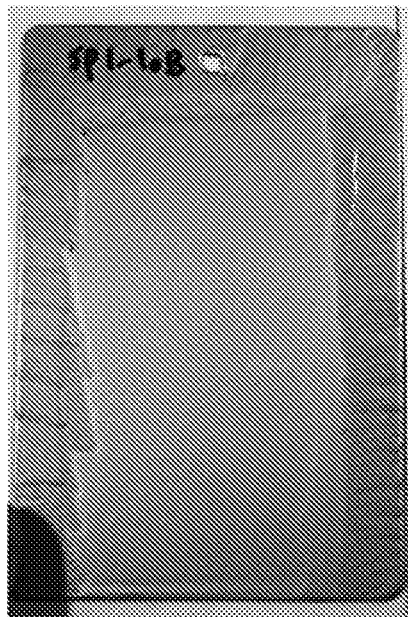
FIG. 36 is an image of an example polyurethane coating with AM-14 (M1) fully wetting an epoxy-primed article, compared to a reference polyurethane formulation without AM-14 with partial dewetting (white arrows) on an epoxy-primed article.
Figure 36:
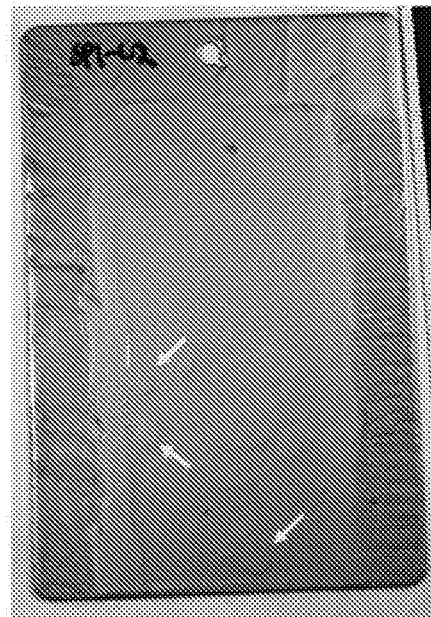

For example M3, it is observed that the combination of SAP and amphiphilic lubricant created significant dynamic wetting (−30° decrease in contact angle after 120 seconds) in a silicone-polyurethane coating, while no dynamic wetting was observed in a silicone-polyurethane or silicone-polyurethane with amphiphilic lubricant (FIG. 35). Formulations including the SAP also demonstrated improved wetting on primed article surfaces (FIG. 36).

Laboratory Biological Testing

Fouling release properties of epoxy and polyurethane coatings were individually tested against microalgae (N. incerta), bacteria (C. lytica) and mussels (G. demissa) at North Dakota State University (NDSU). Coatings were pre-leached for 28 days in water before exposure to biological organisms. After leaching, coating toxicity was tested against N. incerta and C. lytica by culturing the organisms in coating leachate. No toxicity was observed for all example formulations compared to the positive growth control. Full details of experimental procedure can be found elsewhere, for example, Galhenage et al., J. Coat. Technol. Res., 14 (2) 307-322, 2017.

Figure 37:
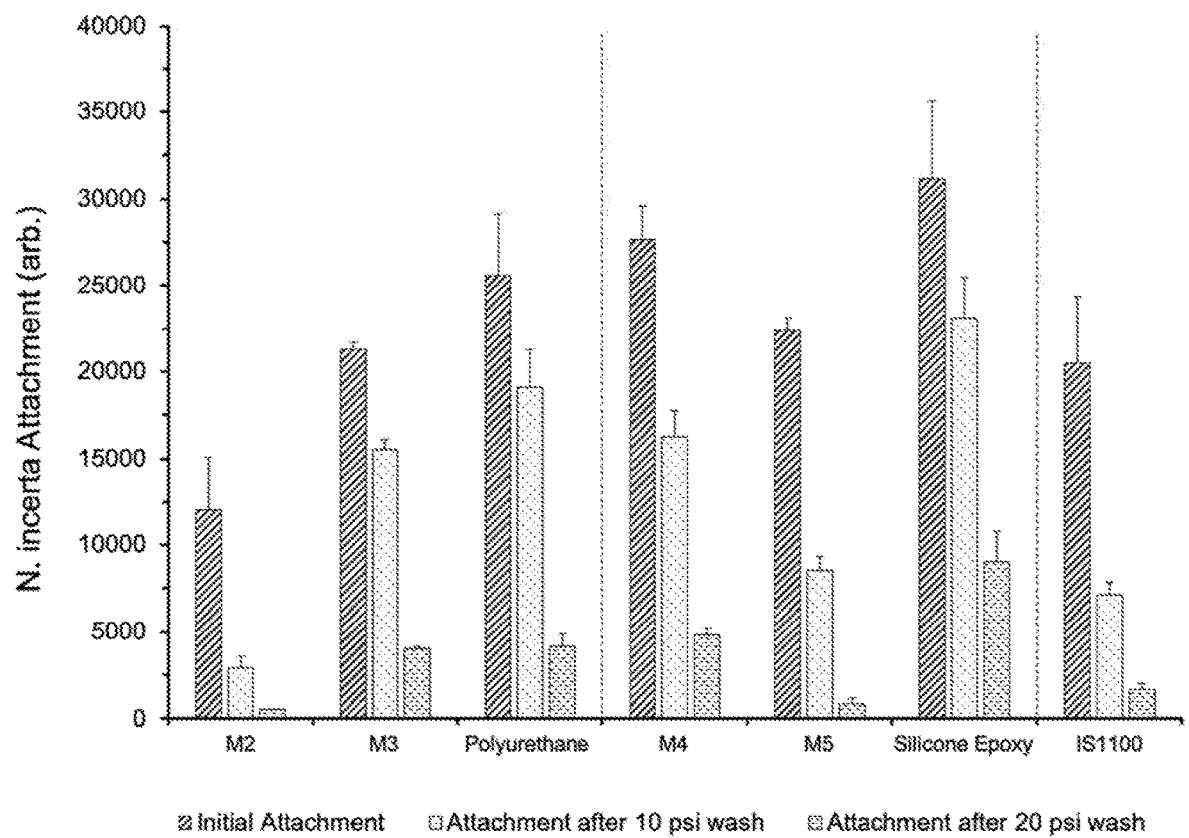
FIG. 37 is a graph of microalgae (*N. incerta*) attachment for polyurethane and silicone epoxy coating with APIs (M2-M5), compared to reference coatings without APIs. Coatings with APIs had reduced *N. incerta* attachment before and after pressure washing.
Figure 38:
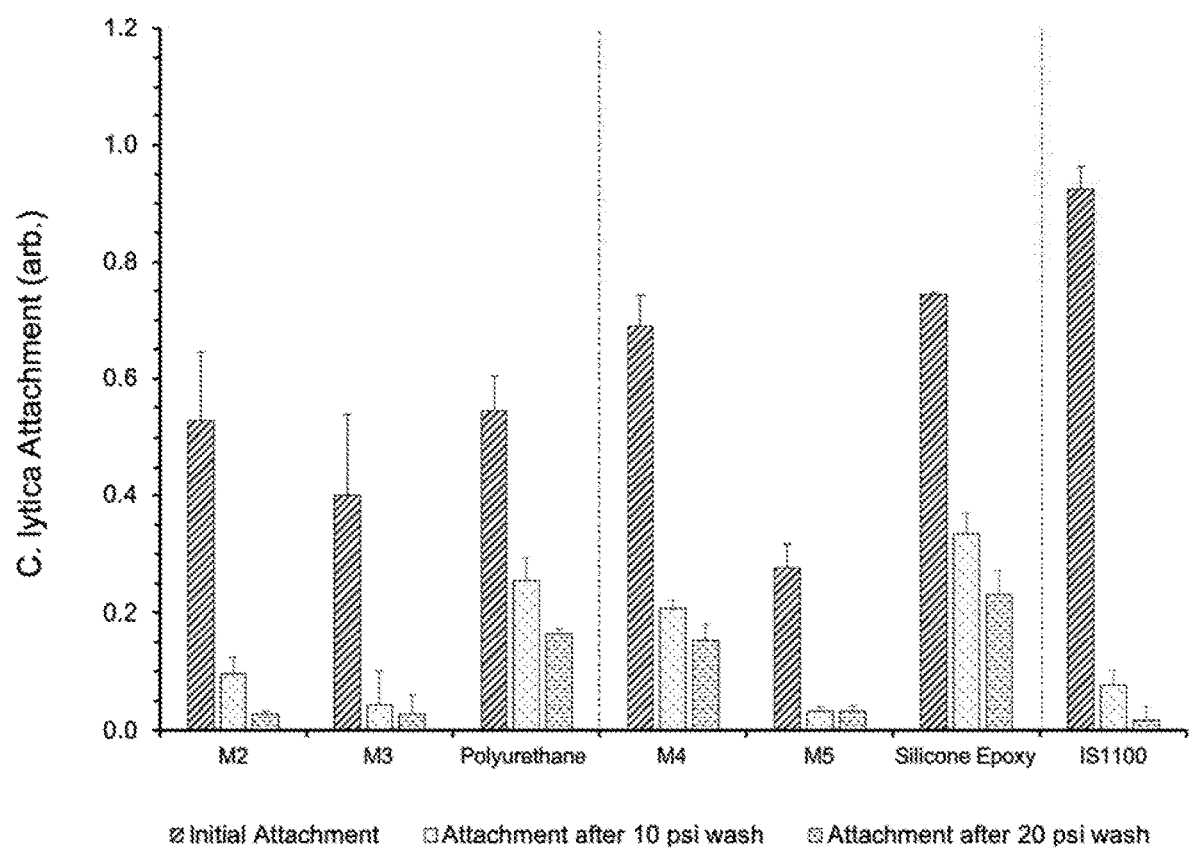
FIG. 38 is a graph of bacterial (*C. lytica*) attachment for polyurethane and silicone epoxy coating with APIs (M2-M5), compared to reference coatings without APIs. Coatings with APIs had reduced *C. lytica* attachment before and after pressure washing.

From FIG. 37 and FIG. 38, it is observed that APIs (SAP, SAP & lubricant, SAP & lubricant & silicone) improve fouling release properties of durable binder coatings against soft fouling organisms such as N. incerta and C. lytica. Biofilm coverage is significantly lower after pressure washing for durable binders with APIs compared to analog coatings without APIs. Initial biofilm coverage of soft fouling organisms is also lower for durable binders with APIs.

The table below illustrate that SAPs enhance the biofouling resistance of lubricated polyurethane and silicone epoxy coatings to hard fouling organisms such as mussels. Mussel reattachment is significantly reduced with the combination of SAP and lubricant, whereas mussel reattachment is only moderately improved by the addition of lubricant to durable binder coatings.

Mussel Reattachment Efficiency (%) for
Polyurethane and Epoxy Coatings with and without
Lubricant as Compared to M3 and M5 Coatings
which Contain SAP and Lubricant

| Example | Mussel Reattachment Efficiency (%) |
|---|---|
| M3 | 0 |
| Lubricated Polyurethane | 66 |
| Polyurethane | 83 |
| M5 | 0 |
| Lubricated Silicone Epoxy | 33 |
| Silicone Epoxy | 66 |
| IS1100 | 0 |

Without being bound to one particular theory, it is believed that chemical interactions between SAPs and lubricant cause increased retention of lubricant (FIG. 34), leading to slower leaching rates and longer biofouling performance in a submerged environment.

Field Immersion Testing

Multiple replicate panels of each coating were immersed in Port Canaveral, Fla. for 1 month during a high fouling pressure season (August). Field test panels were prepared by applying an epoxy primer coating on 4"×8" PVC panels. After 12-24 hours, a 3" wide drawdown bar was used to apply example topcoat formulations to the panel, resulting in a dry film thickness (DFT) between 6-10 mils. The remaining uncoated edges (<1") were brush applied with topcoat formulation to minimize edge effect. The panels were immersed (under static conditions) about 0.5-1 m below the waterline. Pictures of the panels were taken to assess the biofouling control properties.

Figure 39:
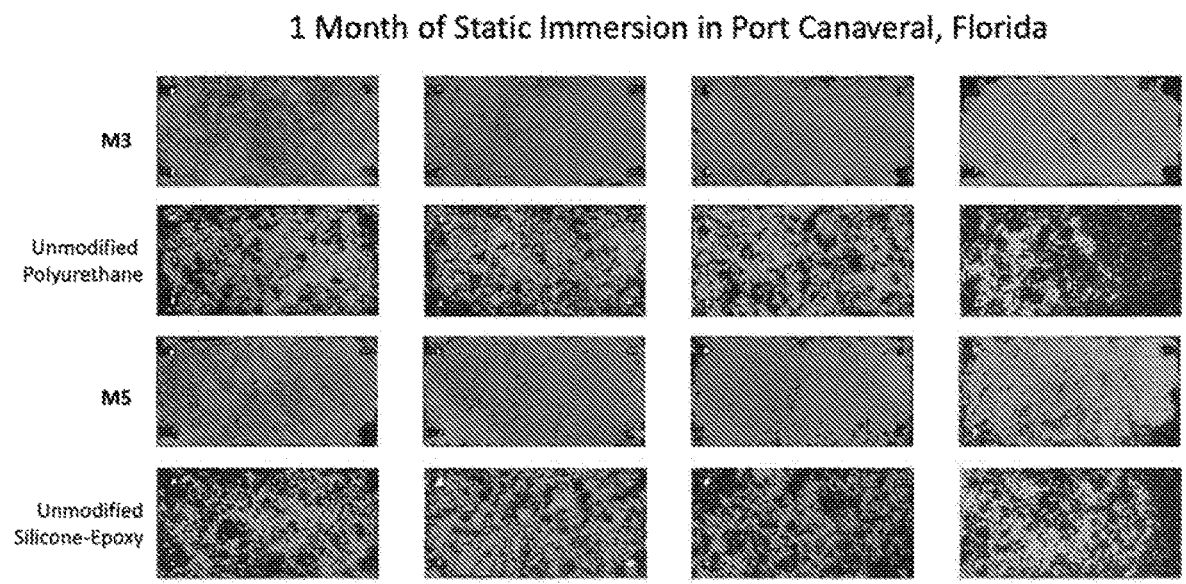
FIG. 39 shows images of the accumulation of biomaterials on coated articles (n=4, left to right) following a 1-month static field test in Florida. Panels coated with a polyurethane film containing APIs (M3) or silicone-epoxy film with APIs (M5) had significantly less biofouling compared to reference panels coated with unmodified polyurethane and unmodified silicone epoxy.

From examples M3 and M5, it is observed that APIs (SAP, amphiphilic lubricant and silicone) significantly improve the biofouling-resistant performance of durable binder systems (polyurethane, silicone-epoxy) after 1 month of static immersion (FIG. 39). Specifically, M3 and M5 has minimal light slime attachment and no juvenile hard fouling attachment. In contrast, unmodified controls of polyurethane and silicone epoxy have heavy slime accumulation and the presence of juvenile hard fouling species, including encrusting bryozoans and barnacles.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

Lecithin as a Zwitterionic Amphiphilic Lubricant

Lecithin is a naturally occurring substance in animal and plant tissue. Generally, lecithin is regarded as an amphiphilic compound and shows excellent emulsification properties. Lecithin is therefore very commonly used in the food industry for smoothing food textures, emulsifying, homogenizing liquid mixtures, and repelling sticking materials. Soybeans, eggs, milk, marine sources, rapeseed, cottonseed, and sunflower oil are some of the main sources for lecithin. Table below provide some indication of the major components of soy-based lecithin.

Major Components of Commercial
Soybean-Derived Lecithin Obtained from
Scholfield, C. R. (October 1981), "Composition of
Soybean Lecithin", Journal of the American Oil
Chemists' Society. 58 (10): 889-892

| Component | Composition |
|---|---|
| Soybean oil | 33-35% |
| Phosphatidylinositols | 20-21% |
| Phosphatidylcholine | 19-21% |
| Phosphatidylethanolamine | 8-20% |
| Other phosphatides | 5-11% Other phosphatides |
| Free carbohydrates | 5% Free carbohydrates |
| Other | 2-5% |

Component such as Phosphatidylcholine contains zwitterionic group (hydrophile) with fatty acid chains (lipophile) providing amphiphilic character. Amphiphilic lubricants have shown some anti-biofouling properties. In the present invention, PAO-SFPs, PAO-ZW-SFPs are combined with lecithin for biofouling control. The miscibility of lecithin with PAO-SFP and PAO-ZW-SFP indicate that they are compatible with each other and complement the performance.

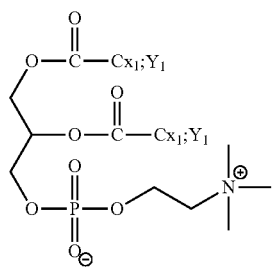

The general structure for Phosphatidylcholine in lecithin is depicted above. The fatty acid chains can contain all variations (Oleic, linoleic, linolenic, stearidonic, lauric, myristic, palmitic, stearic etc.), Where Cx1 can be C1-C20 and Y1 can be 0-4.

Figure 40A:
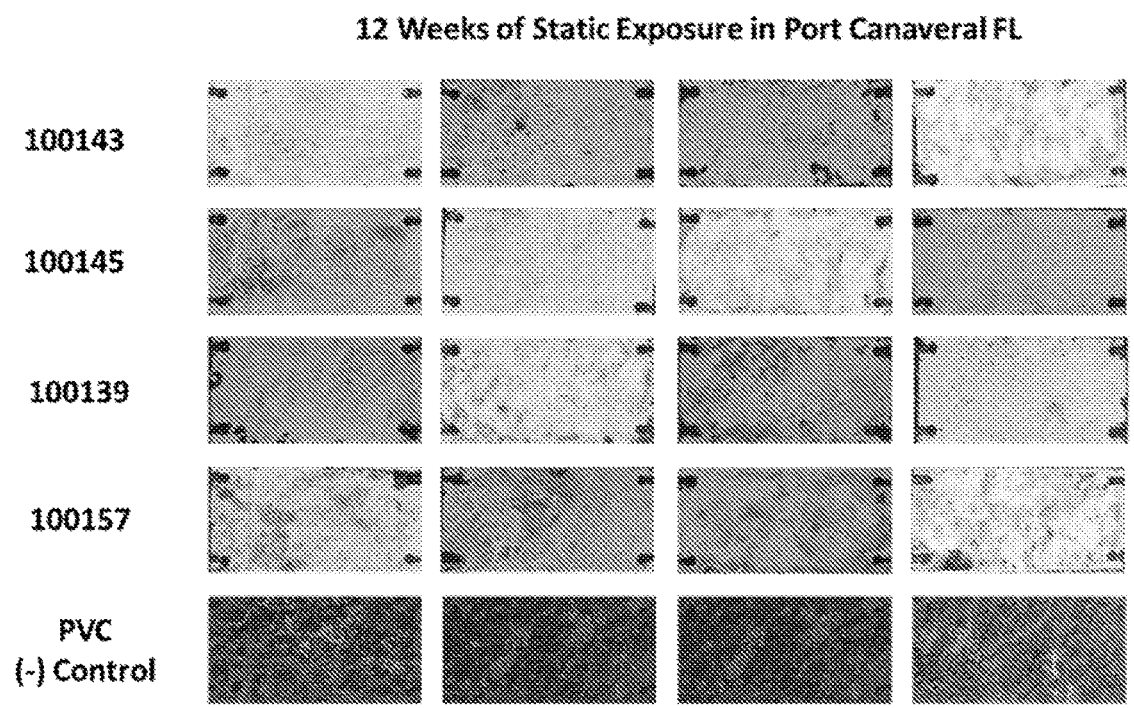
FIGS. 40A-40B show the results of accumulation of biomaterials on coated articles following a 1-month static field test in Florida.
Figure 40B:
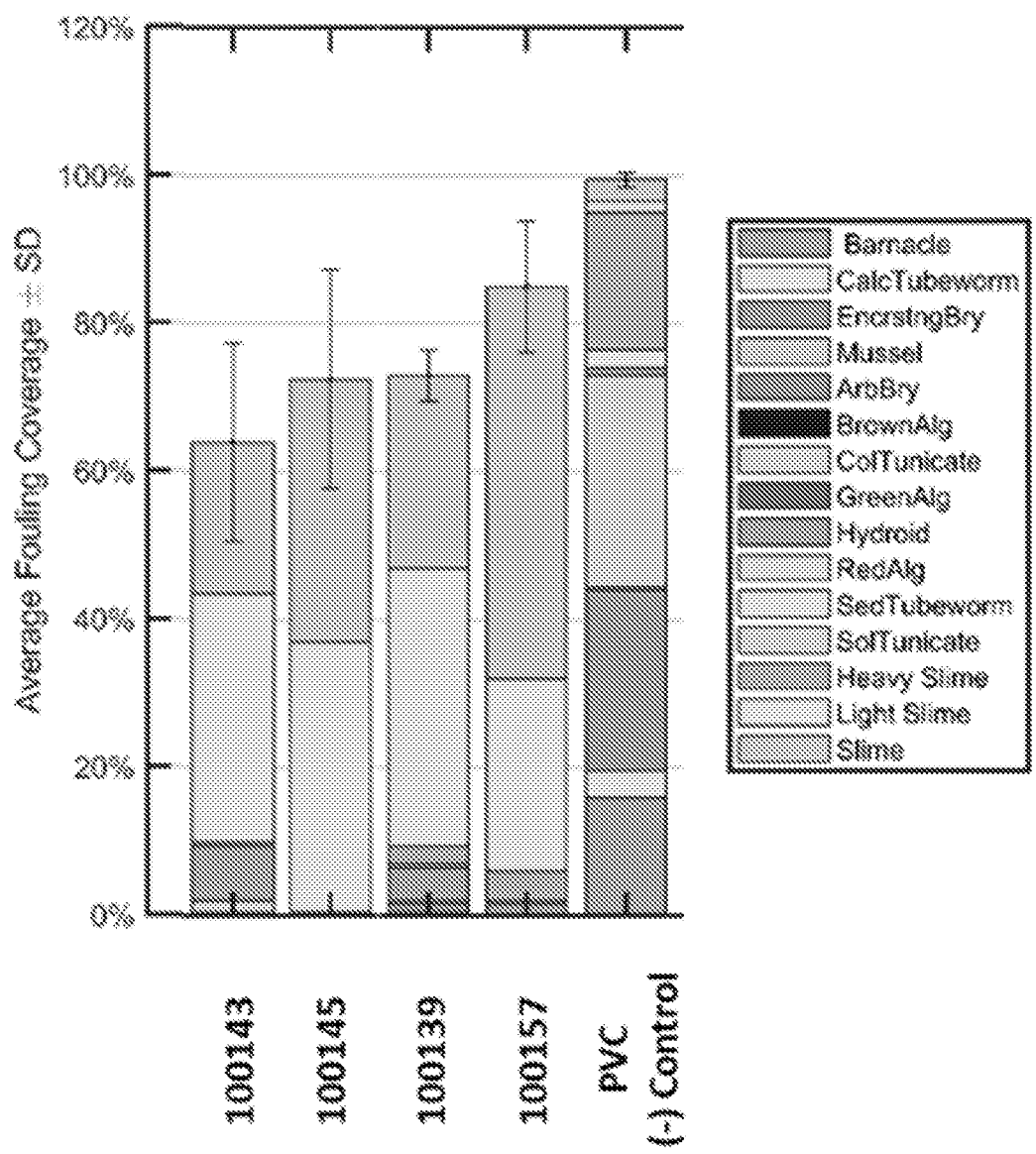

In certain aspects lecithin can be used as a lubricant that has the zwitterionic character. Formulations incorporated with lecithin demonstrate biofouling control (FIGS. 40A-40B). The field performance indicates that the coating composition with lecithin demonstrated biofouling control (formulation 100139 show lower average fouling coverage compared to 100157). Formulation 100143 displayed the best performance out all.

Example ZW Formulations with Lecithin (Wt %)

| Material Name | Commercial Ref | 100139 | 100143 | 100145 | 100147 | 100260 |
|---|---|---|---|---|---|---|
| Binder/Filler/Pigment | | | | | | |
| Silanol Terminated Polydimethylsiloxanes | | 63.73% | 63.73% | 71.68% | 71.68% | 76.20% |
| Black Pigment | Black 30C965 | | | | | |
| White Pigment | LANSCO 8086 | | | | | |
| Filler | Aerosil R972 | | | | | |
| Pigments Total | | | | | | |
| Pigments + Filler Total | | | | | | |
| Lubricant | | | | | | |
| Fluorinated polysiloxane fluid | DM-100 | | | | | |
| Hydrophilic polysiloxane fluid | DBE-224 | | | | | 10.00% |
| Hydrophilic polysiloxane fluid | BYK-331 | 10.00% | 10% | 10% | | |
| Zwitterionic fluid | Soy Lecithin | 8.99% | 8.99% | 9.00% | 9.00% | |
| Zwitterionic fluid | AM-49 | | | | | 10.00% |
| Sidechain Functionalized Organosiloxane | | | | | | |
| Surface active polymer | AM-14 | 8.99% | | | | |
| Surface active polymer | AM-16 | | | | | |
| Surface active polymer (34% solids) | AM-24 | | 8.99% | | | |
| Surface acitve polymer (32.50% solids) | AM-26 | | | | | 4.50% |
| Other ingredients | | | | | | |
| Poly(Diethoxysiloxane) | PSI-021 | 7.62% | 7.62% | 8.57% | 8.57% | 8.57% |
| Dibutyltin dilaurate | DBTDL | 0.67% | 0.67% | 0.75% | 0.75% | 0.74% |
| Total | | 100 | 100 | 100 | 100 | 100 |

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The present disclosure will be better understood upon reviewing the following aspects which should not be confused with the claims. In some instances the numbered aspects can be combined with any other numbered aspects below and with any of the various aspects of the disclosure presented above even if, for the sake of clarity and brevity, only certain aspects are explicitly described as such.

Aspect 1. A sidechain functionalized organosiloxane compound comprising: (i) a first end and a second end; (ii) a polysiloxane backbone connecting the first end to the second end; and (iii) a first plurality of sidechains covalently attached to the polysiloxane backbone and a second plurality of sidechains covalently attached to the polysiloxane backbone; wherein the sidechains in the first plurality of sidechains have a chemical structure different from a chemical structure of the second plurality of sidechains; wherein the first plurality of sidechains comprise polyalkylene glycol sidechains; wherein the first plurality of sidechains and the second plurality of sidechains comprise a tethered end covalently attached to the polysiloxane backbone and a free end opposite to the tethered end; and wherein the free end in one or both of the first plurality of sidechains and the second plurality of sidechains comprises a reactive end group.

Aspect 2. The sidechain functionalized organosiloxane compound according to cany one of Aspects 1-49, wherein the polyalkylene glycol sidechains are selected from the group consisting of poly(ethylene glycol), poly(propylene glycol), poly(ethylene glycol-ran-propylene glycol), poly (ethylene glycol-block-, -propylene glycol), poly(butylene glycol), co-polymers containing poly(butylene glycol), and a combination thereof.

Aspect 3. The sidechain functionalized organosiloxane compound according to any one of Aspects 1-49, wherein the first end and the second end are nonreactive with silicone condensation cure chemistry, are nonreactive with platinum addition cure silicone chemistry, are nonreactive with epoxy cure chemistry, and/or are nonreactive with polyurethane chemistry.

Aspect 4. The sidechain functionalized organosiloxane compound according to any one of Aspects 1-49, wherein the reactive end group is selected from a group that can undergo 1) addition cure chemistry, 2) condensation cure chemistry, 3) hydrosilylation chemistry, 4) epoxy chemistry, 5) urethane/urea chemistry, 6) amino crosslinking chemistry, 7) click chemistry. In additional aspects, the reactive end group can be selected from alkoxy, enoxy, oxime, primary amine, secondary amine, ethoxy silane, methoxy silane, acetoxy silane, vinyl groups, hydrides, epoxide groups, isocyanate groups, hydroxyl groups, and (meth)acrylate groups. In additional aspects, the reactive end group can be selected from a group that can adhere to a solid substrate including but not limited to a thiol, a carboxylic acid and its esters or anhydrides, an alkoxy silane, a chlorosilane, a phosphonic or phosphinic or phosphoric acid and its esters or anhydrides, an azide, an alkyne, an alkene, an aldehyde, an acetal, and bio-derived or bioconjugates for binding such as catechols and catecholamines.

Aspect 5. The sidechain functionalized organosiloxane compound according to any one of Aspects 1-49, wherein one or both of the first plurality of sidechains and the second plurality of sidechains are covalently attached to the polysiloxane backbone through a linker at the tethered end.

Aspect 6. The sidechain functionalized organosiloxane compound according to any one of Aspects 1-49, wherein the linker comprises a $C_1$-$C_{20}$ alkyl or heteroalkyl, a $C_1$-$C_{12}$ alkyl or heteroalkyl, a $C_2$-$C_7$ alkyl or heteroalkyl, or a $C_1$-$C_5$ alkyl or heteroalkyl.

Aspect 7. The sidechain functionalized organosiloxane compound according to any one of Aspects 1-49, wherein the free end in the first plurality of sidechains comprise the reactive end group; wherein the second plurality of sidechains comprise polyalkylene glycol sidechains; and wherein the free end in the second plurality of sidechains does not comprise a reactive end group.

Aspect 8. The sidechain functionalized organosiloxane compound according to any one of Aspects 1-49, wherein the polyalkylene glycol sidechains in the second plurality of sidechains are the same as the polyalkylene glycol sidechains in the first plurality of sidechains except without the reactive end group.

Aspect 9. The sidechain functionalized organosiloxane compound according to any one of Aspects 1-49, wherein the free end in the first plurality of sidechains does not comprise a reactive end group; wherein the second plurality of sidechains is selected from the group consisting of substituted and unsubstituted $C_1$-$C_{18}$ alkyl and heteroalkyl, substituted and unsubstituted $C_1$-$C_{18}$ alkenyl, substituted and unsubstituted $C_1$-$C_{18}$ organosiloxane, and a combination thereof; and wherein the free end in the second plurality of sidechains comprise the reactive end group.

Aspect 10. The sidechain functionalized organosiloxane compound according to any one of Aspects 1-49, wherein a first number of sidechains of the first plurality of sidechains is about 1, 2, 3, 4, or 5 and up to about 12, 13, 14, 15, 16, 17, 18, 19, or 20.

Aspect 11. The sidechain functionalized organosiloxane compound according to any one of Aspects 1-49, wherein a second number of sidechains of the second plurality of sidechains is about 1, 2, 3, 4, 5, or 6 and up to about 11, 12, 13, 14, 15, 16, 17, 18, 19, or 20.

Aspect 12. The sidechain functionalized organosiloxane compound according to any one of Aspects 1-49, wherein the polysiloxane backbone comprises a number of repeat units from about 15, 20, 25, 30, or 35 and up to about 30, 35, 40, 45, 50, or 55.

Aspect 13. The sidechain functionalized organosiloxane compound according to any one of Aspects 1-49, wherein each of the sidechains in the first plurality of sidechains have a structure according to the following formula

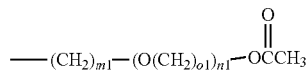

where m1 is an integer 1, 2, 3, 4, 5, 6, 7, 8, 9, or 10, preferably 2 or 3; n1 is an integer from 1 to 30, from 1 to 25, from 1 to 22, preferably from 6 to 25, and o1 is an integer 1, 2, 3, 4, 5, 6, 7, or 8, preferably 2.

Aspect 14. The sidechain functionalized organosiloxane compound according any one of Aspects 1-49, further comprising a third sidechain comprising (i) at least one polyoxyalkylene chain having a tethered end covalently attached to the polysiloxane backbone and a free end opposite to the tethered end; and (ii) at least one biocidal moiety, wherein the at least one biocidal moiety is covalently attached to the free end of the polyoxyalkylene chain, optionally wherein the covalent attachment comprises a first linker.

Aspect 15. The sidechain functionalized organosiloxane compound according to any one of Aspects 1-49, wherein the at least one biocidal moiety is covalently attached to the organosiloxane backbone via a linker selected from the group consisting of $C_1$-$C_{12}$ alkyl and heteroalkyl, preferably $C_1$-$C_5$ alkyl and heteroalkyl.

Aspect 16. The sidechain functionalized organosiloxane compound according to any one of Aspects 1-49, wherein the biocidal moiety is selected from the group consisting of organic compounds such as dihydropyridazinones; pyridazinones, Diuron, Irgarol 1051, Dichlofluanid, TCMTB, Chlorothalonil, TCMS pyridine, SeaNine 211, Folpet, 4-chloro-meta-cresol, Econea, phenylborane pyridine, and Selektope; essential oils, and organic oils such as oregano and clove bud oil, and functional fragments thereof.

Aspect 17. The sidechain functionalized organosiloxane compound according to any one of Aspects 1-49, wherein the biocidal moiety is selected from the group consisting of phenols, halogenated phenols, halogen-containing compounds, thiazoles, azoles, sulfoamides, isothiazolinones, butenolides and their derivatives, 2-furanone, ascorbic acid, aldehyde-containing compounds, guanidines, sulfones, thiocyanates, pyrithiones, benzoic acid, sorbic acid, quaternary ammonium salts, peroxides, perchlorates, amides, amines, carbamates, glyphosates, antibiotics such as β-lactam antibiotics, biocidal enzymes, biocidal polypeptides, combinations thereof, and functional fragments thereof.

Aspect 18. A sidechain functionalized organosiloxane compound having a structure according to any one of the following formulas: where each occurrence of n is independently an integer from 6 to 30, from 6 to 25, or from 6 to 18; where each occurrence of b is independently an integer from 2 to 15 or from 2 to 12; where each occurrence of a is independently an integer from 2 to 12, from 12 to 25, or from 2 to 20; where each occurrence of d is independently an integer from 1, 2, 3, 4, 5, 6, 7, 8, 9, 10, 11, or 12; and where each occurrence of c is independently an integer from 2 to 25, from 2 to 12, from 12 to 25, or from 2 to 20.

AM-14
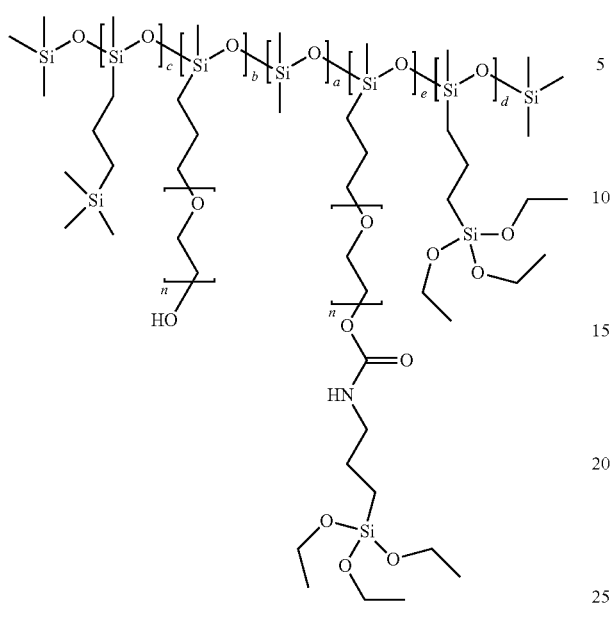
$A \approx 30, b \approx 3.5, c = 0, d = 0, e \approx 3.5, n \approx 10$
AM-24
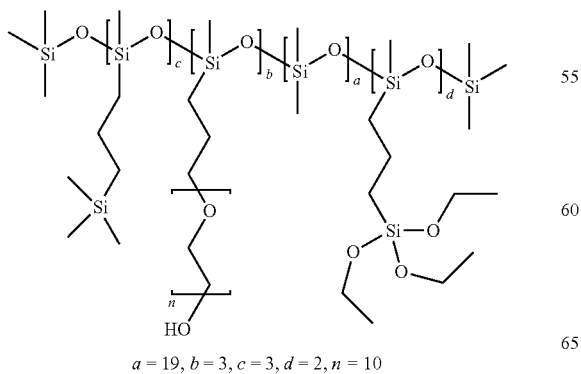
$a = 0, b = 16, c = 14, d = 2, n = 10$
AM-22
(see below)
AM-21
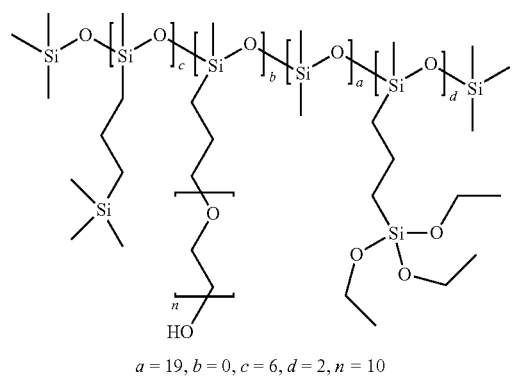
$a = 19, b = 0, c = 6, d = 2, n = 10$
AM-20
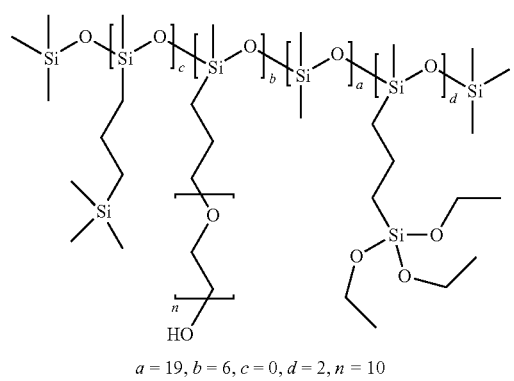
$a = 19, b = 6, c = 0, d = 2, n = 10$
AM-42
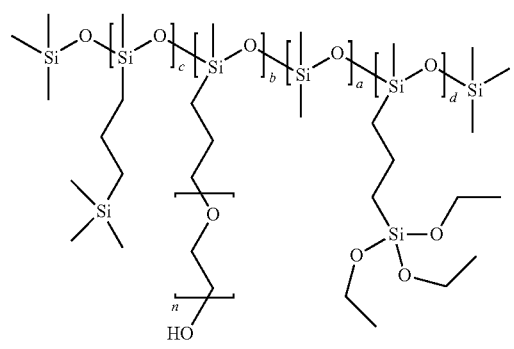
$a = 0, b = 3.2, c = 26.8, d = 2, n = 10$
AM-41
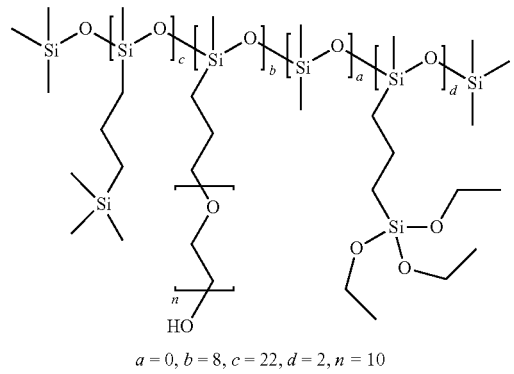
$a = 0, b = 8, c = 22, d = 2, n = 10$
$a = 19, b = 3, c = 3, d = 2, n = 10$

AM-30

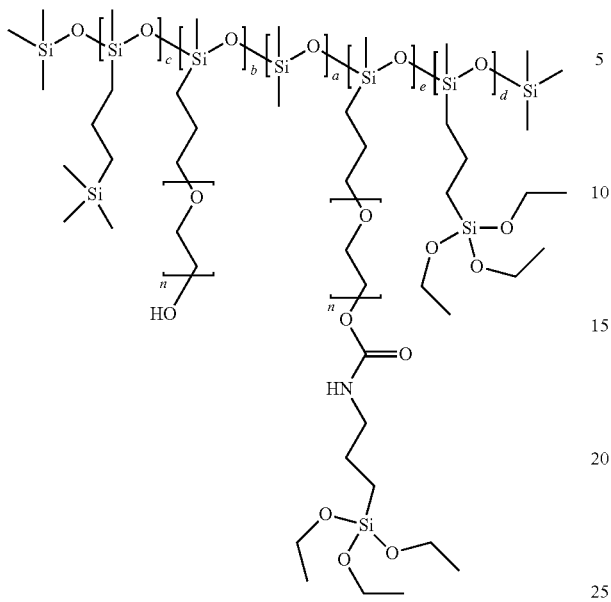

$a = 0, b = 16, c = 14, d = 0, e = 2, n = 10$

Aspect 19. A sidechain functionalized organosiloxane compound comprising a polysiloxane backbone comprising a first plurality of repeat units having a structure according to Formula 3 and a second plurality of repeat units having a structure according to Formula 4 where each occurrence of $X_3$ and $X_4$ are independently a substituted or unsubstituted alkyl, a substituted or unsubstituted heteroalkyl, a substituted or unsubstituted phenyl, or a combination thereof; where each occurrence of $L_3$ and $L_4$ are independently none, a substituted or unsubstituted alkyl, or a substituted or unsubstituted heteroalkyl; where each occurrence of $R_3$ is independently a hydrophilic polyalkylene glycol; where each occurrence of $R_4$ is independently an organosiloxane, a fluoroalkyl, or a hydrophilic polyalkylene glycol; where each occurrence of $A_3$ and $A_4$ are independently a $C_1$-$C_3$ alkyl, a $C_1$-$C_3$ fluoroalkyl, a hydroxyl, or a reactive end group selected from the group consisting of alkoxy, enoxy, oxime, primary amine, secondary amine, ethoxy silane, methoxy silane, and acetoxy silane groups that are reactive for silicone condensation cure chemistry; vinyl groups that are reactive for platinum addition cure silicone chemistry; epoxide groups reactive with epoxy chemistry; —$NH_2$ groups reactive with epoxy and polyurethane chemistry; and —NCO and —OH groups reactive with polyurethane chemistry so long as at least one of $A_3$ and $A_4$ is a reactive end group; wherein, if $R_3$ and $R_4$ are both hydrophilic polyalkylene glycol, then at least one of $A_3$ and $A_4$ is a $C_1$-$C_3$ alkyl, a $C_1$-$C_3$ fluoroalkyl, or a hydroxyl.

Formula 3

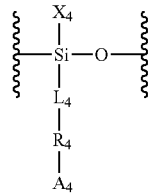

Formula 4

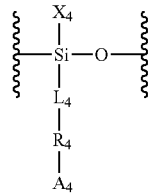

(Note: Formula 4 shown with subscript 4)

Aspect 20. The sidechain functionalized organosiloxane compound according to any one of Aspects 1-49, wherein each occurrence of $X_3$ and $X_4$ are independently —$CH_3$, —$CH_2CH_3$, —$CH_2CH_2CF_3$, or phenyl.

Aspect 21. The sidechain functionalized organosiloxane compound according to any one of Aspects 1-49, wherein each occurrence of $L_3$ and $L_4$ are independently none or $C_1$-$C_4$ alkyl.

Aspect 22. The sidechain functionalized organosiloxane compound according any one of Aspects 1-49, wherein each occurrence of $R_3$ is independently —$(OCH_2CH_2)_{n2}$— or —$(OCH_2CH_2CH_2)_{n2}$— where n2 is an integer from 1 to 22, preferably 6 to 25.

Aspect 23. The sidechain functionalized organosiloxane compound according to any one of Aspects 1-49, wherein each occurrence of $R_4$ is independently —$Si(CH_3)_2$—, —$Si(CH_2CH_3)_2$—, —$[Si(CH_3)_2$—$O$—$]_{n3}$—, —$[Si(CH_2CH_3)_2$—$O$—$]_{n3}$—, or —$(CF_2)_{n3}$—, where n3 is an integer from 1 to 10.

Aspect 24. The sidechain functionalized organosiloxane compound according to any one of Aspects 1-49, wherein each occurrence of $A_3$ is selected from the group consisting of —OH, —$Si(OCH_2CH_3)_3$, —$Si(OCH_3)_3$, and

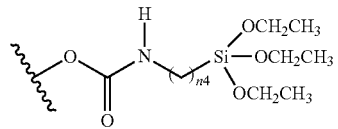

where n4 is an integer from 1 to 7.

Aspect 25. The sidechain functionalized organosiloxane compound according to any one of Aspects 1-49, wherein each occurrence of $A_3$ is independently a $C_1$-$C_3$ alkyl, a $C_1$-$C_3$ fluoroalkyl, or a hydroxyl.

Aspect 26. The sidechain functionalized organosiloxane compound according any one of Aspects 1-49, wherein each occurrence of $A_4$ is independently a $C_1$-$C_3$ alkyl, a $C_1$-$C_3$ fluoroalkyl, or a hydroxyl.

Aspect 27. The sidechain functionalized organosiloxane compound according to any one of Aspects 1-49, wherein each occurrence of $A_4$ is selected from the group consisting of —OH, —$Si(OCH_2CH_3)_3$, —$Si(OCH_3)_3$, and

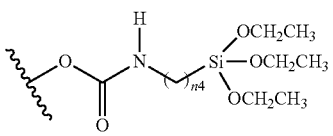

where n4 is an integer from 1 to 7.

Aspect 28. A sidechain functionalized organosiloxane compound having a structure according to the following formula where each occurrence of $R_1$ is independently a substituted or unsubstituted $C_1$-$C_5$ alkyl, a substituted or unsubstituted $C_1$-$C_5$ heteroalkyl, or a substituted or unsubstituted phenyl; where each occurrence of $R_2$ is independently a substituted or unsubstituted $C_1$-$C_5$ alkyl, a substituted or unsubstituted $C_1$-$C_5$ heteroalkyl, or a hydroxyl; where each occurrence of $R_3$ is independently a reactive end group selected from the group consisting of alkoxy, enoxy, oxime, primary amine, secondary amine, ethoxy silane, methoxy silane, and acetoxy silane groups that are reactive for silicone condensation cure chemistry; vinyl groups that are reactive for platinum addition cure silicone chemistry; epoxide groups reactive with epoxy chemistry; —$NH_2$ groups reactive with epoxy and polyurethane chemistry; and —NCO and —OH groups reactive with polyurethane chemistry; where each occurrence of $R_4$ is independently a substituted or unsubstituted organosiloxane or a substituted or unsubstituted alkyl; where each occurrence of $R_5$ is independently a reactive end group selected from the group consisting of alkoxy, enoxy, oxime, primary amine, secondary amine, ethoxy silane, methoxy silane, and acetoxy silane groups that are reactive for silicone condensation cure chemistry; vinyl groups that are reactive for platinum addition cure silicone chemistry; epoxide groups reactive with epoxy chemistry; —$NH_2$ groups reactive with epoxy and polyurethane chemistry; and —NCO and —OH groups reactive with polyurethane chemistry; where each occurrence of $L_2$, $L_3$, $L_4$, and $L_5$ is independently a substituted or unsubstituted $C_1$-$C_{12}$ alkyl or a substituted or unsubstituted $C_1$-$C_{12}$ heteroalkyl; where each occurrence of $A_2$ and $A_3$ is independently a substituted or unsubstituted hydrophilic polyalkylene glycol; where a is in integer from 0 to 50, b is an integer from 0 to 50, c is an integer from 0 to 50, d is an integer from 0 to 100, and e is an integer from 0 to 20 so long as a+e is greater than or equal to 1.

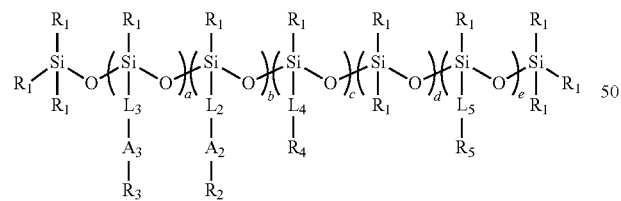

Formula I

Aspect 29. The sidechain functionalized organosiloxane compound according to any one of Aspects 1-49, wherein each occurrence of $A_2$ is —$(O(CH_2)_o)_m$— and each occurrence of $A_3$ is —$(O(CH_2)_o)_n$— where m is an integer from 2 to 20, n is an integer from 2 to 20, and o is an integer from 2 to 4.

Aspect 30. The sidechain functionalized organosiloxane compound according to any one of Aspects 1-49, wherein each occurrence of $L_2$, $L_3$, $L_4$, and $L_5$ is independently a $C_1$-$C_5$ alkyl.

Aspect 31. A sidechain functionalized organosiloxane compound having a structure according to Formula II where each occurrence of $R_1$ is independently a substituted or unsubstituted $C_1$-$C_5$ alkyl, a substituted or unsubstituted $C_1$-$C_5$ heteroalkyl, or a substituted or unsubstituted phenyl; where each occurrence of $R_2$ is independently a substituted or unsubstituted $C_1$-$C_5$ alkyl, a substituted or unsubstituted $C_1$-$C_5$ heteroalkyl, or a hydroxyl; where each occurrence of $R_3$ is independently a reactive end group selected from the group consisting of alkoxy, enoxy, oxime, primary amine, secondary amine, ethoxy silane, methoxy silane, and acetoxy silane groups that are reactive for silicone condensation cure chemistry; vinyl groups that are reactive for platinum addition cure silicone chemistry; epoxide groups reactive with epoxy chemistry; —$NH_2$ groups reactive with epoxy and polyurethane chemistry; and —NCO and —OH groups reactive with polyurethane chemistry; where each occurrence of $R_4$ is independently a substituted or unsubstituted organosiloxane or a substituted or unsubstituted alkyl; where each occurrence of $R_5$ is independently a reactive end group selected from the group consisting of alkoxy, enoxy, oxime, primary amine, secondary amine, ethoxy silane, methoxy silane, and acetoxy silane groups that are reactive for silicone condensation cure chemistry; vinyl groups that are reactive for platinum addition cure silicone chemistry; epoxide groups reactive with epoxy chemistry; —$NH_2$ groups reactive with epoxy and polyurethane chemistry; and —NCO and —OH groups reactive with polyurethane chemistry; and where a is in integer from 0 to 50, b is an integer from 0 to 50, c is an integer from 0 to 50, d is an integer from 0 to 100, and e is an integer from 0 to 20 so long as a+e is greater than or equal to 1.

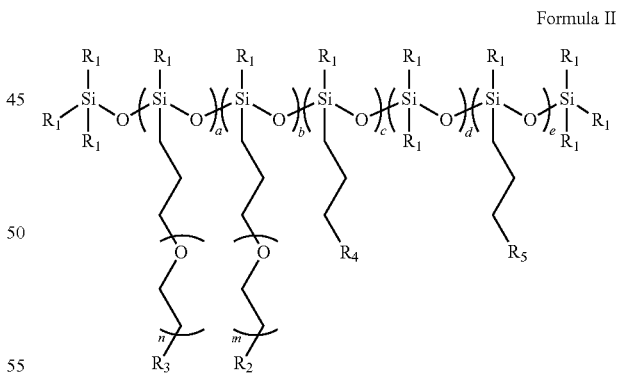

Formula II

Aspect 32. A sidechain functionalized organosiloxane compound having a structure according to the following general formula where each occurrence of $R_1$ is independently selected from the group consisting of substituted and unsubstituted $C_1$-$C_5$ alkyl and substituted and unsubstituted phenyl, and preferably where each occurrence of $R_1$ is independently selected from the group consisting of $CH_3$, —$CH_2$—$CH_3$, —$CH_2$—$CH_2$—$CF_3$, and phenyl; where each occurrence of $R_2$ is independently methyl, hydroxyl, or a primary or secondary amine, preferably where the hydroxyl is not substantially reactive; where each occurrence of $R_3$ and $R_5$ is independently a reactive group that is independently selected from the group consisting of groups that are reactive with silicone condensation cure, groups that are reactive with platinum cure addition silicone chemistry, groups that are reactive with amines as part of epoxy binder systems, groups that are reactive with epoxy and polyurethane chemistries, and a combination thereof; preferably where each occurrence of $R_3$ and $R_5$ is independently selected from the group consisting of alkoxy, enoxy, oxime, primary and secondary amines, ethoxy, methoxy, or acetoxy silane, vinyl, epoxide, —$NH_2$, —NCO, —OH, and a combination thereof; optionally wherein the $R_3$ is linked via a carbamate linkage; where each occurrence of $R_4$ is independently an polyorganosiloxane —$Si(CH_3)_3$, —$Si(CH_2CH_3)_3$, [—$Si(CH_3)_2$—O—$]_i$—$Si(CH_3)_3$ where i can be 1-10, $R_4$ can also be a short fluorinated moiety —$CF_3$, —$(CF_2)_j$—$CF_3$, where j can be 1-10; where each occurrence of w is independently an integer from 1 to 9, preferably 2 or 3; where each occurrence of x is independently an integer from 2 to 6, preferably 2 or 3; where each occurrence of n is independently an integer from 1 to 22, preferably 6 to 25; where a, b, c, d, and e are each integers from 0 to 50, preferably 0 to 18, so long as a+b+c+d+e is at least 2, and where b is not zero if a is greater than 1

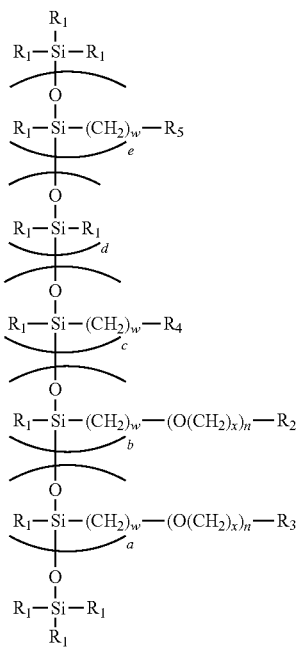

Aspect 33. The sidechain functionalized organosiloxane compound according to any one of Aspects 1-49, where a+e is at least 2 or more.

Aspect 34. The sidechain functionalized organosiloxane compound according to any one of Aspects 1-49, wherein x is 2 and n is 10-12.

Aspect 35. The sidechain functionalized organosiloxane compound according to any one of Aspects 1-49, wherein each occurrence of $R_1$ is independently $CH_3$, —$CH_2$—$CH_3$, —$CH_2$—$CH_2$—$CF_3$, or phenyl.

Aspect 36. The sidechain functionalized organosiloxane compound according to any one of Aspects 1-49, wherein each occurrence of $R_2$ is independently methyl or hydroxyl.

Aspect 37. The sidechain functionalized organosiloxane compound according to any one of Aspects 1-49, wherein each occurrence of $R_3$ is independently a methoxy silane, ethoxy silane, or acetoxy silane, —OH, —$Si(OCH_2CH_3)_3$, —$Si(OCH_3)_3$, or

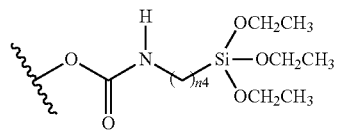

where n4 is an integer from 1 to 7.

Aspect 38. The sidechain functionalized organosiloxane compound according to any one of Aspects 1-49, wherein each occurrence of $R_4$ is independently —$Si(CH_3)_3$, —$Si(CH_2CH_3)_3$, —$[Si(CH_3)_2$—O—$]_{n3}$-$Si(CH_3)_3$, —$CF_3$, or —$(CF_2)_{n3}$—$CF_3$, where n3 is an integer from 1 to 10.

Aspect 39. The sidechain functionalized organosiloxane compound according to any one of Aspects 1-49, wherein each occurrence of $R_5$ is independently is independently a methoxy silane, ethoxy silane, or acetoxy silane.

Aspect 40. The sidechain functionalized organosiloxane compound according to any one of Aspects 1-49, wherein a sum of a+b+c+d+e is about 15, 20, or 25 and up to about 40, 50, or 60.

Aspect 41. The sidechain functionalized organosiloxane compound according to any one of Aspects 1-49, wherein e is 1, 2, 3, 4, 5, 6, 7, 8, 9, or 10.

Aspect 42. The sidechain functionalized organosiloxane compound according to any one of Aspects 1-49, wherein a is 0, 1, 2, 3, or 4.

Aspect 43. The sidechain functionalized organosiloxane compound according to any one of Aspects 1-49, wherein d is about 15 to 25 and e is about 1, 2, 3, 4, 5, 6, 7, 8, 9, or 10.

Aspect 44. The sidechain functionalized organosiloxane compound according to any one of Aspects 1-49, wherein b is about 2 to 20, e.g. 1, 2, 3, 4, 5, 6, 7, 8, 9, 10, 12, 14, 16, 18, or 20.

Aspect 45. The sidechain functionalized organosiloxane compound according to any one of Aspects 1-49, wherein c is about 2 to 20, e.g. 1, 2, 3, 4, 5, 6, 7, 8, 9, 10, 12, 14, 16, 18, or 20.

Aspect 46. The sidechain functionalized organosiloxane compound according to any one of Aspects 1-49, wherein a is 0, 1, 2, 3, or 4, b is 3 to 10, c is 0, 1, 2, 3, or 4, d is 15 to 25, and e is 1, 2, 3, 4, 5, 6, 7, 8, 9, or 10.

Aspect 47. The sidechain functionalized organosiloxane compound according to any one of Aspects 1-49, wherein a is 0, 1, 2, 3, or 4, b is 0, 1, 2, 3, or 4, c is, 1, 2, 3, 4, 5, 6, 7, 8, 9, or 10, d is 0, 11, 12, 13, 14, 15, 16, 17, 18, 19, 20, 21, 22, 23, 24, 25, 26, 27, 28, 29, or 30, and e is 0, 1, 2, 3, 4, 5, 6, 7, 8, 9, or 10.

Aspect 48. The sidechain functionalized organosiloxane compound according to any one of Aspects 1-49, wherein a is 0, 1, 2, 3, or 4, b is 0, 1, 2, 3, 4, 5, 6, 7, 8, 9, or 10, c is 0, 1, 2, 3, 4, 5, 6, 7, 8, 9, or 10, d is 10, 11, 12, 13, 14, 15, 16, 17, 18, 19, 20, 21, 22, 23, 24, 25, 26, 27, 28, 29, or 30, and e is 0, 1, 2, 3, 4, 5, 6, 7, 8, 9, or 10.

Aspect 49. The sidechain functionalized organosiloxane compound according to any one of Aspects 1-49, wherein a is 0, 1, 2, 3, or 4, b is 10, 11, 12, 13, 14, 15, 16, 17, 18, 19, 20, 21, 22, 23, 24, 25, 26, 27, 28, 29, or 30, c is 10, 11, 12, 13, 14, 15, 16, 17, 18, 19, 20, 21, 22, 23, 24, 25, 26, 27, 28, 29, or 30, d is 0, 1, 2, 3, or 4, and e is 0, 1, 2, 3, 4, 5, 6, 7, 8, 9, or 10.

Aspect 50. A biocidal functionalized organosiloxane comprising: (i) an organosiloxane backbone; (ii) at least one polyoxyalkylene chain having a tethered end covalently attached to the polysiloxane backbone and a free end opposite to the tethered end; (iii) at least one biocidal moiety, wherein the at least one biocidal moiety is either covalently attached to the free end of the polyoxyalkylene chain or to the organosiloxane backbone, optionally wherein the covalent attachment comprises a first linker; and (iv) at least one reactive end group, wherein the at least one reactive end group is either covalently attached to the free end of the polyoxyalkylene chain or to the organosiloxane backbone, optionally wherein the covalent attachment comprises a second linker which may be the same or different from the first linker.

Aspect 51. The biocidal functionalized organosiloxane according to any one of Aspects 50-77, wherein the organosiloxane backbone is linear.

Aspect 52. The biocidal functionalized organosiloxane according to any one of Aspects 50-77, wherein the organosiloxane backbone is branched.

Aspect 53. The biocidal functionalized organosiloxane according to any one of Aspects 50-77, wherein the at least one biocidal moiety is covalently attached to the organosiloxane backbone; and wherein the at least one reactive end group is covalently attached to the free end of the polyoxyalkylene chain.

Aspect 54. The biocidal functionalized organosiloxane according to any one of Aspects 50-77, wherein the at least one biocidal moiety is covalently attached to the organosiloxane backbone via a linker selected from the group consisting of $C_1$-$C_{12}$ alkyl and heteroalkyl, preferably $C_1$-$C_5$ alkyl and heteroalkyl.

Aspect 55. The biocidal functionalized organosiloxane according to any one of Aspects 50-77, wherein the least one reactive end group is covalently attached to the organosiloxane backbone; and wherein the at least one biocidal moiety is covalently attached to the free end of the polyoxyalkylene chain.

Aspect 56. The biocidal functionalized organosiloxane according to any one of Aspects 50-77, wherein the at least one reactive end group is covalently attached to the organosiloxane backbone via a linker selected from the group consisting of $C_1$-$C_{12}$ alkyl and heteroalkyl, preferably $C_1$-$C_5$ alkyl and heteroalkyl.

Aspect 57. The biocidal functionalized organosiloxane according to any one of Aspects 50-77, wherein the at last one polyoxyalkylene chain comprises a first polyoxyalkylene chain and a second polyoxyalkylene chain; wherein each of the first polyoxyalkylene chain and the second polyoxyalkylene chain comprise a tethered end covalently attached to the polysiloxane backbone and a free end opposite to the tethered end; wherein the at least one biocidal moiety is covalently attached to the free end of the first polyoxyalkylene chain; and wherein the at least one reactive end group is covalently attached to the free end of the second polyoxyalkylene chain.

Aspect 58. The biocidal functionalized organosiloxane according to any one of Aspects 50-77, wherein the polyoxyalkylene chains are selected from the group consisting of poly(ethylene glycol), poly(propylene glycol), poly(ethylene glycol-ran-propylene glycol), poly(ethylene glycol-block-propylene glycol), and a combination thereof.

Aspect 59. The biocidal functionalized organosiloxane according to any one of Aspects 50-77, wherein the organosiloxane backbone is nonreactive with silicone condensation cure chemistry, is nonreactive with platinum addition cure silicone chemistry, is nonreactive with epoxy cure chemistry, and/or is nonreactive with polyurethane chemistry.

Aspect 60. The biocidal functionalized organosiloxane according to any any one of Aspects 50-77, wherein the at least one reactive end group is selected from the group consisting of alkoxy, enoxy, oxime, primary amine, secondary amine, ethoxy silane, methoxy silane, and acetoxy silane groups that are reactive for silicone condensation cure chemistry; vinyl groups that are reactive for platinum addition cure silicone chemistry; epoxide groups reactive with epoxy chemistry; —$NH_2$ groups reactive with epoxy and polyurethane chemistry; and —NCO and —OH groups reactive with polyurethane chemistry.

Aspect 61. A biocidal functionalized organosiloxane having a structure according to either of the following formulas where n is an integer from 6 to 20; where b is an integer from 2 to 20, preferably from 8 to 16; where c is an integer from 0 to 20, preferably from 8 to 16; where d is an integer from 1 to 10; preferably from 1 to 6; and where e is an integer from 1 to 20; preferably 2 to 12, more preferably 2 to 8.

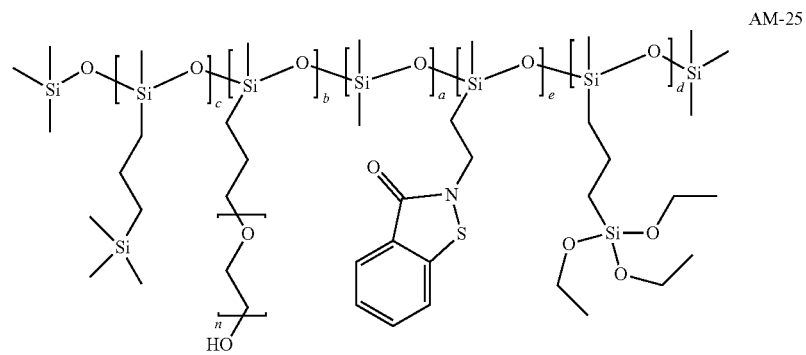
AM-25
a=0, b=12, c=14, d=2, e=4, n=10
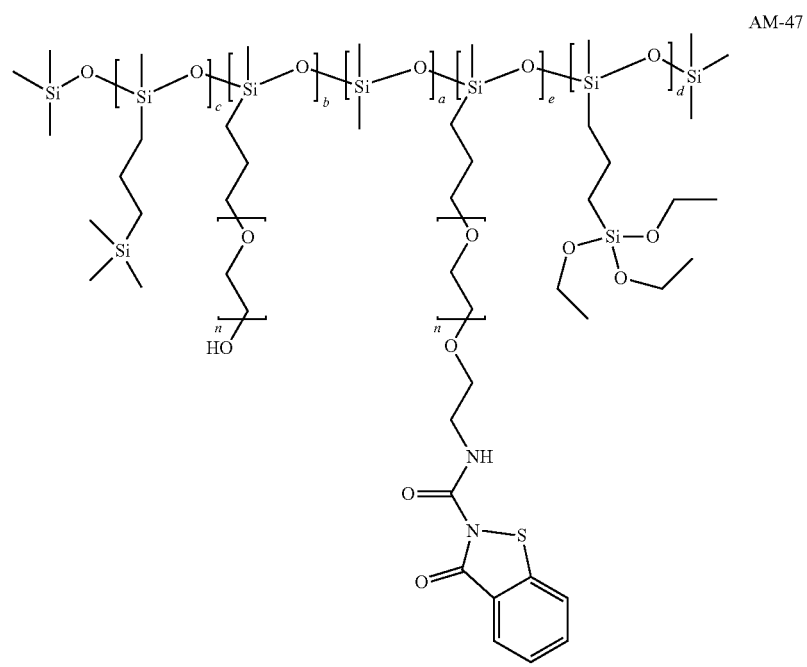
AM-47
a=0, b=4, c=22, d=2, e=4, n=10

Aspect 62. A biocidal functionalized organosiloxane having a structure according to the following formula: where each occurrence of $R_1$ is independently selected from the group consisting of substituted and unsubstituted $C_1$-$C_5$ alkyl and substituted and unsubstituted phenyl, and preferably where each occurrence of $R_1$ is independently selected from the group consisting of —$CH_3$, —$CH_2$—$CH_3$, —$CH_2$—$CH_2$—$CF_3$, and phenyl where each occurrence of $R_2$ is independently a reactive end group; where each occurrence of $R_3$ is a biocidal group; where each occurrence of $R_4$ is selected from the group consisting of $R_1$, $R_2$, and $R_3$; where each occurrence of $R_5$ is a polyorganosilxoane or a short fluorinated moiety; where a is an integer from 0 to 30; where b is an integer from 0 to 30; where c is an integer from 1 to 30; where d is an integer from 0 to 30; where e is an integer from 0 to 30; wherein, if b is 0 at least one occurrence of $R_4$ is $R_3$; where m is an integer from 6 to 25; where n is an integer from 1 to 8; and wherein if a is 0 at least one occurrence of $R_4$ is $R_2$.

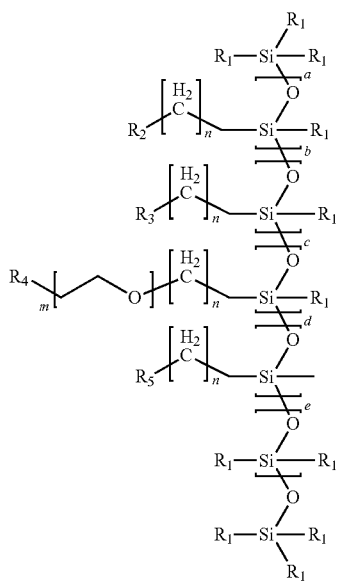

Aspect 63. The biocidal functionalized organosiloxane according to any one of Aspects 50-77, wherein the reactive end group is selected from the group consisting of the following list to achieve substantial reactivity to chemistry of coating matrix (alkoxy silane, oxime, acetoxy, acryloxy, —OH, —NH2, —NR'H, —NCO, epoxy, and hydroxyl-terminated polyoxyalkylene).

Aspect 64. The biocidal functionalized organosiloxane according to any one of Aspects 50-77, wherein $R_5$ is selected from the group consisting of —$Si(CH_3)_3$, —$Si(CH_2CH_3)_3$, [—$Si(CH_3)_2$—O-$]_i$—$Si(CH_3)_3$, —$CF_3$, and —$(CF_2)_j$—$CF_3$, where i can be 1-10 and j can be 1-10.

Aspect 65. A biocidal functionalized organosiloxane having a structure according to the following formula where each occurrence of $R_1$ is independently a substituted or unsubstituted $C_1$-$C_5$ alkyl, a substituted or unsubstituted $C_1$-$C_5$ heteroalkyl, or a substituted or unsubstituted phenyl; where each occurrence of $R_2$ and $R_5$ is independently a substituted or unsubstituted $C_1$-$C_5$ alkyl, a substituted or unsubstituted $C_1$-$C_5$ heteroalkyl, or a hydroxyl; where each occurrence of $R_3$ and $R_8$ is independently a reactive end group selected from the group consisting of alkoxy, enoxy, oxime, primary amine, secondary amine, ethoxy silane, methoxy silane, and acetoxy silane groups that are reactive for silicone condensation cure chemistry; vinyl groups that are reactive for platinum addition cure silicone chemistry; epoxide groups reactive with epoxy chemistry; —$NH_z$ groups reactive with epoxy and polyurethane chemistry; and —NCO and —OH groups reactive with polyurethane chemistry; where each occurrence of $R_4$ and $R_7$ is independently a biocidal moiety; where each occurrence of $R_8$ is independently a substituted or unsubstituted organosiloxane or a substituted or unsubstituted alkyl; where each occurrence of $L_2$, $L_3$, $L_4$, $L_5$, $L_6$, $L_7$, and $L_8$ is independently a substituted or unsubstituted $C_1$-$C_{12}$ alkyl or a substituted or unsubstituted $C_1$-$C_{12}$ heteroalkyl; where each occurrence of $A_2$, $A_3$, and $A_4$ is independently a substituted or unsubstituted hydrophilic polyalkylene glycol; where a, b, c, d, e, f, g, and h are integers from 0 to 50; where a sum of a+b+c is greater than or equal to 1; where a sum of b+f is greater than or equal to 1; and where a sum of c+g is greater than or equal to 1.

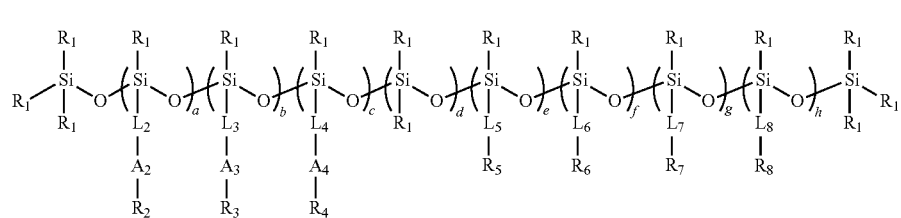

Formula I

Aspect 66. The biocidal functionalized organosiloxane according to any one of Aspects 50-77, wherein the sum of a+b+c if about 8 to 16.

Aspect 67. The biocidal functionalized organosiloxane according to any one of Aspects 50-77, wherein a sum of a+e is about 8 to 16.

Aspect 68. The biocidal functionalized organosiloxane according to any one of Aspects 50-77, wherein the sum of b+f is about 1 to 6.

Aspect 69. The biocidal functionalized organosiloxane according to any one of Aspects 50-77, wherein the sum of c+g is about 2 to 8.

Aspect 70. The biocidal functionalized organosiloxane according to any one of Aspects 50-77, wherein each occurrence of $A_2$ is $-(O(CH_2)_o)_m-$, each occurrence of $A_3$ is $-(O(CH_2)_o)_n-$, and each occurrence of $A_4$ is $-(O(CH_2)_o)_p-$, where m is an integer from 2 to 20, n is an integer from 2 to 20, and o is an integer from 2 to 4; and p is an integer from 2 to 20.

Aspect 71. The biocidal functionalized organosiloxane according to any one of Aspects 50-77, wherein each occurrence of $L_2$, $L_3$, $L_4$, $L_5$, $L_6$, $L_7$, and $L_8$ is independently a $C_1$-$C_5$ alkyl.

Aspect 72. The biocidal functionalized organosiloxane according to any one of Aspects 50-77, wherein each occurrence of $R_1$ is independently $CH_3$, $-CH_2-CH_3$, $-CH_2-CH_2-CF_3$, or phenyl.

Aspect 73. The biocidal functionalized organosiloxane according to any one of Aspects 50-77, wherein each occurrence of $R_2$ and $R_5$ is independently methyl or hydroxyl.

Aspect 74. The biocidal functionalized organosiloxane according to any one of Aspects 50-77, wherein each occurrence of $R_3$ and $R_6$ is independently a methoxy silane, ethoxy silane, or acetoxy silane, $-OH$, $-Si(OCH_2CH_3)_3$, $-Si(OCH_3)_3$, or

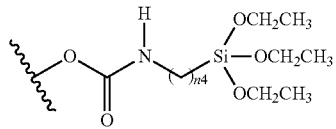

where n4 is an integer from 1 to 7.

Aspect 75. The biocidal functionalized organosiloxane according to any one of Aspects 50-77, wherein each occurrence of $R_8$ is independently $-Si(CH_3)_3$, $-Si(CH_2CH_3)_3$, $-[Si(CH_3)_2-O-]_{n3}-Si(CH_3)_3$, $-CF_3$, or $-(CF_2)_{n3}-CF_3$, where n3 is an integer from 1 to 10.

Aspect 76. The biocidal functionalized organosiloxane according to any one of Aspects 50-77, wherein the biocidal moiety is selected from the group consisting of organic compounds such as dihydropyridazinones; pyridazinones, Diuron, Irgarol 1051, Dichlofluanid, TCMTB, Chlorothalonil, TCMS pyridine, SeaNine 211, Folpet, 4-chloro-meta-cresol, Econea, phenylborane pyridine, and Selektope; essential oils, and organic oils such as oregano and clove bud oil, and functional fragments thereof.

Aspect 77. The biocidal functionalized organosiloxane according to any one of Aspects 50-77, wherein the biocidal moiety is selected from the group consisting of phenols, halogenated phenols, halogen-containing corn pounds, thiazoles, azoles, sulfoamides, isothiazolinones, butenolides and their derivatives, 2-furanone, ascorbic acid, aldehyde-containing compounds, guanidines, sulfones, thiocyanates, pyrithiones, benzoic acid, sorbic acid, quaternary ammonium salts, peroxides, perchlorates, amides, amines, carbamates, glyphosates, antibiotics such as β-lactam antibiotics, biocidal enzymes, biocidal polypeptides, combinations thereof, and functional fragments thereof.

Aspect 78. A sidechain functionalized lubricating oil comprising: (i) an organosiloxane backbone; and (ii) at least one sidechain selected from the group consisting of a polyoxyalkylene sidechain, a zwitterionic sidechain, a biocidal sidechain, an organosiloxane sidechain, a fluoroalkyl sidechain, and a combination thereof; wherein the sidechain functionalized lubricating oil is nonreactive with silicone condensation cure chemistry, is nonreactive with platinum addition cure silicone chemistry, is nonreactive with epoxy cure chemistry, and/or is nonreactive with polyurethane chemistry.

Aspect 79. The sidechain functionalized lubricating oil according to any one of Aspects 78-94, comprising at least one of: (i) a biocidal sidechain comprising a polyoxyethylene sidechain having a tethered end covalently attached to the organosiloxane backbone and a free end opposite to the tethered end, and a biocidal moiety covalently attached to the free end; and (ii) a zwitterionic sidechain comprising a polyoxyethylene sidechain having a tethered end covalently attached to the organosiloxane backbone and a free end opposite to the tethered end, and a zwitterionic moiety covalently attached to the free end.

Aspect 80. The sidechain functionalized lubricating oil according to any one of Aspects 78-94, wherein the at least one sidechain comprises a polyoxyalkylene sidechain having a tethered end covalently attached to the organosiloxane backbone and a free end containing a C1-C5 alkyl or a hydroxyl.

Aspect 81. The sidechain functionalized lubricating oil according to any one of Aspects 78-94, wherein the least one sidechain comprises an organosiloxane sidechain.

Aspect 82. The sidechain functionalized lubricating oil according to any one of Aspects 78-94, wherein the at least one sidechain comprises a fluoroalkyl sidechain.

Aspect 83. A sidechain functionalized lubricating oil having a structure according to the following formula where each occurrence of $R_1$ is independently a substituted or unsubstituted $C_1$-$C_5$ alkyl, a substituted or unsubstituted $C_1$-$C_5$ heteroalkyl, or a substituted or unsubstituted phenyl; where each occurrence of $R_2$ is independently a substituted or unsubstituted $C_1$-$C_5$ alkyl, a substituted or unsubstituted $C_1$-$C_5$ heteroalkyl, or a hydroxyl; where each occurrence of $R_4$ is independently a substituted or unsubstituted organosiloxane or a substituted or unsubstituted alkyl; where each occurrence of $L_2$, $L_4$, and $L_6$, and $L_7$ is independently none or a substituted or unsubstituted $C_1$-$C_{12}$ alkyl or a substituted or unsubstituted $C_1$-$C_{12}$ heteroalkyl; where each occurrence of $A_2$, $A_6$, and $A_7$ is independently none or a substituted or unsubstituted hydrophilic polyalkylene glycol; where each occurrence of $Z_6$ is a zwitterionic moiety; where each occurrence of $Bd7$ is a biocidal moiety; where b is an integer from 0 to 50, c is an integer from 0 to 50, d is an integer from 0 to 100, f is an integer from 0 to 20, g is an integer from 0 to 20; and where a sum of b+c+d+f+g is about 1 to 100 or about 3 to 50.

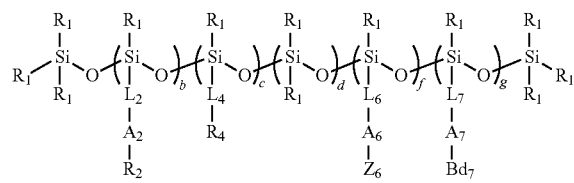

Aspect 84. The sidechain functionalized lubricating oil according to any one of Aspects 78-94, wherein $A_2$, $A_6$, and $A_7$ are, if present, a substituted or unsubstituted hydrophilic polyalkylene glycol.

Aspect 85. The sidechain functionalized lubricating oil according to any one of Aspects 78-94, wherein if $A_2$ is absent then $L_2$ is a substituted or unsubstituted $C_1$-$C_{12}$ alkyl or a substituted or unsubstituted $C_1$-$C_{12}$ heteroalkyl; wherein if $A_6$ is absent then $L_6$ is a substituted or unsubstituted $C_1$-$C_{12}$ alkyl or a substituted or unsubstituted $C_1$-$C_{12}$ heteroalkyl; and wherein if $A_7$ is absent then $L_7$ is a substituted or unsubstituted $C_1$-$C_{12}$ alkyl or a substituted or unsubstituted $C_1$-$C_{12}$ heteroalkyl.

Aspect 86. The sidechain functionalized lubricating oil according to any one of Aspects 78-94, wherein a sum of f+g is at least 1, at least 2, or at least 3.

Aspect 87. The sidechain functionalized lubricating oil according to any one of Aspects 78-94, wherein b is at least 1.

Aspect 88. The sidechain functionalized lubricating oil according to any one of Aspects 78-94, wherein c is at least 1.

Aspect 89. The sidechain functionalized lubricating oil according to any one of Aspects 78-94, wherein the polyoxyalkylene chains are selected from the group consisting of poly(ethylene glycol), poly(propylene glycol), poly(ethylene glycol-ran-propylene glycol), poly(ethylene glycol-block-propylene glycol), and a combination thereof.

Aspect 90. The sidechain functionalized lubricating oil according to any one of Aspects 78-94, wherein the zwitterionic moiety is selected from the group consisting of phosphates, sulfonates or carboxylates.

Aspect 91. The sidechain functionalized lubricating oil according to any one of Aspects 78-94, wherein the zwitterionic moiety is selected from the group consisting of aminoalkyl phosphonic acids, aminoalkyl carboxylic acids, and aminoalkyl sulfonic acids.

Aspect 92. The sidechain functionalized lubricating oil according to any one of Aspects 78-94, wherein the zwitterionic moiety is selected from the group consisting of sulfobetaine, carboxybetaine, glycine betaine, trimethylamine N-oxide, and phosphoryl choline.

Aspect 93. The sidechain functionalized lubricating oil according to any one of Aspects 78-94, wherein the biocidal moiety is selected from the group consisting of organic compounds such as dihydropyridazinones; pyridazinones, Diuron, Irgarol 1051, Dichlofluanid, TCMTB, Chlorothalonil, TCMS pyridine, SeaNine 211, Folpet, 4-chloro-meta-cresol, Econea, phenylborane pyridine, and Selektope; essential oils, and organic oils such as oregano and clove bud oil, and functional fragments thereof.

Aspect 94. The sidechain functionalized lubricating oil according to any one of Aspects 78-94, wherein the biocidal moiety is selected from the group consisting of phenols, halogenated phenols, halogen-containing compounds, thiazoles, azoles, sulfoamides, isothiazolinones, butenolides and their derivatives, 2-furanone, ascorbic acid, aldehyde-containing compounds, guanidines, sulfones, thiocyanates, pyrithiones, benzoic acid, sorbic acid, quaternary ammonium salts, peroxides, perchlorates, amides, amines, carbamates, glyphosates, antibiotics such as β-lactam antibiotics, biocidal enzymes, biocidal polypeptides, combinations thereof, and functional fragments thereof.

Aspect 95. A polymer composition capable of curing on a substrate to form a surface that is resistant to biofouling, the polymer composition comprising: (a) a base resin composition comprising (i) one or more different polymeric precursors capable of curing to form a cured resin and (ii) a sidechain functionalized organosiloxane compound according to any one of Aspects 1-49 that comprises reactive end groups capable of reacting with the one or more different polymeric precursors; wherein, when the base resin composition is cured to form the cured resin, the reactive end groups in the sidechain functionalized organosiloxane compound react with the one or more different polymeric precursors so that the sidechain functionalized organosiloxane compound is integrated into the cured resin.

Aspect 96. The polymer composition according to any one of Aspects 95-149, wherein, when the base resin composition is cured to form the cured resin, the sidechains in the sidechain functionalized organosiloxane compound stratify to the surface.

Aspect 97. The polymer composition according to any one of Aspects 95-149, wherein, when the base resin composition is cured to form the cured resin, at least some of the sidechains in the sidechain functionalized organosiloxane compound are free sidechains that present a dynamic wetting behavior at the surface.

Aspect 98. The polymer composition according to any one of Aspects 95-149, wherein the dynamic wetting behavior comprises a decrease in a water contact angle for the surface when measured over the first two minutes of exposing the surface to water.

Aspect 99. The polymer composition according to any one of Aspects 95-149, further comprising a lubricating liquid, wherein the lubricating liquid is chemically and physically matched with the base resin in such a way that, when cured therewith to form a cured composition, the lubricating liquid is incorporated within the cured composition.

Aspect 100. The polymer composition according to any one of Aspects 95-149, wherein the lubricating liquid comprises an amphiphilic lubricant, a partially fluorinated lubricant, or a combination thereof.

Aspect 101. The polymer composition according to any one of Aspects 95-149, wherein the lubricating liquid comprises a polysiloxane having one or more polyalkyllene glycol sidechains attached thereto.

Aspect 102. The polymer composition according to any one of Aspects 95-149, wherein the lubricating liquid comprises a polysiloxane having one or more partially or fully fluorinated alkyl sidechains attached thereto.

Aspect 103. The polymer composition according to any one of Aspects 95-149, wherein the lubricating liquid has an average molecular weight of about 7000 g/mole to about 14000 g/mole.

Aspect 104. The polymer composition according to any one of Aspects 95-149, wherein the partially fluorinated lubricating liquid is present at an amount from about 10% to about 50% by weight based upon a total weight of the composition.

Aspect 105. The polymer composition according to any one of Aspects 95-149, wherein the amphiphilic lubricating liquid is present at an amount from about 5%, 6%, 7%, 8%, 9%, or 10% and up to about 12%, 13%, 14%, 15%, 16%, 17%, 18%, 19%, or 20% by weight based upon a total weight of the composition.

Aspect 106. The polymer composition according to any one of Aspects 95-149, wherein the lubricating liquid comprises a sidechain functionalized lubricant according to any one of Aspects 78-94.

Aspect 107. The polymer composition according to any one of Aspects 95-149, wherein the sidechain functionalized organosiloxane compound is present at an amount from about 2%, 3%, 4%, 5%, 6%, 7%, or 8%, and up to about 12%, 13%, 14%, 15%, 16%, 17%, 18%, 19%, or 20% by weight based upon a total weight of the composition.

Aspect 108. The polymer composition according to any one of Aspects 95-149, wherein the one or more different polymeric precursors comprises acrylic precursors; and wherein the reactive end groups are reactive with acrylic resins.

Aspect 109. The polymer composition according to any one of Aspects 95-149, wherein the one or more different polymeric precursors comprises condensation curable silicone precursors; and wherein the reactive end groups are reactive with condensation cure silicon resins.

Aspect 110. The polymer composition according to any one of Aspects 95-149, wherein the one or more different polymeric precursors comprises addition curable silicone precursors; and wherein the reactive end groups are reactive with addition cure silicon resins.

Aspect 111. The polymer composition according to any one of Aspects 95-149, wherein the one or more different polymeric precursors comprises epoxide precursors; and wherein the reactive end groups are reactive with epoxy resins.

Aspect 112. The polymer composition according to any one of Aspects 95-149, wherein the one or more different polymeric precursors comprises polyurethane precursors; and wherein the reactive end groups are reactive with urethane resins.

Aspect 113. The polymer composition according to any one of Aspects 95-149, further comprising one or more biocidal agents which, when cured therewith, are incorporated into the cured base resin and released from the base resin.

Aspect 114. The polymer composition according to any one of Aspects 95-149, wherein the biocidal agents are selected from the group consisting of metal biocides such as Copper(I) oxide, Copper thiocyanate, Copper pyrithione, Cu powder, Chromium trioxide, Zinc pyrithione, Ziram, Zineb; organic compounds such as dihydropyridazinones; pyridazinones, Diuron, Irgarol 1051, Dichlofluanid, TCMTB, Chlorothalonil, TCMS pyridine, SeaNine 211, Folpet, 4-chloro-meta-cresol, Econea, phenylborane pyridine, and Selektope; essential oils, and organic oils such as oregano and clove bud oil.

Aspect 115. The polymer composition according to any one of Aspects 95-149, wherein the biocidal agents are present at an amount from about 2%, 3%, 4%, 5%, 6% and up to about 12%, 13%, 14%, 15%, 16%, 17%, 18%, 19%, or 20% by weight based upon a total weight of the composition.

Aspect 116. The polymer composition according to any one of Aspects 95-149, wherein the base resin composition further comprises one or more biocidal functionalized organosiloxanes according to any one Aspects 50-77.

Aspect 117. The polymer composition according to any one of Aspects 95-149, wherein, when the base resin composition is cured to form the cured resin, the biocidal moieties in the biocidal functionalized organosiloxane stratify to the surface.

Aspect 118. The polymer composition according to any one of Aspects 95-149, wherein, when the base resin composition is cured to form the cured resin, the free polyoxyalkylene sidechains stratify to the surface.

Aspect 119. The polymer composition according to any one of Aspects 95-149, wherein the biocidal functionalized organosiloxane comprises free polyoxyalkylene sidechains and free biocidal moieties such that, when the base resin composition is cured to form the cured resin, both the poloxyalkylene sidechains and the free biocidal moieties stratify to the surface and present an anti-fouling and foul release surface.

Aspect 120. The polymer composition according to any one of Aspects 95-149, wherein, when the base resin composition is cured to form the cured resin, at least some of the sidechains in the biocidal functionalized organosiloxane compound are free sidechains that present a dynamic wetting behavior at the surface.

Aspect 121. The polymer composition according to any one of Aspects 95-149, wherein, when the base resin composition is cured to form the cured resin, at least some of the sidechains in the sidechain functionalized organosiloxane compound are free sidechains that present a dynamic wetting behavior at the surface.

Aspect 122. The polymer composition according to any one of Aspects 95-149, wherein the dynamic wetting behavior comprises a decrease in a water contact angle for the surface when measured over the first two minutes of exposing the surface to water.

Aspect 123. A polymer composition capable of curing on a substrate to form a surface that is resistant to biofouling, the polymer composition comprising: (a) a base resin composition comprising one or more different polymeric precursors capable of curing to form a cured resin; and (b) a polyoxyalkylene zwitterionic lubricating oil according to any one of Aspects 163-187; wherein when cured therewith, the polyoxyalkylene zwitterionic lubricating oil is incorporated into the cured base resin and presents a lubricious amount of the polyoxyalkylene zwitterionic lubricating oil on the surface.

Aspect 124. The polymer composition according to any one of Aspects 95-149, wherein the base resin composition further comprises one or more surface active polymers capable of reacting with the one or more different polymeric precursors to be covalently incorporated into the cured base resin upon curing.

Aspect 125. The polymer composition according to any one of Aspects 95-149, wherein the surface active polymers comprise one or more of polyoxyalkylene sidechains, zwitterionic sidechains, and a combination thereof.

Aspect 126. The polymer composition according to any one of Aspects 95-149, wherein the one or more different polymeric precursors comprises acrylic precursors.

Aspect 127. The polymer composition according to any one of Aspects 95-149, wherein the one or more different polymeric precursors comprises condensation curable silicone precursors.

Aspect 128. The polymer composition according to any one of Aspects 95-149, wherein the one or more different polymeric precursors comprises addition curable silicone precursors.

Aspect 129. The polymer composition according to any one of Aspects 95-149, wherein the one or more different polymeric precursors comprises epoxide precursors.

Aspect 130. The polymer composition according to any one of Aspects 95-149, wherein the one or more different polymeric precursors comprises polyurethane precursors.

Aspect 131. The polymer composition according to any one of Aspects 95-149, wherein the polyoxyalkylene zwitterionic lubricating oil is present in in an amount from about 2% to about 12% by weight based upon a total weight of the polymer composition.

Aspect 132. A polymer composition capable of curing on a substrate to form a surface that is resistant to biofouling, the polymer composition comprising: (a) a base resin composition comprising one or more different polymeric precursors capable of curing to form a cured resin; and (b) a sidechain functionalized lubricating oil according to any one of Aspects 78-94; wherein when cured therewith, the sidechain functionalized lubricating oil is incorporated into the cured base resin and presents a lubricious amount of the sidechain functionalized lubricating oil on the surface.

Aspect 133. The polymer composition according to any one of Aspects 95-149, wherein the base resin composition further comprises one or more surface active polymers capable of reacting with the one or more different polymeric precursors to be covalently incorporated into the cured base resin upon curing.

Aspect 134. The polymer composition according to any one of Aspects 95-149, wherein the surface active polymers comprise one or more of polyoxyalkylene sidechains, zwitterionic sidechains, and a combination thereof.

Aspect 135. The polymer composition according to any one of Aspects 95-149, wherein the one or more different polymeric precursors comprises acrylic precursors.

Aspect 136. The polymer composition according to any one of Aspects 95-149, wherein the one or more different polymeric precursors comprises condensation curable silicone precursors.

Aspect 137. The polymer composition according to any one of Aspects 95-149, wherein the one or more different polymeric precursors comprises addition curable silicone precursors.

Aspect 138. The polymer composition according to any one of Aspects 95-149, wherein the one or more different polymeric precursors comprises epoxide precursors.

Aspect 139. The polymer composition according to any one of Aspects 95-149, wherein the one or more different polymeric precursors comprises polyurethane precursors.

Aspect 140. The polymer composition according to any one of Aspects 95-149, wherein the polyoxyalkylene zwitterionic lubricating oil is present in in an amount from about 2% to about 12% by weight based upon a total weight of the polymer composition.

Aspect 141. The polymer composition according to any one of Aspects 95-149, wherein the base resin composition comprises a first silanol terminated siloxane polymer having a first average molecular weight, and a second silanol terminated siloxane polymer having a second average molecular weight that is greater than the first average molecular weight.

Aspect 142. The polymer composition according to any one of Aspects 95-149, wherein the base resin composition comprises a third silanol terminated siloxane polymer having a third average molecular weight less than the first average molecular weight.

Aspect 143. The polymer composition according any one of Aspects 95-149, wherein the first average molecular weight is about 20000 g/mole to about 60000 g/mole.

Aspect 144. The polymer composition according to any one of Aspects 95-149, wherein the second average molecular weight is about 90000 g/mole or greater, or wherein the second average molecular weight is about twice the first average molecular weight or greater.

Aspect 145. The polymer composition according to any one of Aspects 95-149, wherein the third average molecular weight is about 6000 g/mole or less, or wherein the third average molecular weight is about 10% of the first average molecular weight or less.

Aspect 146. The polymer composition according to any one of Aspects 95-149, wherein the first silanol terminated siloxane is present at a percentage (weight/weight) of about 20% to about 50% by weight based upon a total weight of the polymer composition.

Aspect 147. The polymer composition according to any one of Aspects 95-149, wherein the second silanol terminated siloxane is present at a percentage (weight/weight) of about 3% to about 10% by weight based upon a total weight of the polymer composition.

Aspect 148. The polymer composition according to any one of Aspects 95-149, wherein the third silanol terminated siloxane is present at a percentage (weight/weight) of about 10% to about 20% by weight based upon a total weight of the polymer composition.

Aspect 149. The polymer composition according to any one of Aspects 95-149, further comprising a fourth silanol terminated siloxane having a fourth average molecular weight of about 20000 g/mole to about 60000 g/mole, wherein the fourth average molecular weight is different from the first average molecular weight.

Aspect 150. An article comprising a substrate and a fouling-resistant coating on a surface of the substrate, wherein the fouling-resistant coating comprises a plurality of sidechain functionalized organosiloxane compounds according to any one of Aspects 1-49.

Aspect 151. An article comprising a substrate and a fouling-resistant coating on a surface of the substrate, wherein the fouling-resistant coating comprises a plurality of biocidal functionalized organosiloxane compounds according to any one of Aspects 50-77.

Aspect 152. An article comprising a substrate and a fouling-resistant coating on a surface of the substrate, wherein the fouling-resistant coating comprises a sidechain functionalized lubricant according to any one of Aspects 78-94.

Aspect 153. The article according to any one of Aspects 150-162, wherein the plurality of sidechain functionalized organosiloxane compounds are covalently tethered to the substrate via covalent bonding between the reactive end groups in the sidechain functionalized organosiloxane compounds and reactive groups on the substrate.

Aspect 154. An article comprising a substrate and a fouling-resistant coating on a surface of the substrate, wherein the fouling-resistant coating comprises a polymer composition according to any one of Aspects 95-149 that is cured to form the fouling-resistant coating.

Aspect 155. The article according any one of Aspects 150-162, wherein the fouling-resistant coating further comprises a lubricating liquid chemically and physically matched with the fouling-resistant coating in such a way the lubricating liquid is incorporated into the fouling-resistant coating.

Aspect 156. The article according to any one of Aspects 150-162, wherein the substrate is selected from the group consisting of a polymer, a metal, a sapphire, a glass, a carbon, a ceramic, and a composite thereof.

Aspect 157. The article according to any one of Aspects 150-162, wherein the article is a ship, boat, or other marine vessel; an unmanned underwater vehicle; an aquaculture netting; a sensor; a seismic cable; or other article intended for exposure to an aqueous or marine environment.

Aspect 158. The article according to any one of Aspects 150-162, wherein the article is a drum, vat, or tank; a pipe or conduit; a membrane; or other article intended for exposure to water or aqueous systems, including aqueous waste handling systems.

Aspect 159. The article according to any one of Aspects 150-162, wherein the article is a catheter, stent, or other implantable medical device; a surgical tool; a bag or a container; or other article or surface intended for exposure to blood, bodily flood, or potential pathogens.

Aspect 160. The article according to any one of Aspects 150-162, wherein the plurality of sidechain functionalized organosiloxane compounds are covalently tethered to the substrate via covalent bonding between the reactive end groups in the sidechain functionalized organosiloxane compounds and reactive groups on the substrate.

Aspect 161. The article according to any one of Aspects 150-162, wherein the plurality of biocidal functionalized organosiloxane compounds are covalently tethered to the substrate via covalent bonding between the reactive end groups in the biocidal functionalized organosiloxane compounds and reactive groups on the substrate.

Aspect 162. The article according to any one of Aspects 150-162, wherein the substrate is on a marine platform (e.g. aquaculture nets/pens, tidal wave generators, underwater intakes), a marine vessel (e.g. cargo ships, racing boats, ferries, recreational ships, yachts), a marine vehicle (e.g. unmanned underwater vehicles), an article of naval warfare (e.g. naval ships, submarines, torpedoes, stealth vehicles), or a medical device.

Aspect 163. A polyoxyalkylene zwitterionic lubricating oil comprising (i) an organosiloxane backbone; (ii) at least one polyoxyalkylene chain having a tethered end covalently attached to the polysiloxane backbone and a free end opposite to the tethered end; and (iii) a zwitterionic moiety covalently attached at the free end of the polyoxyalkylene chain; wherein the polyoxyalkylene zwitterionic lubricating oil organosiloxane is nonreactive with silicone condensation cure chemistry, is nonreactive with platinum addition cure silicone chemistry, is nonreactive with epoxy cure chemistry, and/or is nonreactive with polyurethane chemistry.

Aspect 164. The polyoxyalkylene zwitterionic lubricating oil according to any one of Aspects 163-187, wherein the polyoxyalkylene zwitterionic lubricating oil has a molecular weight of about 500 to about 20000.

Aspect 165. The polyoxyalkylene zwitterionic lubricating oil according any one of Aspects 163-187, wherein the organosiloxane backbone comprises a number of repeat units from about 1 to 100 or about 10 to 50.

Aspect 166. The polyoxyalkylene zwitterionic lubricating oil according to any one of Aspects 163-187, wherein the organosiloxane backbone is linear.

Aspect 167. The polyoxyalkylene zwitterionic lubricating oil according to any one of Aspects 163-187, wherein the organosiloxane backbone is branched.

Aspect 168. The polyoxyalkylene zwitterionic lubricating oil according any one of Aspects 163-187, wherein one or more of the polyoxyalkylene chain and the zwitterionic moiety are each covalently attached via a linker group which may be the same or different.

Aspect 169. The polyoxyalkylene zwitterionic lubricating oil according any one of Aspects 163-187, further comprising one or more additional polyoxyalkylene chains that do not have the zwitterionic moiety covalently attached.

Aspect 170. The polyoxyalkylene zwitterionic lubricating oil according to any one of Aspects 163-187, wherein the polyoxyalkylene chains are selected from the group consisting of poly(ethylene glycol), poly(propylene glycol), poly(ethylene glycol-ran-propylene glycol), poly(ethylene glycol-block-propylene glycol), and a combination thereof.

Aspect 171. The polyoxyalkylene zwitterionic lubricating oil according to any one of Aspects 163-187, wherein the linker group comprises a $C_1$-$C_{12}$ alkyl or heteroalkyl or a $C_1$-$C_5$ alkyl or heteroalkyl.

Aspect 172. A polyoxyalkylene zwitterionic lubricating oil having a structure according to the following formula where n is an integer from 6 to 20; where b is an integer from 1 to 20, preferably 2 to 8; and where a is an integer from 0 to 50; preferably 1 to 20.

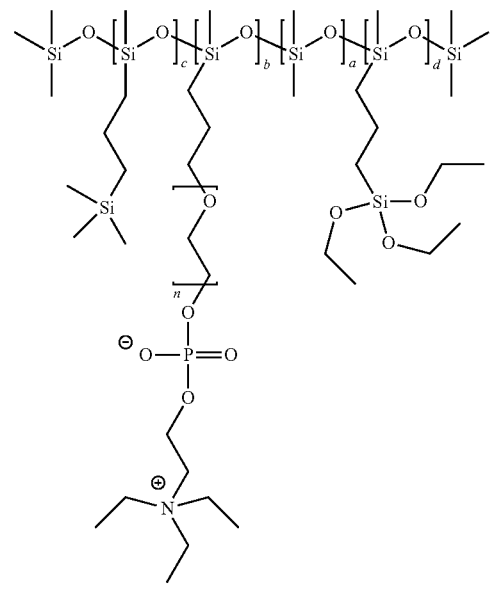

a = 19, b = 8, c = 0, n = 10

Aspect 173. A polyoxyalkylene zwitterionic lubricating oil having a structure according to the following formula where each occurrence of $R_1$ is independently a substituted or unsubstituted $C_1$-$C_5$ alkyl, a substituted or unsubstituted $C_1$-$C_5$ heteroalkyl, or a substituted or unsubstituted phenyl; where each occurrence of $R_2$ is independently a substituted or unsubstituted $C_1$-$C_5$ alkyl, a substituted or unsubstituted $C_1$-$C_5$ heteroalkyl, or a hydroxyl; where each occurrence of $R_4$ is independently a substituted or unsubstituted organosiloxane or a substituted or unsubstituted alkyl; where each occurrence of $L_2$, $L_4$, and $L_5$ is independently a substituted or unsubstituted $C_1$-$C_{12}$ alkyl or a substituted or unsubstituted $C_1$-$C_{12}$ heteroalkyl; where each occurrence of $A_2$, and $A_6$ is independently a substituted or unsubstituted hydrophilic polyalkylene glycol; where each occurrence of $Z_6$ is a zwitterionic moiety; where b is an integer from 0 to 50, c is an integer from 0 to 50, d is an integer from 0 to 100, and f is an integer from 1 to 20.

Formula I

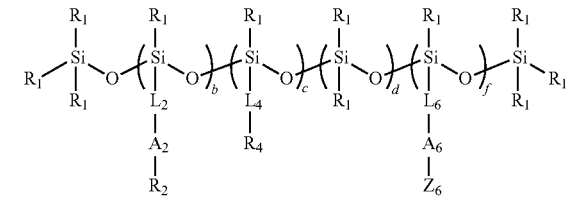

Aspect 174. The polyoxyalkylene zwitterionic lubricating oil according to any one of Aspects 163-187, wherein each occurrence of $A_2$ is —$(O(CH_2)_o)_m$— and each occurrence of $A_6$ is —$(O(CH_2)_o)_p$—, where m is an integer from 2 to 20, o is an integer from 2 to 4; and p is an integer from 2 to 20.

Aspect 175. The polyoxyalkylene zwitterionic lubricating oil according to any one of Aspects 163-187, wherein each occurrence of $L_2$, $L_4$, and $L_5$ is independently a $C_1$-$C_5$ alkyl.

Aspect 176. The polyoxyalkylene zwitterionic lubricating oil according any one of Aspects 163-187, wherein each occurrence of $R_1$ is independently $CH_3$, $-CH_2-CH_3$, $-CH_2-CH_2-CF_3$, or phenyl.

Aspect 177. The polyoxyalkylene zwitterionic lubricating oil compound according to any one of Aspects 163-187, wherein each occurrence of $R_2$ is independently methyl or hydroxyl.

Aspect 178. The polyoxyalkylene zwitterionic lubricating oil according to any one of Aspects 163-187, wherein each occurrence of $R_4$ is independently $-Si(CH_3)_3$, $-Si(CH_2CH_3)_3$, $-[Si(CH_3)_2-O-]_{n3}-Si(CH_3)_3$, $-CF_3$, or $-(CF_2)_{n3}-CF_3$, where n3 is an integer from 1 to 10.

Aspect 179. The polyoxyalkylene zwitterionic lubricating oil according to any one of Aspects 163-187, wherein $Z_6$ is selected from the group consisting of phosphates, sulfonates or carboxylates.

Aspect 180. The polyoxyalkylene zwitterionic lubricating oil according to any one of Aspects 163-187, wherein $Z_6$ is selected from the group consisting of aminoalkyl phosphonic acids, aminoalkyl carboxylic acids, and aminoalkyl sulfonic acids.

Aspect 181. The polyoxyalkylene zwitterionic lubricating oil according to any one of Aspects 163-187, wherein $Z_6$ is selected from the group consisting of sulfobetaine, carboxybetaine, and phosphoryl choline.

Aspect 182. The polyoxyalkylene zwitterionic lubricating oil according to any one of Aspects 163-187, wherein a sum of b+c+d+f is about 1 to 100.

Aspect 183. The polyoxyalkylene zwitterionic lubricating oil according any one of Aspects 163-187, wherein b+f is about 1 to 12, about 1 to 3; about 1 to 6, about 2 to 10, or about 3 to 7.

Aspect 184. The polyoxyalkylene zwitterionic lubricating oil according any one of Aspects 163-187, wherein d is about 1 to 50, 6 to 30, or 10 to 20.

Aspect 185. The polyoxyalkylene zwitterionic lubricating oil according to any one of Aspects 163-187, wherein c is 0 or wherein c is about 1 to 12.

Aspect 186. The polyoxyalkylene zwitterionic lubricating oil according to any one of Aspects 163-187, wherein the polyoxyalkylene zwitterionic lubricating oil has a molecular weight of about 500 to 20000.

Aspect 187. The polyoxyalkylene zwitterionic lubricating oil according to any one of Aspects 163-187, wherein a sum of b+c+d+f is about 10 to 50.

We claim:

1. A sidechain functionalized organosiloxane compound having a structure according to the following formula

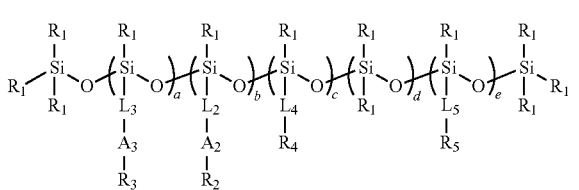

Formula I wherein each occurrence of $R_1$ is independently a substituted or unsubstituted $C_1$-$C_5$ alkyl, a substituted or unsubstituted $C_1$-$C_5$ heteroalkyl, or a substituted or unsubstituted phenyl;

wherein each occurrence of $R_2$ is independently a substituted or unsubstituted $C_1$-$C_5$ alkyl, a substituted or unsubstituted $C_1$-$C_5$ heteroalkyl, or a hydroxyl;

wherein each occurrence of $R_3$ is independently a reactive end group selected from the group consisting of alkoxy, enoxy, oxime, primary amine, secondary amine, ethoxy silane, methoxy silane, and acetoxy silane groups that are reactive for silicone condensation cure chemistry; epoxide groups reactive with epoxy chemistry; $-NH_2$ groups reactive with epoxy and polyurethane chemistry; and $-NCO$ and $-OH$ groups reactive with polyurethane chemistry;

wherein each occurrence of $R_4$ is independently a substituted or unsubstituted organosiloxane or a substituted or unsubstituted alkyl;

wherein each occurrence of $R_5$ is independently a reactive end group selected from the group consisting of alkoxy, enoxy, oxime, primary amine, secondary amine, ethoxy silane, methoxy silane, and acetoxy silane groups that are reactive for silicone condensation cure chemistry; epoxide groups reactive with epoxy chemistry; $-NH_2$ groups reactive with epoxy and polyurethane chemistry; and $-NCO$ and $-OH$ groups reactive with polyurethane chemistry;

wherein each occurrence of $L_2$, $L_3$, $L_4$, and $L_5$ is independently a substituted or unsubstituted $C_1$-$C_{12}$ alkyl or a substituted or unsubstituted $C_1$-$C_{12}$ heteroalkyl;

wherein each occurrence of $A_2$ and $A_3$ is independently a substituted or unsubstituted hydrophilic polyalkylene glycol;

wherein a is an integer from 0 to 50, b is an integer from 0 to 50, c is an integer from 0 to 50, d is an integer from 0 to 100, and e is an integer from 0 to 20 so long as a+e is greater than or equal to 1.

2. The sidechain functionalized organosiloxane compound according to claim 1, wherein each occurrence of $A_2$ is $-(O(CH_2)_o)_m-$ and each occurrence of $A_3$ is $-(O(CH_2)_o)_n-$; and wherein m is an integer from 2 to 25, n is an integer from 2 to 25, and o is an integer from 2 to 4.

3. The sidechain functionalized organosiloxane compound according to claim 1, wherein each occurrence of $L_2$, $L_3$, $L_4$, and $L_5$ is independently a $C_1$-$C_5$ alkyl.

4. The sidechain functionalized organosiloxane compound according to claim 1, wherein the sidechain functionalized organosiloxane compound has a structure according to Formula II

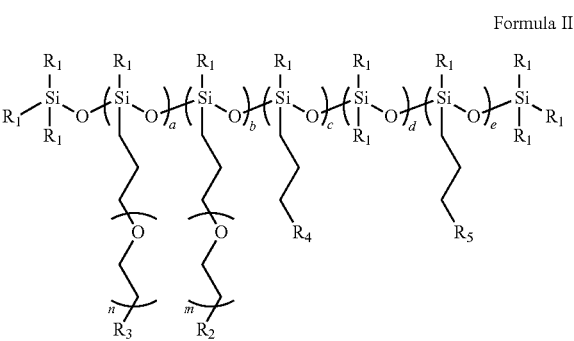

Formula II

5. The sidechain functionalized organosiloxane compound according to claim 1, wherein the sidechain functionalized organosiloxane compound has a structure according to the following general formula:

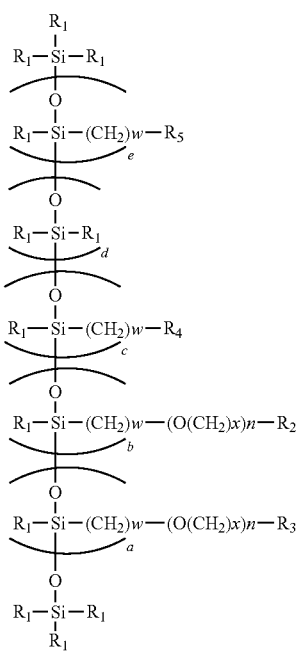

wherein each occurrence of $R_1$ is independently selected from the group consisting of substituted and unsubstituted C1-C5 alkyl and substituted and unsubstituted phenyl;

wherein each occurrence of $R_2$ is independently methyl, hydroxyl, or a primary or secondary amine;

wherein each occurrence of $R_3$ and $R_5$ is independently a reactive group that is independently selected from the group consisting of groups that are reactive with silicone condensation cure, groups that are reactive with platinum cure addition silicone chemistry, groups that are reactive with amines as part of epoxy binder systems, groups that are reactive with epoxy and polyurethane chemistries, and a combination thereof;

wherein each occurrence of $R_4$ is independently a polyorganosiloxane —Si(CH$_3$)$_3$, —Si(CH$_2$CH$_3$)$_3$, [—Si(CH$_3$)$_2$—O—]$_i$—Si(CH$_3$)$_3$ where i can be 1-10, CF$_3$, —(CF$_2$)$_j$—CF$_3$, where j can be 1-10;

wherein each occurrence of w is independently an integer from 1 to 9;

wherein each occurrence of x is independently an integer from 2 to 6;

wherein each occurrence of n is independently an integer from 1 to 25;

wherein a, b, c, d, and e are each an integer from 0 to 18.

6. The sidechain functionalized organosiloxane compound according to claim 1, wherein a+e is at least 2 or more.

7. The sidechain functionalized organosiloxane compound according to claim 5, wherein x is 2 and n is 10-12.

8. The sidechain functionalized organosiloxane compound according to claim 1, wherein each occurrence of $R_1$ is independently CH$_3$, —CH$_2$—CH$_3$, —CH$_2$—CH$_2$—CF$_3$, or phenyl.

9. The sidechain functionalized organosiloxane compound according to claim 1, wherein each occurrence of $R_2$ is independently methyl or hydroxyl.

10. The sidechain functionalized organosiloxane compound according to claim 1, wherein each occurrence of $R_3$ is independently a methoxy silane, ethoxy silane, or acetoxy silane, —OH, —Si(OCH$_2$CH$_3$)$_3$, —Si(OCH$_3$)$_3$, or

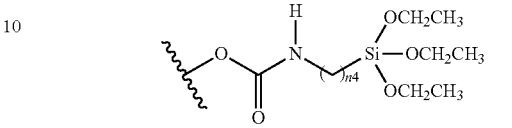

where n4 is an integer from 1 to 7.

11. The sidechain functionalized organosiloxane compound according to claim 1, wherein each occurrence of $R_4$ is independently —Si(CH$_3$)$_3$, —Si(CH$_2$CH$_3$)$_3$, —[Si(CH$_3$)$_2$—O-]$_{n3}$-Si(CH$_3$)$_3$, —CF$_3$, or —(CF$_2$)$_{n3}$—CF$_3$, where n3 is an integer from 1 to 10.

12. The sidechain functionalized organosiloxane compound according to claim 1, wherein each occurrence of $R_5$ is independently a methoxy silane, ethoxy silane, or acetoxy silane.

13. The sidechain functionalized organosiloxane compound according to claim 1, wherein a sum of a+b+c+d+e is about 20 to about 50.

14. The sidechain functionalized organosiloxane compound according to claim 1, wherein e is about 1 to 5.

15. The sidechain functionalized organosiloxane compound according to claim 1, wherein a is 0.

16. The sidechain functionalized organosiloxane compound according to claim 1, wherein d is about 15 to 25 and e is about 1 to 5.

17. The sidechain functionalized organosiloxane compound according to claim 1, wherein b is about 2 to 20.

18. The sidechain functionalized organosiloxane compound according to claim 1, wherein c is about 2 to 20.

19. The sidechain functionalized organosiloxane compound according to claim 1, wherein a is 0, b is 3 to 10, c is 0, d is 15 to 25, and e is 1 to 5.

20. The sidechain functionalized organosiloxane compound according to claim 1, wherein a is 0, b is 0, c is 3 to 10, d is 15 to 25, and e is 1 to 5.

21. The sidechain functionalized organosiloxane compound according to claim 1, wherein a is 0, b is 1 to 5, c is 1 to 5, d is 15 to 25, and e is 1 to 5.

22. The sidechain functionalized organosiloxane compound according to claim 1, wherein a is 0, b is 15 to 25, c is 15 to 25, d is 0, and e is 1 to 5.

23. The sidechain functionalized organosiloxane compound according to claim 4, wherein a=0; wherein d=0; wherein m is an integer from 2 to 25; wherein each occurrence of $R_1$ is methyl; wherein $R_2$ is methyl; wherein $R_4$ is —Si(CH$_3$)$_3$; and wherein $R_5$ is ethoxy silane.

24. The sidechain functionalized organosiloxane compound according to claim 23, wherein b is 16; c is 24; and e is 2.

25. The sidechain functionalized organosiloxane compound according to claim 24, wherein m is 10.

* * * * *